United States Patent
Saylor et al.

(10) Patent No.: US 10,257,179 B1
(45) Date of Patent: Apr. 9, 2019

(54) CREDENTIAL MANAGEMENT SYSTEM AND PEER DETECTION

(71) Applicant: MicroStrategy Incorporated, Vienna, VA (US)

(72) Inventors: Michael J. Saylor, Vienna, VA (US); Benjamin Reyes, Great Falls, VA (US); Jeff Taylor, Oxon Hill, MD (US); Jose Galvez, Leesburg, VA (US)

(73) Assignee: MicroStrategy Incorporated, Vienna, VA (US)

( * ) Notice: Subject to any disclaimer, the term of this patent is extended or adjusted under 35 U.S.C. 154(b) by 162 days.

(21) Appl. No.: 15/006,300

(22) Filed: Jan. 26, 2016

Related U.S. Application Data

(60) Provisional application No. 62/108,018, filed on Jan. 26, 2015.

(51) Int. Cl.
  *H04L 29/06* (2006.01)
  *H04W 12/06* (2009.01)
(52) U.S. Cl.
  CPC .............. *H04L 63/08* (2013.01); *H04W 12/06* (2013.01)
(58) Field of Classification Search
  CPC combination set(s) only.
  See application file for complete search history.

(56) References Cited

U.S. PATENT DOCUMENTS

| | | | | |
|---|---|---|---|---|
| 6,661,340 B1 * | 12/2003 | Saylor | ................ | G08B 25/016 340/3.3 |
| 7,356,840 B1 * | 4/2008 | Bedell | ............... | G06F 17/30528 726/1 |
| 8,127,326 B2 * | 2/2012 | Claussen | ............. | H04N 5/4401 725/25 |
| 8,522,192 B1 * | 8/2013 | Avalos | ............... | G06F 9/45512 717/100 |
| 8,732,853 B1 * | 5/2014 | Byrne | ................ | H04L 63/0838 726/28 |
| 8,775,807 B1 * | 7/2014 | Vazquez | ................ | G06F 21/31 713/168 |

(Continued)

OTHER PUBLICATIONS

U.S. Office Action issued for U.S. Appl. No. 14/793,488, dated Nov. 14, 2018, 24 pages.

(Continued)

*Primary Examiner* — Phy Anh T Vu
(74) *Attorney, Agent, or Firm* — Fish & Richardson P.C.

(57) ABSTRACT

A credential management system is described. The credential management system allows a user to identify peers and obtain additional information regarding the peers through the credential management system. The credential management system may perform user analytics and provide the requested additional information to the user. The credential management system may associate the discovered peers with a group or credential, and share information and data with one or more of the discovered peers associated with a particular group or credential in a convenient manner. The credential management system may also implement a hierarchical menu and/or conditions to determine which users of the credential management system may be able to view other users' information and to determine a type of information or data that is transmitted between users.

20 Claims, 27 Drawing Sheets

(56) References Cited

U.S. PATENT DOCUMENTS

| | | | |
|---|---|---|---|
| 8,886,128 B2* | 11/2014 | Hubner | H04W 4/023 |
| | | | 455/403 |
| 9,027,099 B1* | 5/2015 | Saylor | G06F 21/36 |
| | | | 726/6 |
| 9,160,727 B1* | 10/2015 | Saylor | H04L 63/08 |
| 9,172,699 B1* | 10/2015 | Vazquez | H04L 63/0861 |
| 9,413,794 B1* | 8/2016 | Saylor | H04L 65/4076 |
| 2003/0101201 A1* | 5/2003 | Saylor | H04L 41/5035 |
| 2005/0242946 A1* | 11/2005 | Hubbard, Jr. | G06F 19/3418 |
| | | | 340/539.12 |
| 2006/0265266 A1* | 11/2006 | Chen | G06Q 10/1053 |
| | | | 705/321 |
| 2007/0054739 A1* | 3/2007 | Amaitis | G06Q 50/10 |
| | | | 463/42 |
| 2008/0319768 A1* | 12/2008 | Kreiner | G06Q 10/06 |
| | | | 705/1.1 |
| 2009/0046677 A1* | 2/2009 | Toledano | H04L 29/08846 |
| | | | 370/338 |
| 2010/0019921 A1* | 1/2010 | Kreiner | G08B 25/009 |
| | | | 340/4.3 |
| 2010/0063889 A1 | 3/2010 | Proctor, Jr. | |
| 2010/0146078 A1 | 6/2010 | Wolff | |
| 2011/0037712 A1 | 2/2011 | Kim | |
| 2011/0167357 A1 | 7/2011 | Benjamin | |
| 2012/0149309 A1* | 6/2012 | Hubner | H04W 4/023 |
| | | | 455/67.11 |
| 2013/0006749 A1 | 1/2013 | Fink | |
| 2013/0061296 A1* | 3/2013 | Reddy | H04L 51/02 |
| | | | 726/5 |
| 2013/0176142 A1* | 7/2013 | Drysdale | G06F 3/011 |
| | | | 340/870.02 |
| 2014/0162601 A1 | 6/2014 | Kinn | |
| 2014/0192737 A1 | 7/2014 | Belghoul | |
| 2014/0344252 A1* | 11/2014 | Kapoor | G09B 7/02 |
| | | | 707/722 |
| 2015/0199442 A1* | 7/2015 | Hahn | G06F 17/30867 |
| | | | 707/751 |
| 2015/0222639 A1* | 8/2015 | Dulkin | G06F 21/31 |
| | | | 726/3 |
| 2015/0263833 A1* | 9/2015 | Li | H04L 5/0035 |
| | | | 370/449 |
| 2016/0063558 A1 | 3/2016 | Kim | |
| 2017/0134901 A1* | 5/2017 | Uyanik | H04W 4/023 |

OTHER PUBLICATIONS

U.S. Office Action issued in U.S. Appl. No. 14/793,488, dated May 16, 2018, 22 pages.
U.S. Office Action issued in U.S. Appl. No. 14/793,488, dated Aug. 9, 2017, 21 pages.

* cited by examiner

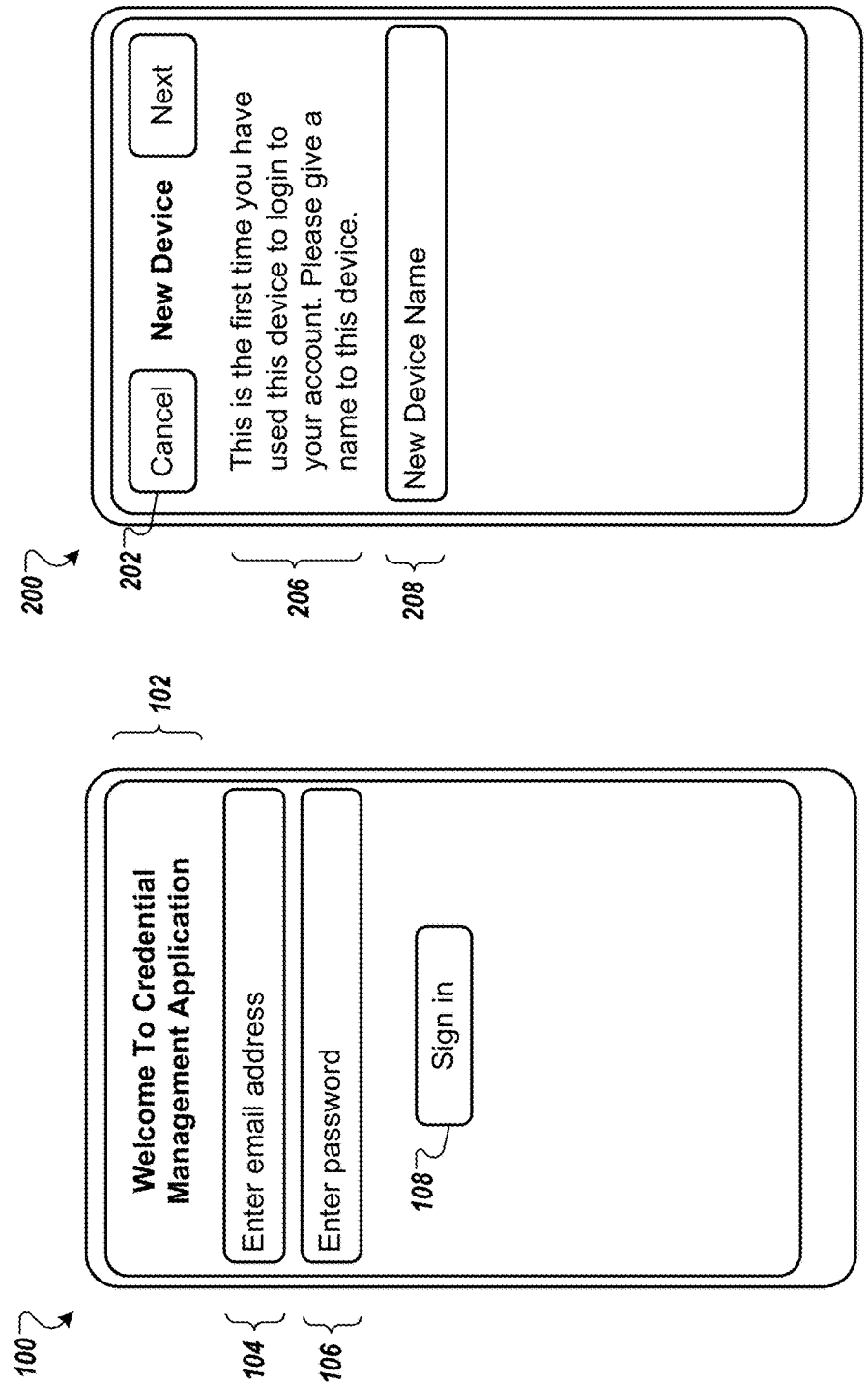

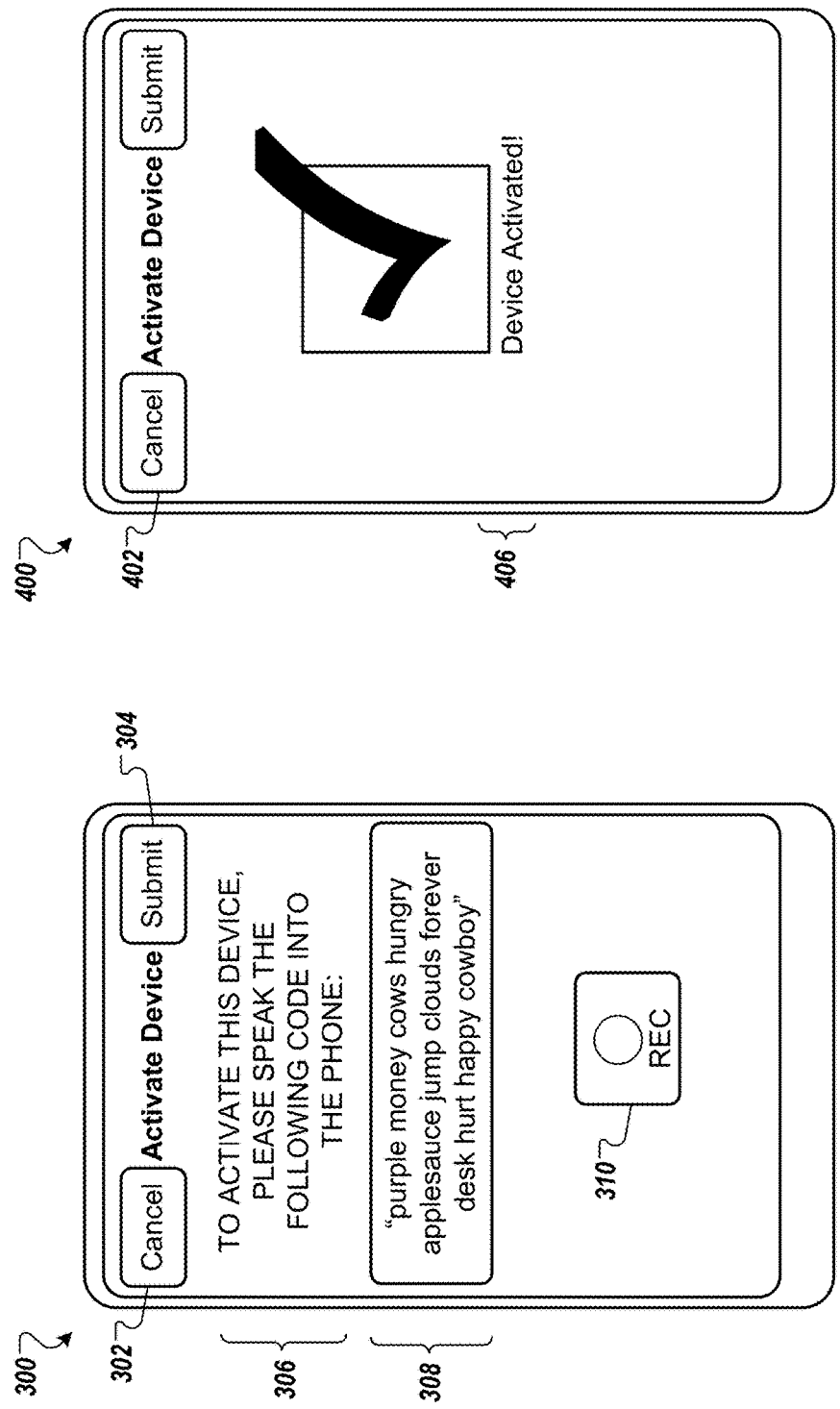

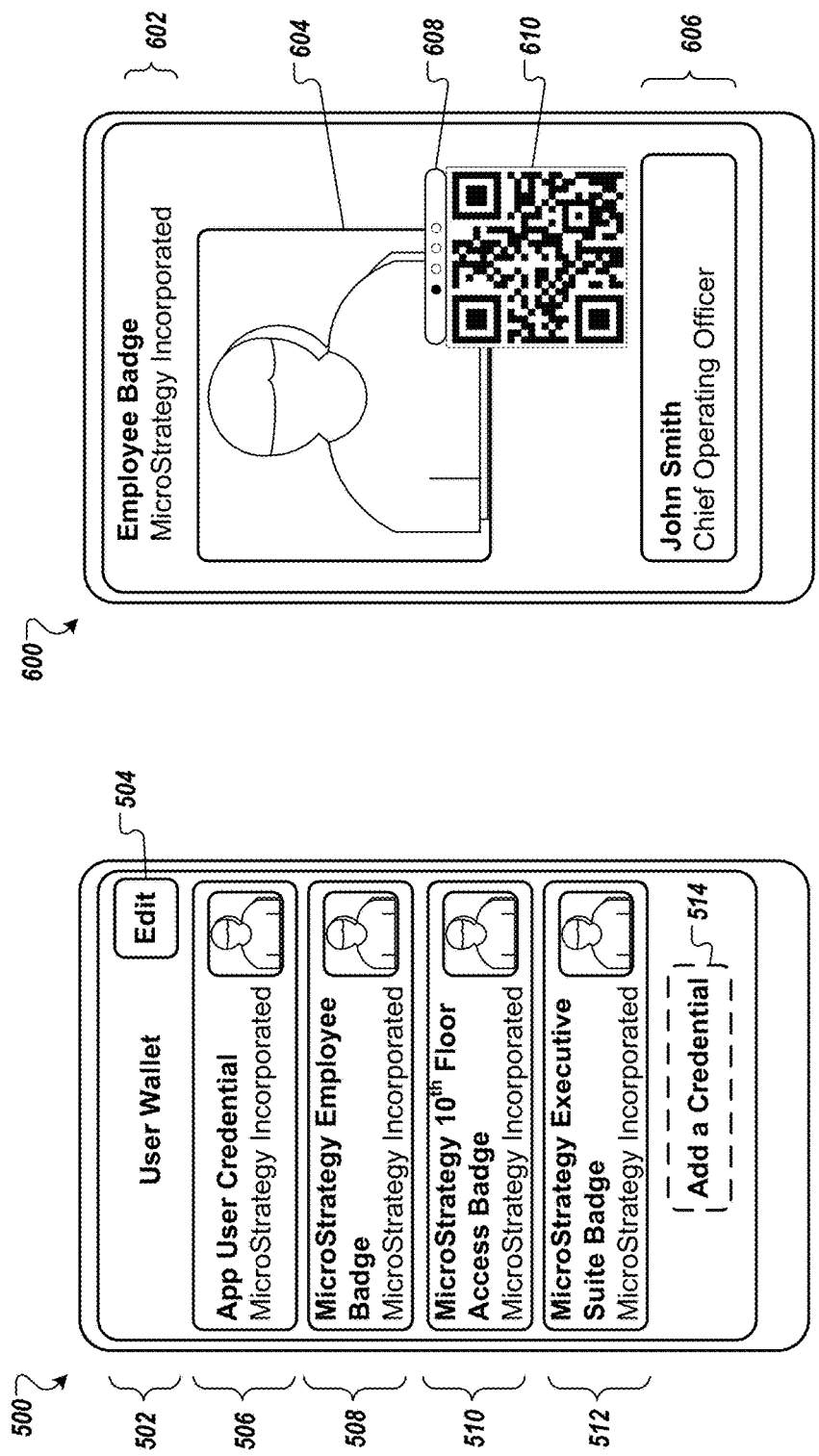

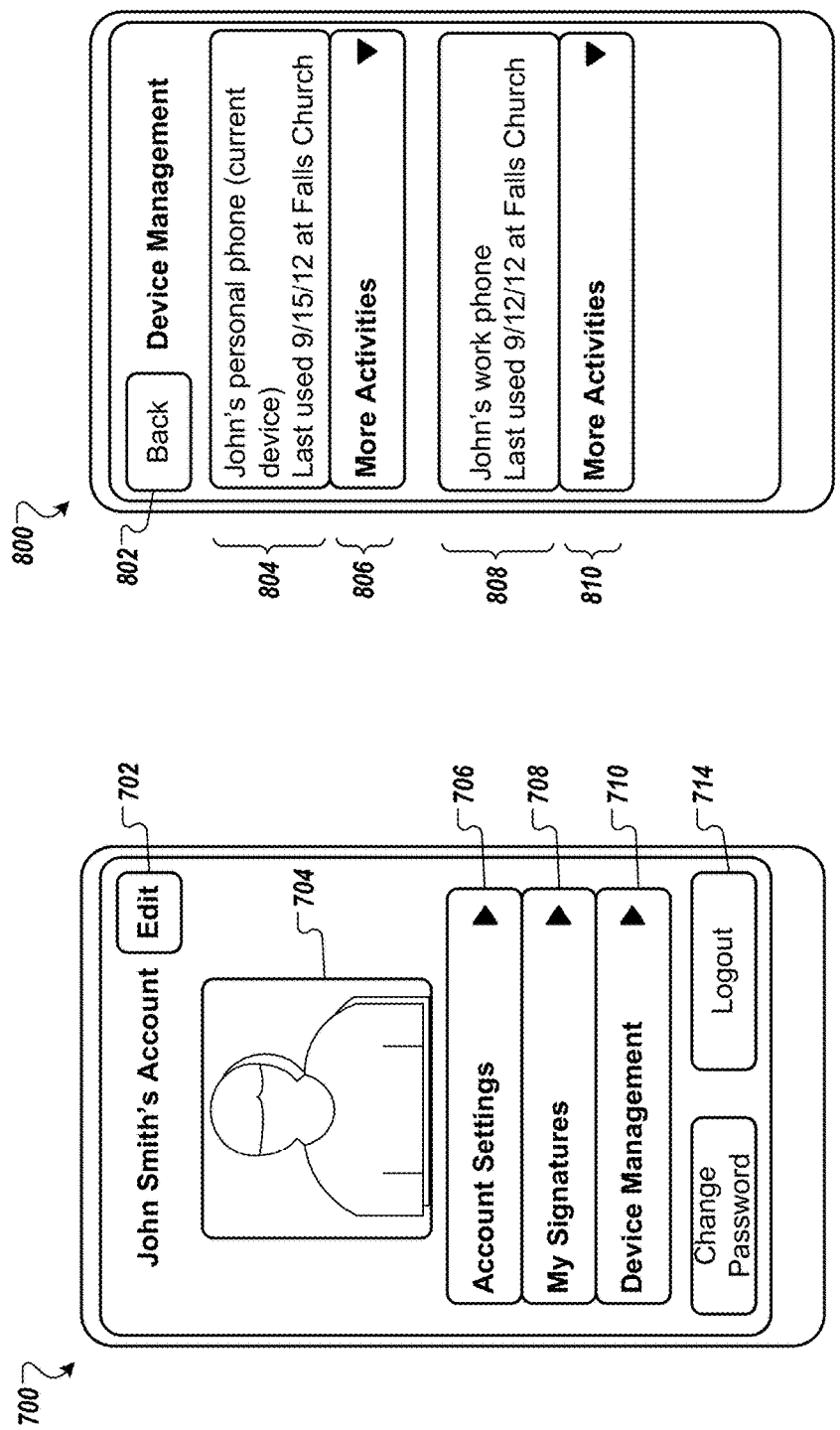

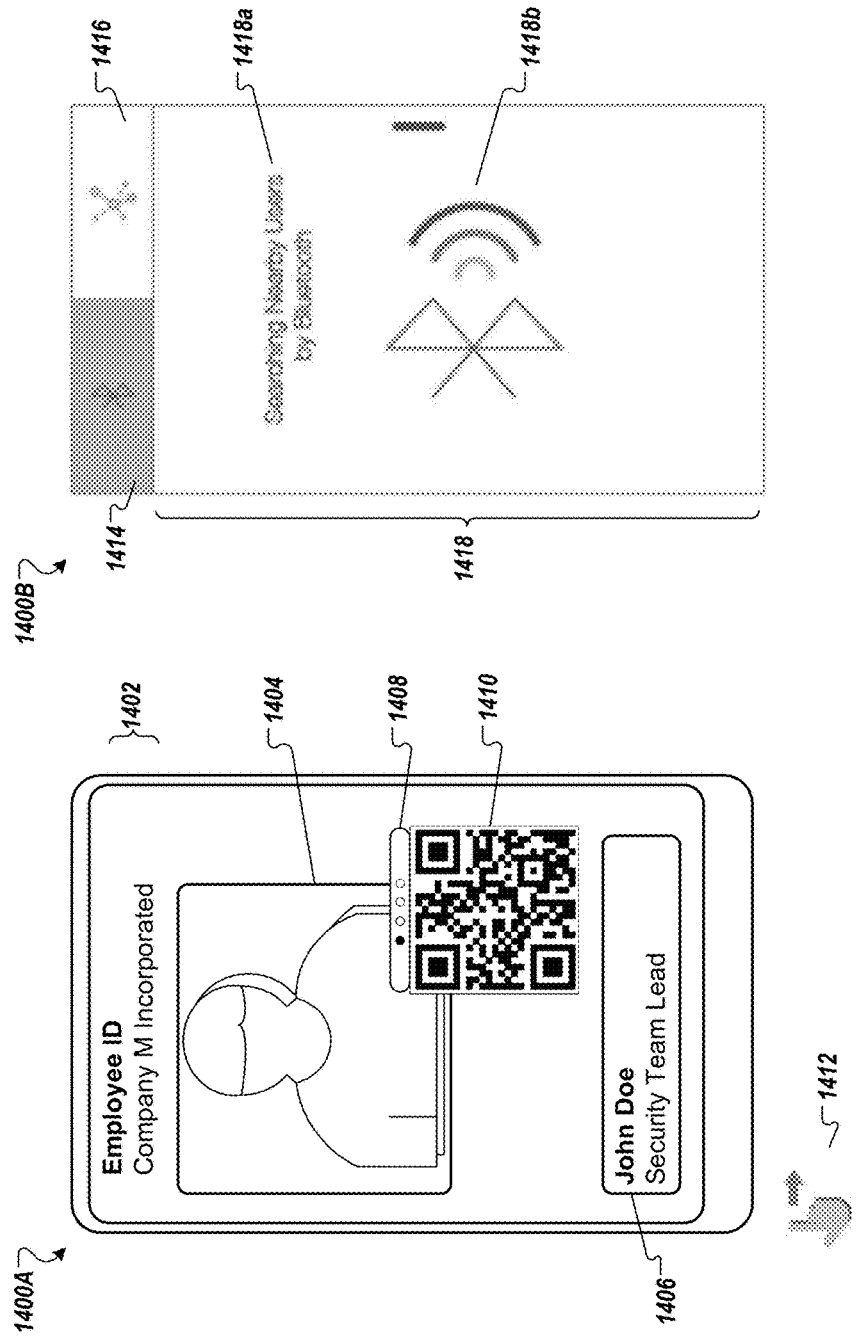

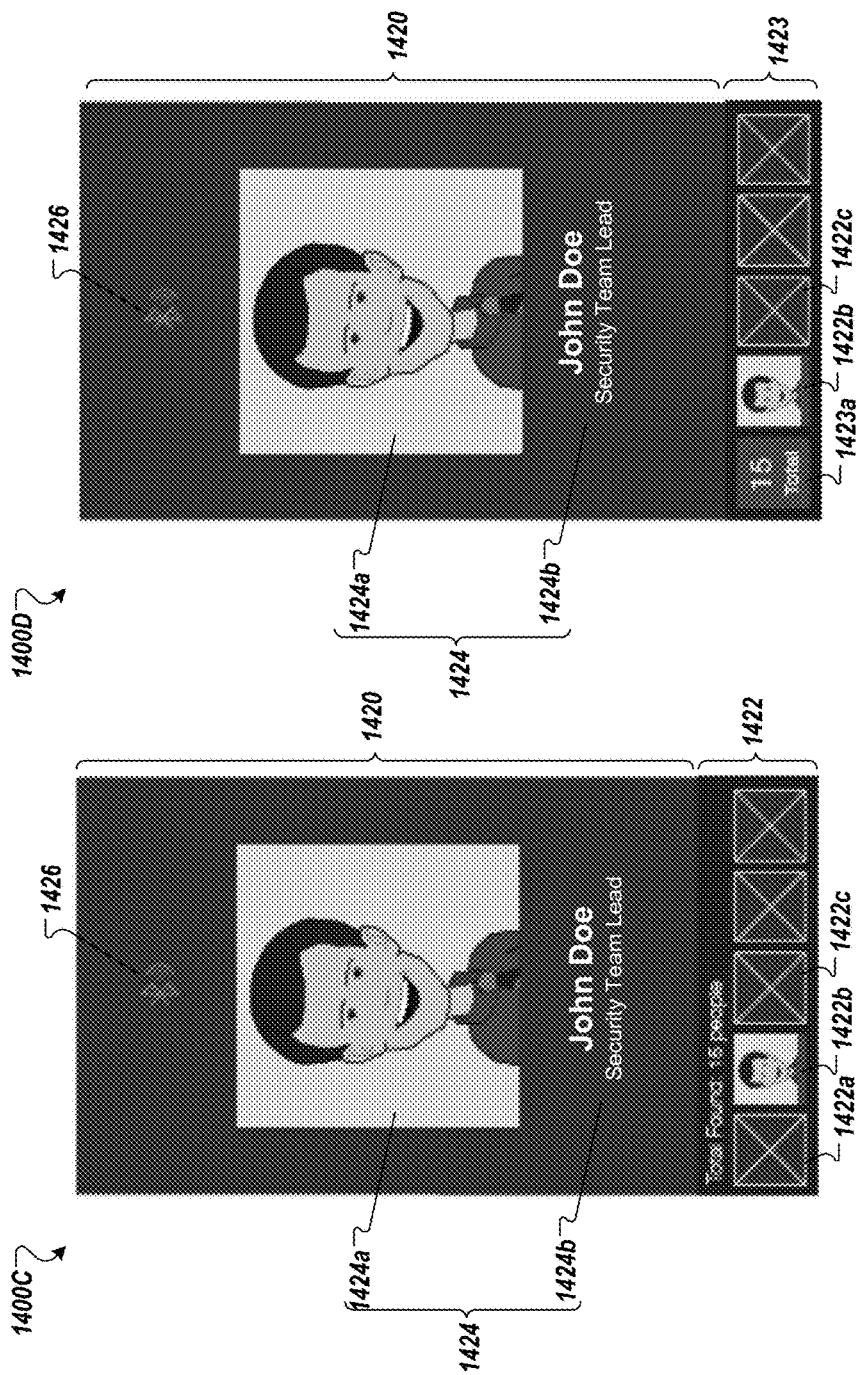

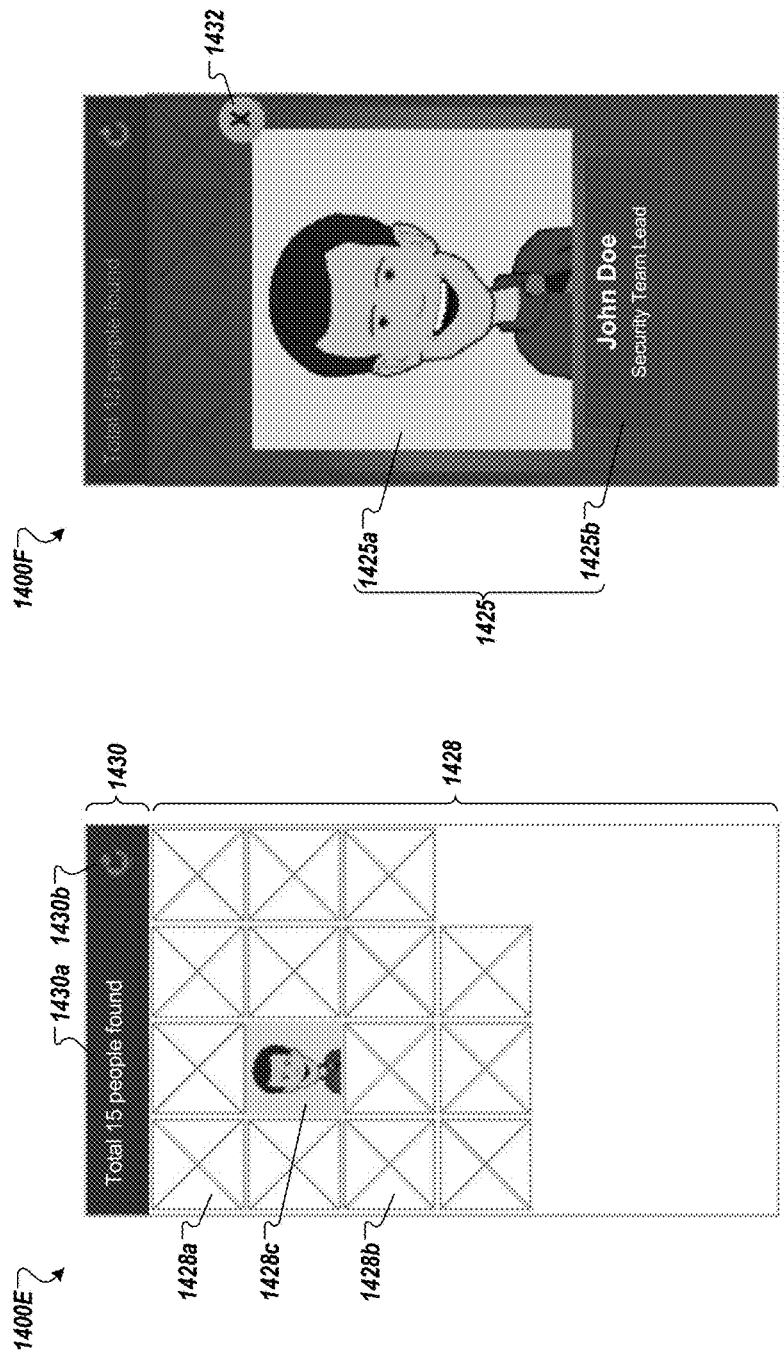

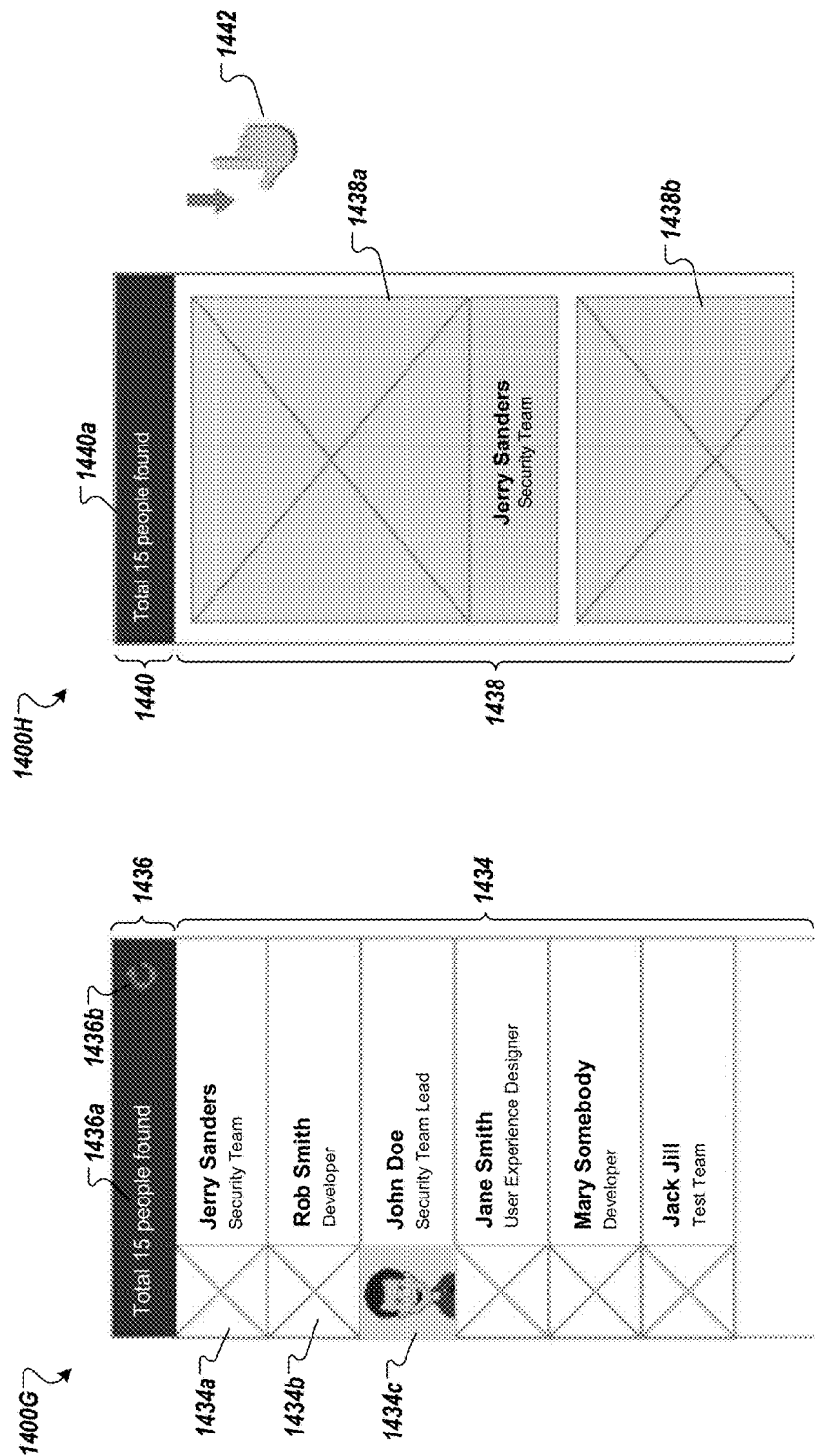

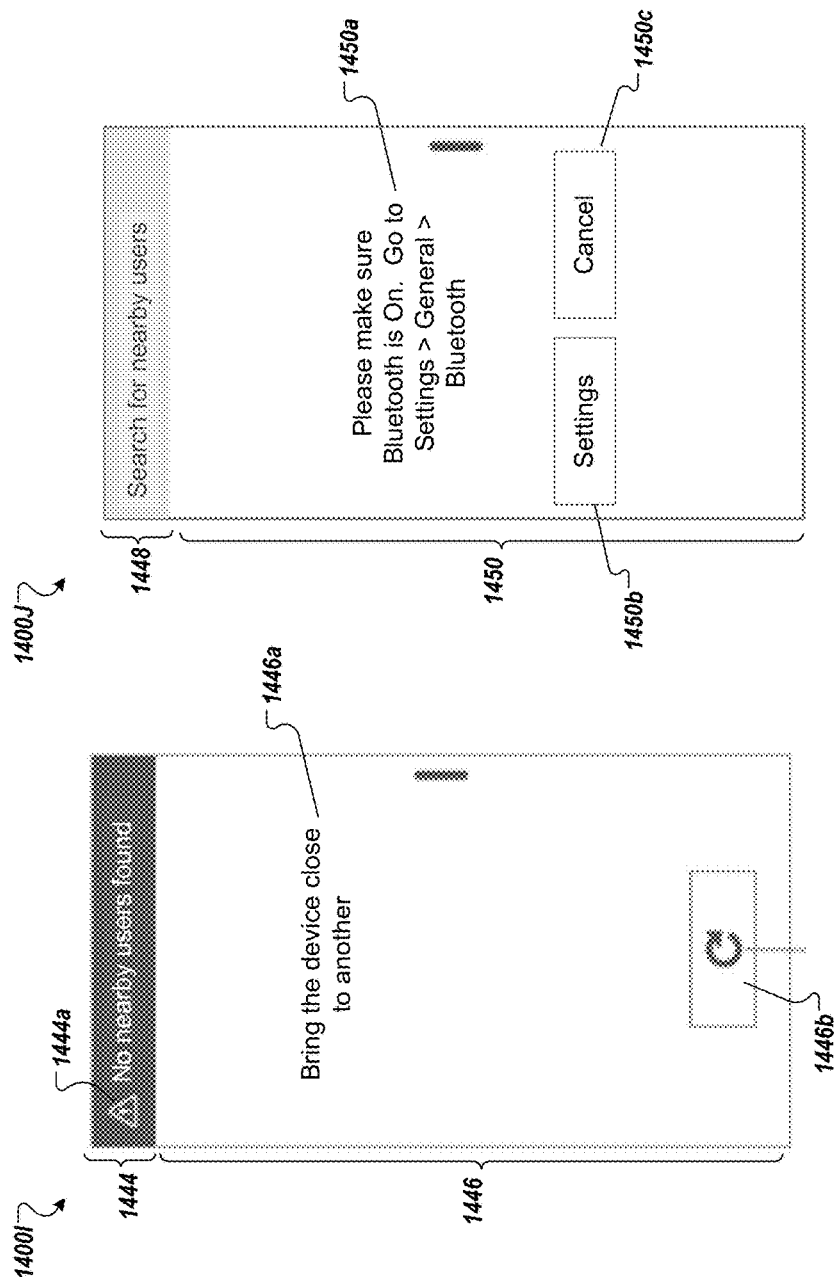

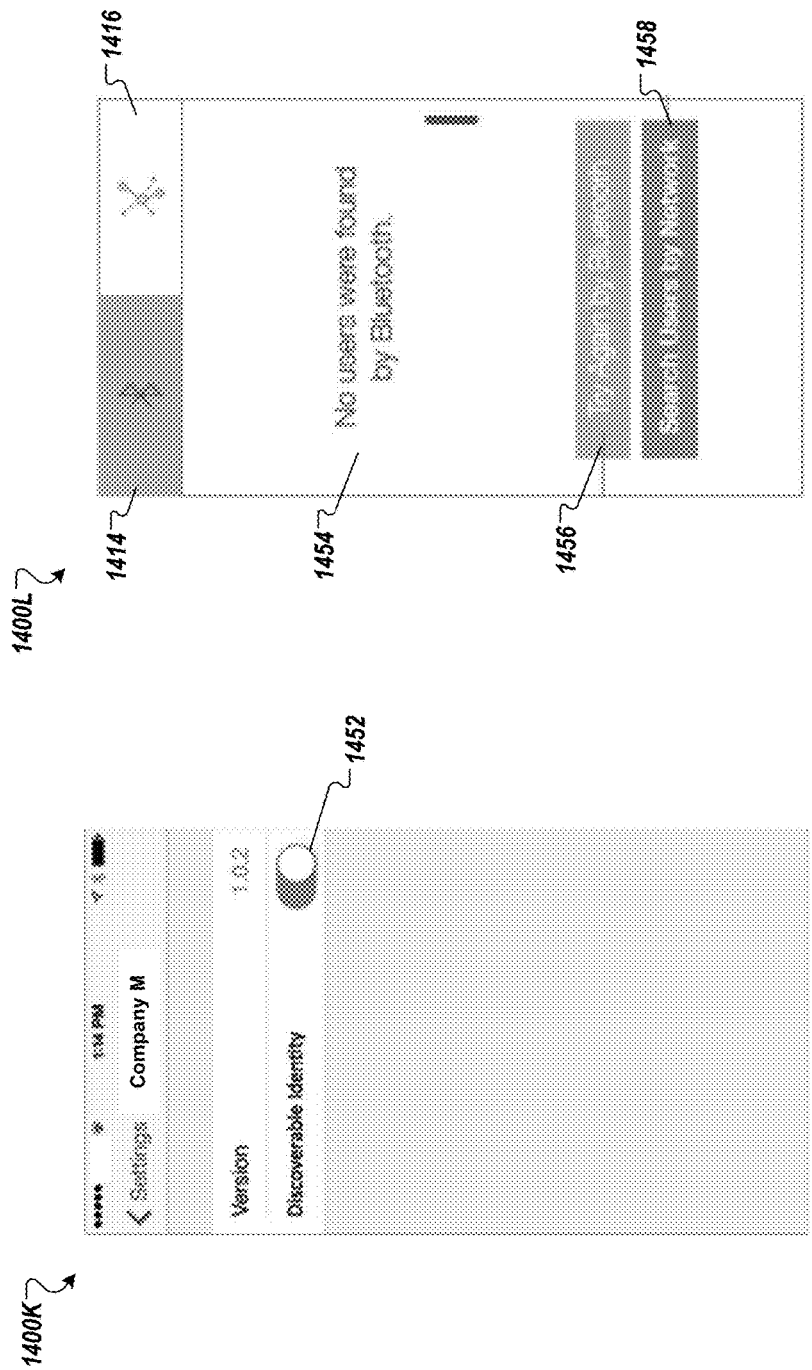

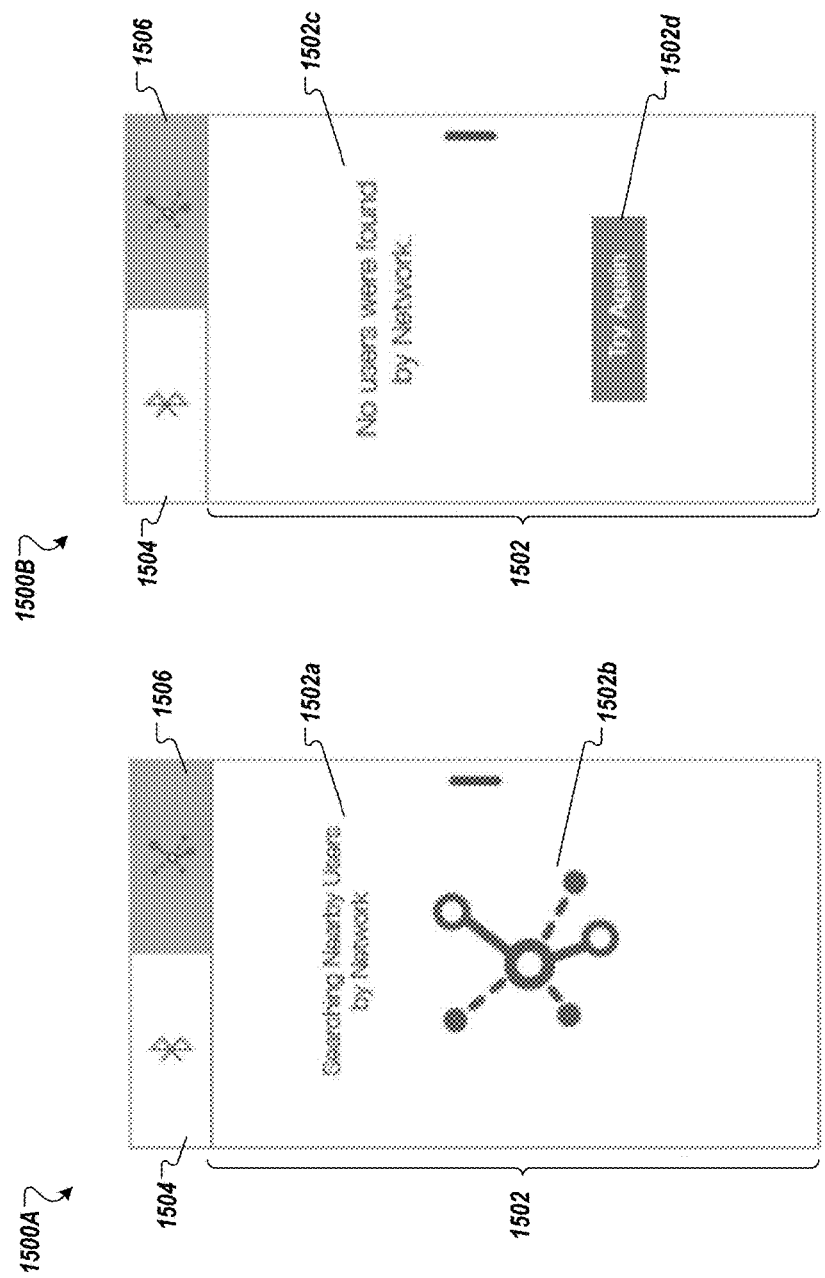

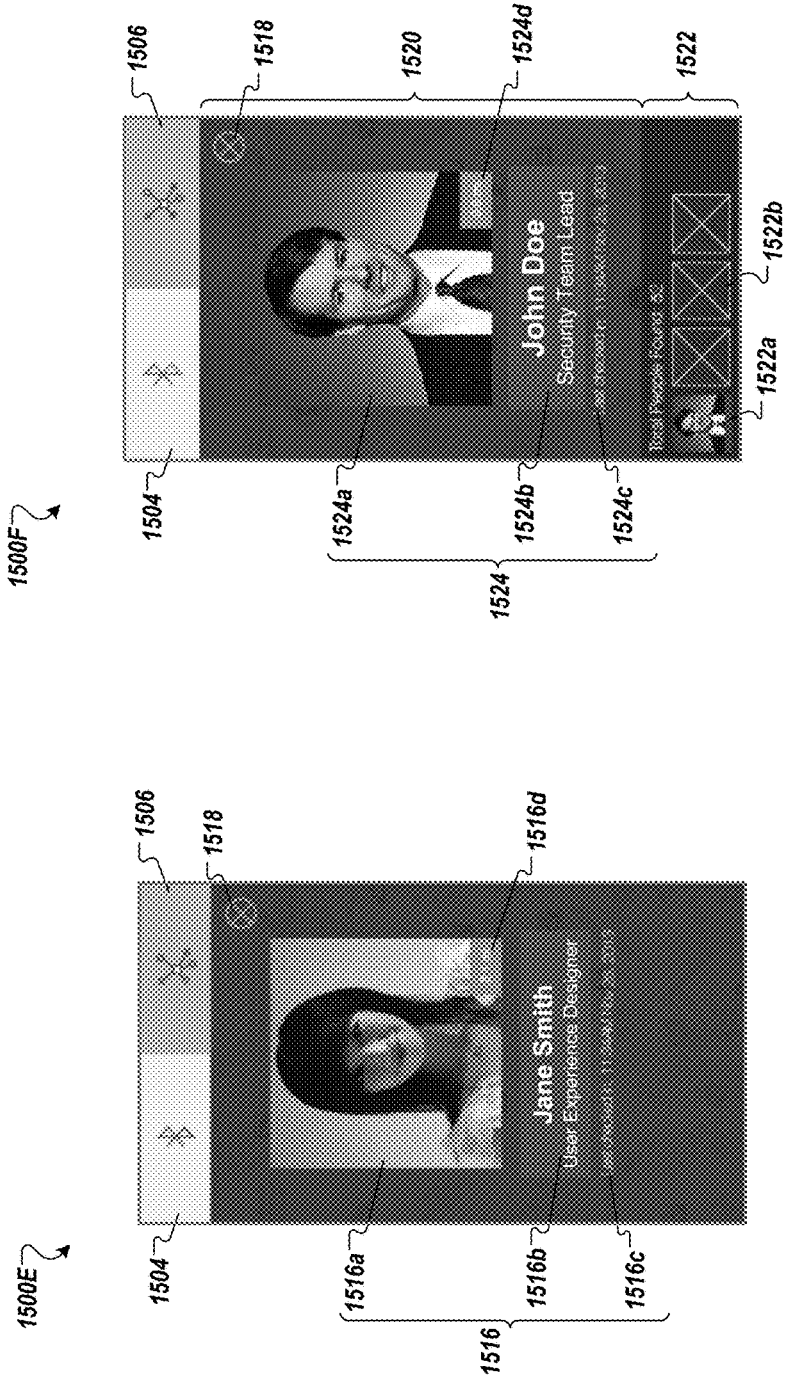

CREDENTIAL MANAGEMENT SYSTEM AND PEER DETECTION

CROSS-REFERENCE TO RELATED APPLICATION

This application claims priority from and the benefit of U.S. Provisional Application No. 62/108,018, filed on Jan. 26, 2015, which is incorporated by reference herein.

TECHNICAL FIELD

This specification generally relates to enhancement of user experiences and interactions by supplementing peer detection with activity information.

BACKGROUND

Organizations and enterprises often use keys, such as fobs, to provide access to authorized personnel such as their employees. However, a system is needed for providing additional services to the authorized personnel and enabling the organization to better manage their employees and resources.

SUMMARY

In general, one aspect of the subject matter described in this specification includes a computer-implemented method including operations of receiving, by a client device, a request to identify devices that are associated with a credential management system and are located within a first distance of the client device. Responsive to receiving the request, one or more wireless communication protocols are used to detect one or more devices that are associated with the credential management system and are located within the first distance of the client device. The operations also include obtaining identification information that identifies users associated with the one or more devices, and validating the identification information that identifies the users associated with the one or more devices by communicating with a validation server associated with the credential management system. In response to validation of the identification information, the client device is controlled to display (i) an indication of the users associated with the one or more devices, and (ii) an indication that the one or more devices are located within the first distance of the client device. The operations also include receiving, by the client device, a second request for activity data of a first user of the users associated with the one or more devices. The activity data of the first user includes data indicating (I) one or more interactions of the first user with the credential management system, and (II) one or more respective locations of the one or more interactions of the first user. In response to receiving the second request, the operations also include determining that a user of the client device is authorized to view the activity data of the first user. In responsive to determining that the user of the client device is authorized to view the activity data of the first user, the activity data of the first user is obtained and providing the activity data of the first user is provided for display at the client device.

In some implementations, the operations further include obtaining, by a camera of the client device, an image of the users associated with the one or more devices, and transmitting the image of the users to the one or more devices using contact information included in the identification information that identifies users associated with the one or more devices.

In some implementations, the operations further include transmitting one or more data files to the one or more devices using contact information included in the identification information that identifies users associated with the one or more devices.

In some implementations, detecting, using one or more wireless communication protocols, one or more devices that are associated with the credential management system and are located within the first distance of the client device includes: performing, using a direct connectivity wireless communication protocol, a scan of devices within the first distance of the client device, or performing a search for devices within the first distance of the client device using IEEE 802.11, LTE, WiMAX, 3G, 4G, or 5G wireless communication. The direct connectivity wireless communication protocol includes Bluetooth, Wi-Fi Direct, or near field communication protocols;

In some implementations, identification information that identifies users associated with the one or more devices includes, for each of the users, information indicating a name of the user, an occupational title of the user, an image of the user, and contact information of the user.

In some implementations, determining that a user of the client device is authorized to view the activity data of the first user includes determining an access level of the user of the client device to view the activity data of the first user, and determining that the access level of the user of the client device is sufficient for the user of the client device to view the activity data of the first user.

In some implementations, determining an access level of the user of the client device to view the activity data of the first user includes determining an occupation of the user of the client device, and determining a professional association between the user of the client device and the first user.

In some implementations, the operations further include receiving a selection of a subset of users from the users associated with the one or more devices and receiving a third request to create a virtual group that includes the subset of users. The selection is received through a selection of the indication of users in the subset of users.

In some implementations, the operations further include receiving a selection of a subset of users from the users associated with the one or more devices, and receiving a third request to create a credential for the subset of users. The selection is received through a selection of the indication of users in the subset of users. The credential provides access to particular information for the subset of users.

In some implementations, the one or more interactions of the first user with the credential management system include one or more of: accessing a credential management application by a device associated with the first user; performing an operation of the credential management application by a device associated with the first user; accessing a computer device, door, room, or elevator by a device associated with the first user; accessing a database of the credential management system by a device associated with the first user; and transferring data between the a device associated with the first user and a device associated with another user of the credential management system.

In some implementations, receiving, by the client device, a second request for activity data of a first user of the users associated with the one or more devices includes receiving an input indicating a time period for which the activity data of the first user is to be provided.

In some implementations, obtaining the activity data of the first user includes filtering the activity data of the first user according to the time period, and obtaining the locations of the one or more interactions of the first user during the time period.

In some implementations, providing, to a display of the client device, the activity data of the first user includes generating a map indicating (i) the locations of the one or more interactions of the first user during the time period, and (ii) respective times at which the first user was present at the locations of the one or more interactions.

In some implementations, obtaining the activity data of the first user includes determining a type of activity data to obtain according to an access level of the user of the client device, and obtaining the activity data of the first user according to the determined type of activity data.

In some implementations, a first type of activity data of the first user is obtained when the user of the client device has a first access level, a second type of activity data of the first user is obtained when the user of the client device has a second access level, the first type of activity data is different than the second type of activity data, and the first access level is different than the second access level.

Other features may include corresponding systems, apparatus, and computer programs encoded on computer storage devices configured to perform the foregoing actions.

The details of one or more implementations are set forth in the accompanying drawings and the description, below. Other features will be apparent from the description and drawings, and from the claims.

DESCRIPTION OF DRAWINGS

FIG. 1 is an illustration of an example of a user interface that enables a user to login to a credential management application on a client device.

FIG. 2 is an illustration of an example of a user interface of a credential management application for registering a new device.

FIG. 3 is an illustration of an example of a user interface for biometric verification in a credential management application.

FIG. 4 is an illustration of an example of a client device activation screen.

FIG. 5 is an illustration of an example of a user interface that enables a user to select from among various credentials associated with the user.

FIG. 6 is an illustration of an example representation of a credential.

FIG. 7 is an illustration of an example of an account management screen in a credential management application.

FIG. 8 is an illustration of an example of an activity log in a credential management application.

FIGS. 14A-14L show screens displayed by an example user interface running on a client device that is operable to present representations of credentials and enable searching for other devices that are associated with credentials issued by a common credential issuing organization.

FIGS. 15A-15G show screens displayed by an example user interface running on a client device that is operable to present representations of credentials and enable searching for other devices associated with credentials issued by a common credential issuing organization.

DETAILED DESCRIPTION

Figure 9:
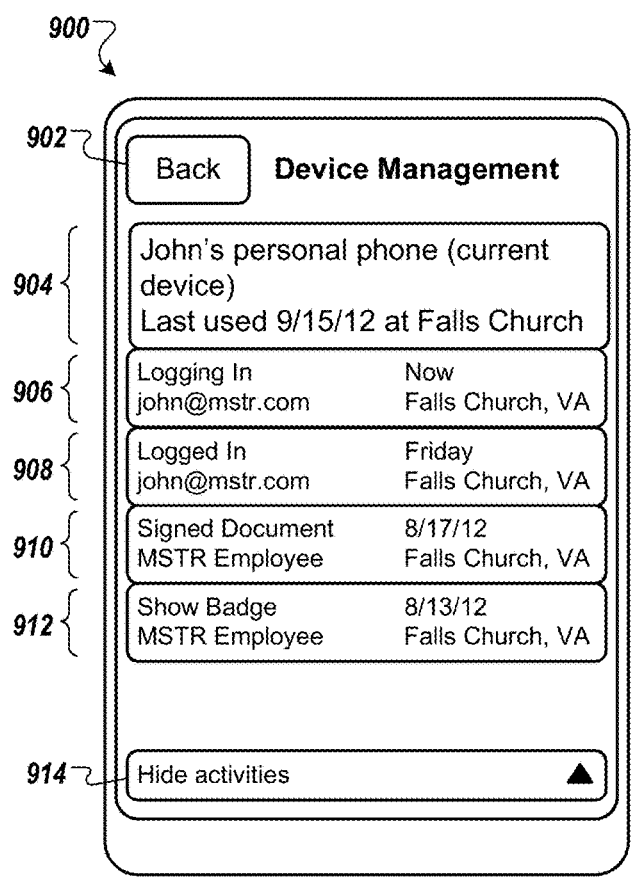
FIG. 9 is an illustration of an example of a detailed activity log in a credential management application.

According to some implementations, a user may utilize a credential management system that performs peer-to-peer recognition methods to identify peers within a particular distance of the user. The user may request additional information regarding one or more of the peers through the credential management system. One or more servers storing information on multiple users of a user group may perform analytics associated with identified peers and peer activities, and provide the requested additional information to the user. The additional information may include data indicating a history of a peer's interaction with the credential management system, a location of a peer, and other information (e.g., qualifications, certifications, etc.) associated with the peer. The credential management system may include a credential management application installed on a client device and a credential management server connected to the client device over a network.

According to some implementations, representations of credentials for groups of users or for individual users may be generated. The credentials can be, for example, identity credentials (driver's licenses, passports, visas, police badges etc.), health insurance cards, loyalty cards, badges reflecting membership in a group (e.g., employees of a company, graduates of a college, gym club memberships, etc.), badges to gain entrance to a location or event, a ticket for entry to a location or event, a key that unlocks a lock (e.g., for entry to a location), etc. Credentials can be maintained on and/or accessed from the credential management applications executed on client devices; and credentials can be represented in various forms as described below. For example, credentials can be represented by parametrically-generated graphical representations, animated graphical representations, phrases, numeric representations, and/or optical machine-readable representations (e.g., bar codes or QR codes). A server, or collection of servers, can manage and distribute credentials to appropriate users' client devices.

Different credentials may be issued by different credential issuing organizations. For example, a company may have an associated credential issuing organization issuing credentials for its employees that are used for accessing various company resources, whereas a physical fitness chain may have another associated credential issuing organization that issues credentials to its members for accessing the fitness centers managed by the chain. The credentials issued by different credential issuing organizations may be managed using the credential management system, which enables a first user of the credential management system to validate a credential presented by a second user of the credential management system irrespective of the credential issuing organization that issued the credential. Responsive to successful validation of a credential, information associated with the validated credential (including information about the credentialed second user) may be disseminated to the validating first user.

A credential management application may be installed on a client device through various suitable means. For example, a user may install the credential management application from an application store. In another example, the user may install the credential management application from a server through a web page or web interface.

The credential management application may enable a user to access one or more of the user's credentials from one or multiple client devices. To prevent fraudulent use of a user's credentials from a client device, the credential management application may require the user to authenticate their identity and register each of the user's client devices with a credential management server. The credential management server may issue a certificate to each of the user's client devices, such that the credential management server can recognize the client devices as having been registered with the user's account.

FIG. 1 shows an example of a user interface 100 that enables a user to login to a credential management application on a client device. In particular, when a user opens the credential management application on the client device, the client device presents login screen that includes a caption 102 stating "Welcome To Credential Management Application," an input box 102 for the user to enter an email address or username, and an input box 106 for the user to enter a password. After the user enters the user's email address (or username) and password, the user can select command button 108 to sign into their user account. In response, the client device transmits to a server a request for access to the user account, where the request includes the email address (or username) and password. The server then determines whether the email address (or username) and password are valid for a user account. If the email address (or username) and password are valid, the server determines whether the requesting client device has already been registered with the user account (e.g., by determining whether a valid certificate was included with the request). If not, then the application recognizes the device as a new device and displays the screen shown in FIG. 2.

FIG. 2 shows an example user interface 200 of a credential management application for registering a new client device. The user interface 200 shows a message 206 prompting the user that "This is the first time you have used this device to login to your account. Please give a name to this device." The user can provide a name for the new device in input box 208. The user interface 200 also includes a cancel button 202 to return to the previous screen and a next button 204 to proceed with the new device registration by providing biometric identification.

FIG. 3 shows an example user interface 300 for biometric verification in a credential management application. The user interface 300 includes a message 306 prompting the user that "To activate this device, please speak the following code into the phone." The client device provides a phrase 308 "purple money cows hungry applesauce jump clouds forever desk hurt happy cowboy" that the user may utter into a microphone of the client device. The client device may obtain the phrase, for example, by generating the phrase or receiving the phrase from the server. To start and stop recording the utterance of the phrase, the user presses the record button 310. The user interface 300 also includes a cancel button 302 to return to the previous screen (e.g., as shown in FIG. 2) and a submit button 304 to transmit the recorded utterance to the server.

FIG. 4 is an example of a client device activation screen 400. Assuming that the server authenticates the user (e.g., the submitted utterance matches a voice print associated with the user account), the server transmits a message to the client device indicating that the user was authenticated and the client device was registered with the user account. In some implementations, the message from the server includes a certificate that can be used by the client device for subsequently accessing the user's account. The application notifies the user that the client device has been successfully registered with the user account by providing a "Device Activated!" message 406. The screen 400 also includes a cancel button 402 to cancel the registration procedure, and a submit button 404 to continue to access the user's account (e.g., the user's wallet shown in FIG. 5).

FIG. 5 shows an example user interface 500 that enables a user to select from among various credentials associated with the user (e.g., issued to the user by a credential issuing authority). In particular, the user interface 500 includes an example of a user's wallet (identified with a "User Wallet" caption 502) that provides the user with access to numerous different credentials associated with the user. The credentials in the user's wallet illustrated in FIG. 5 may have been made accessible via (e.g., downloaded to) the user's wallet responsive to successfully authenticating the user and associating the client device with the user's account. For example, the user interface 500 includes an "App User Credential" 506, a "MicroStrategy Employee Badge" 508, a "MicroStrategy $10^{th}$ Floor Access Badge" 510, and a "MicroStrategy Executive Suite Badge" 512. The user can select any one of these credentials from the user's wallet to output a representation of the credential from the user's client device. The user may make the selection, for example, by touching the corresponding area on a presence-sensitive display (e.g., a touchscreen) of the client device. The user can also select an Edit command button 504 to modify settings associated with the credentials, and can add a credential to the wallet by selecting command button 514.

Figure 13:
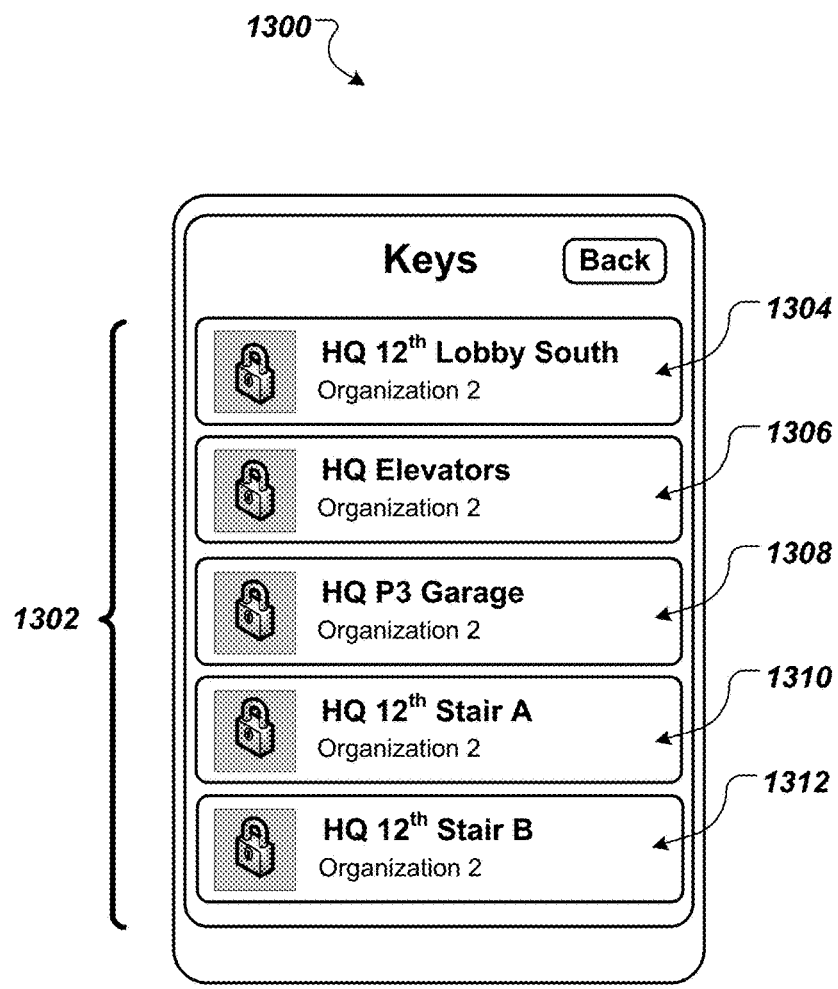
FIG. 13 is an illustration of keys associated with a credential.

While not shown in FIG. 5, credentials in the user's wallet may include credentials associated with memberships to department stores and/or gymnasiums, identity credentials (e.g., driver's licenses, passports, visas), health insurance cards, badges to gain entrance to a location or event, a ticket for entry to a location or event, a key that unlocks a lock (e.g., for entry to a location), etc. Each of the credentials in the user's wallet may also be associated with one or more keys. For example, the "MicroStrategy Employee Badge" 508 may be associated with one or more keys that provide access to various physical resources controlled by the organization associated with the credential (e.g., MicroStrategy). A user may select one of the displayed credentials 506, 508, 510, and 512 to access additional information, including any keys, associated with the selected credential. For example, after selecting the "MicroStrategy Employee Badge" 508, a user interface 1300, including a list 1302 of five keys 1304, 1306, 1308, 1310, and 1312 issued to the user by MicroStrategy, may be displayed on the client device, as shown in FIG. 13. The user interface 1300 may be displayed in response to an input (e.g., sliding horizontally from left to right or right to left, or vertically up or down) while a credential 600 associated with the "MicroStrategy Employee Badge" 508 is displayed. The user may select one of the keys displayed in user interface 1300 to activate the selected key and access a corresponding physical resource. For instance, when the user selects the HQ 12th Lobby South key 1304, a key to a door of HQ 12th Lobby South may be activated by a server of the mobile platform system.

FIG. 6 shows an example representation of a credential. For example, when a user selects the "MicroStrategy Employee Badge" 508 shown in FIG. 5, the selected badge 600 may be displayed on the client device as shown in FIG. 6. The badge 600 includes a caption 602 identifying it as an "Employee Badge" for "MicroStrategy Incorporated." Also included is an image of the user 604 and a caption 606 that identifies the associated user as "John Smith, Chief Operating Officer." The badge 600 further includes a swiping slider 608 that may enable a user to select between different representations for the credential. For example, in the current position, the slider 608 causes an optical-machine readable representation for the credential 610 (e.g., a quick response (QR) code) to be displayed. Another example of a credential is illustrated in FIG. 14A, and a detailed description thereof is provided below.

FIG. 7 shows an example of an account management screen 700 in a credential management application. In particular, the account management screen 700 is for John Smith's account and includes an image of the user 704. The screen 700 allows the user to edit the user's account by activating command button 702. The screen 700 also allows a user to view account settings by activating command button 706, view signatures associated with the user's account by activating command button 708, and perform device management functions by activating command button 710. The user can also change the user's password using command button 712 and logout of the user's account with command button 714. When the user activates the device management button 710, the application may navigate to a screen displaying an activity log.

FIG. 8 shows an example of an activity log 800 in a credential management application. The activity log 800 includes information for each client device associated with the user's account. For example, the activity log 800 shows an entry 804 for "John's personal phone," which is the current device from which the user is accessing the user's account. The entry 804 also indicates that the last time the phone was used was Sep. 15, 2012 and that it was used at Falls Church. For more details regarding the activities on "John's personal phone," the user may select command button 806. Additionally, the activity log 800 shows an entry 808 for "John's work phone." The entry 808 also indicates that the last time the phone was used was Sep. 12, 2012 and that it was used at Falls Church. For more details regarding the activities on "John's work phone," the user may select command button 810. The screen also includes a back button 802 that navigates the application to the previous screen (e.g., the account management screen 700).

The activity log 800 may also include data indicating each interaction of each client device of the user with the credential management system using the credential management application. The interactions may include searching for other users of the credential management system, sending or receiving data (e.g., a message or file) to another user of the credential management system, accessing a computer device, door, room, elevator, or location associated with the credential management system, participating in a meeting using the credential management system, accessing or performing an operation through the user's credential management application, accessing a database associated with the credential management system. If a user performs interactions one or more of these interactions, the activity log 800 may include information indicating details, such as a time and location, of these interactions.

FIG. 9 shows an example of a detailed activity log 900 in a credential management application. In particular, if the user selects command button 806 from FIG. 8 to view more details of activity on "John's personal phone," the detailed activity log 900 may be displayed. The log 900 shows a header 904 for "John's personal phone," which is the current device that the user is accessing. The header 904 also indicates that the last time the phone was used was Sep. 15, 2012 and that it was used at Falls Church. In some cases, the log 900 will also indicate details associated with the last time the phone or credential was used (e.g., phones was used to call a friend, perform a peer search, etc.). The log 900 includes additional entries with further details on usage of the client device entitled "John's personal phone." The entries include: an entry 906 indicating that the user is currently logged in to their account and the user is located in Falls Church, Va.; an entry 908 indicating that the user logged in to their account on Friday from Falls Church, Va.; an entry 910 indicating that the user signed a document with the user's MicroStrategy employee credential on Aug. 17, 2012 from Falls Church, Va.; and an entry 912 indicating that the user presented the user's MicroStrategy employee credential on Aug. 13, 2012 in Falls Church, Va. The log 900 also includes a hide activities command button 914 to return the user interface to the previous state (e.g., as shown in FIG. 8), and a back command button 902 to navigate the application to the previous screen (e.g., the account management screen 700 shown in FIG. 7). As described below, when the user performs different actions from a client device, information identifying the device (e.g., the certificate) is transmitted to the server that enables the server to track activity from the multiple different client devices of the user.

Figure 10:
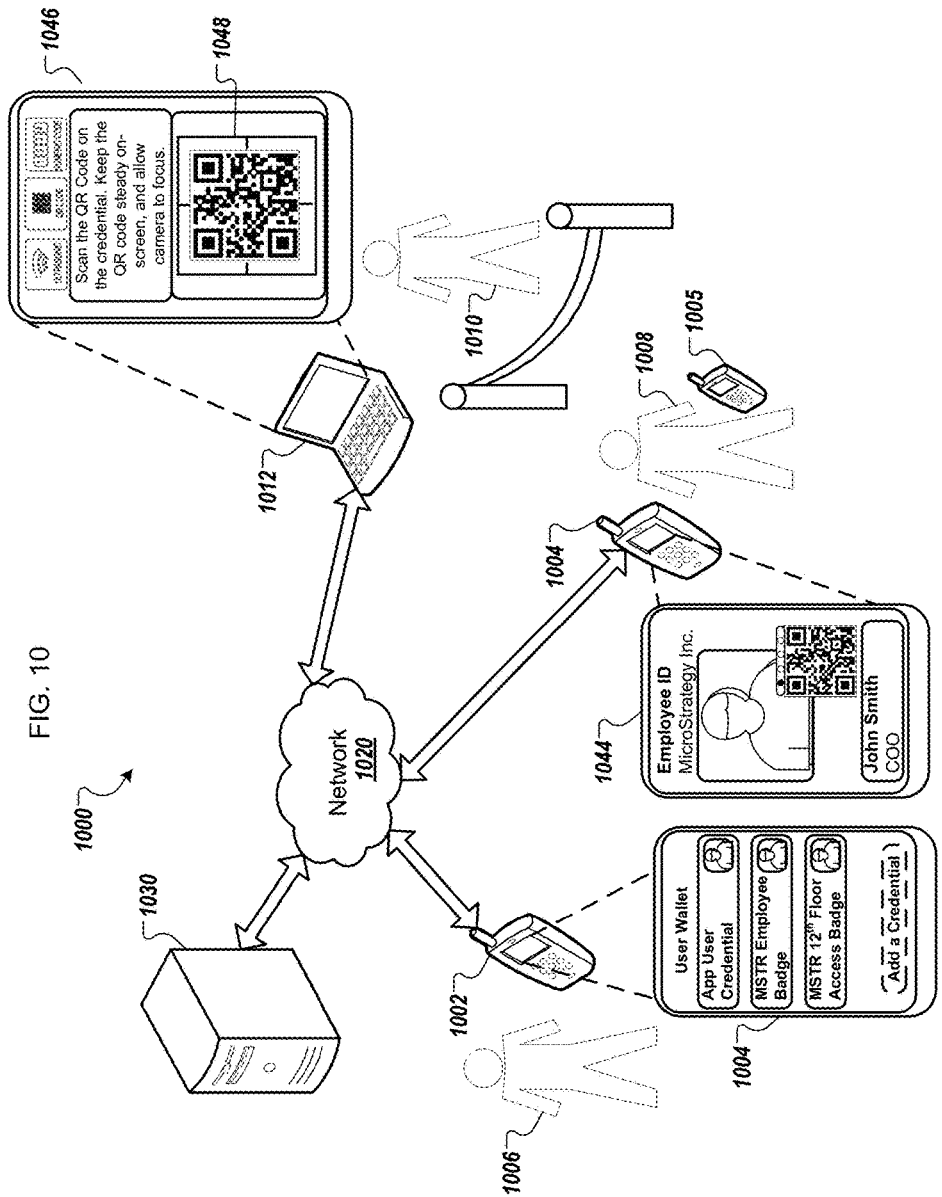
FIG. 10 is an illustration of an example of a credential management system.

FIG. 10 is an exemplary illustration of a credential management system 1000. As an overview, a credential management server 1030 (also referred to in this description as "server 1030") communicates via a network 1020 with client device 1002 operated by user 1006, and client devices 1004, 1005 operated by user 1008. For example, the user 1008 may have a work client device 1004 and a personal client device 1005. The client devices 1002, 1004, and 1005 execute credential management applications that allow them to manage, access, and output multiple credentials. The server 1030 also communicates via network 1020 with a processing system 1012 operated by a validation entity 1010. The validation entity 1010 operates the processing system 1012 to validate credentials presented by the users 1006, 1008 on their client devices 1002, 1004, 1005 by communicating with the server 1030, as described below.

In operation, the server 1030 manages and/or stores one or more credentials, associates users and groups of users with appropriate credentials, grants access to user accounts, and provides credentials to users' client devices and/or processing systems (e.g., operated by credential authorities). The server 1030 can be any suitable computer or collection of computers executing software capable of managing, distributing, and/or validating representations of credentials for users and groups of users via a network 1020 as described herein.

Credentials, user accounts, group accounts, and administrative accounts can be stored in a database (e.g., MySQL, PostgreSQL, MS SQL Server, MongoDB), or other suitable data structure that can be accessed by the server 1030. In some implementations, the server 1030 may access the stored credentials and/or user accounts via web services such as representational state transfer (REST) style services.

As an initial step, the server 1030 creates a credential based on input provided by a credential grantor (e.g., an employer). The credential may include a variety of information such as a credential identifier (e.g., a number or alphanumeric character string that uniquely identifies a credential), a description of an event or location, and one or more designated validation entities.

The server 1030 may present a suitable interface to the credential grantor for creation of credentials. For example, the server 1030 may present a web interface through which grantors can interact via a Web browser. In other aspects, the server 1030 may be directly accessible via a graphical-user interface or an application running on a mobile device. Any suitable interface can be used that enables the creation and storage of credentials, and user accounts. In addition (or as an alternative) to creation of credentials by credential grantors, credentials could be created at the request of registered users through a web-based or other interface, or through any other suitable mechanism such as sending email or short message service (SMS) transmissions to grantors. In some implementations, registered users may be able to create credentials by use of an application running on a client device.

The server 1030 also may present an interface so that users and/or credential grantors can create user accounts for individual users and groups of users. For example, the server 1030 may present a web interface through which credential grantors can interact via a Web browser. Additionally or alternatively, the server 1030 may be directly accessible via a graphical-user interface or an application on a mobile device. User accounts may be stored in a table or collection of tables in a database, or in any other suitable data structure accessible by the server 1030. The user accounts may include a variety of information such as user name, user title, user identifier (e.g., a number or character string that uniquely identifies a user), one or more addresses (e.g., email addresses and/or mobile phone numbers), identifiers of one or more client devices owned by or otherwise associated with the user (e.g., registered to or owned by a user, or listed in a user account), and/or certificates associated with client devices. In some implementations as described below, user accounts may also be associated with a biometric profile of the user. In addition (or as an alternative) to creation of user accounts and groups by grantors, user accounts and groups can be created at the request of potential users through a web-based or other interface, or through any other suitable means such as sending email or SMS to grantors. In some implementations, the potential users may be able to create user accounts by use of an application running on a client device 1002, 1004.

To create a new user account with the server 1030, the credential management application may require a new user 1006, 1008 to complete an initial account registration. As part of the initial account registration process, the new user 1006, 1008 may be required to provide biometric information (e.g., a voice sample, fingerprint, retina scan, and/or facial scan, etc.) to the credential management application, which can be transmitted to the server 1030. Subsequently, the server 1030 can generate a biometric profile of the user 1006, 1008 based on the biometric information and associate the biometric profile with the user's account. For example, the user 1006, 1008 may be required to provide a voice sample by uttering a phrase into a microphone of the user's client device 1002, 1004. The client device 1002, 1004 may transmit this voice sample to the server 1030, which can extract features from the voice sample to generate a voice print that identifies the user. The credential management application may automatically register the client device from which the new user completes the initial account registration process as an authorized device for the new user's account.

Upon completion of initial account registration, the server 1030 may transmit a certificate to the client device 1002, 1004 that was used for the registration, for example via the network 620. The server 1030 also may associate the certificate with the user's account and the particular client device. For example, the server 1030 may store the certificate in a memory structure (e.g., a file system or database) and add an entry to the user's account identifying the certificate. A certificate may be, for example, a public key certificate and/or an authorization certificate. In some implementations, a certificate may be in a format specified in the X.509 ITU-T standard.

A public key certificate may be an electronic document that uses a digital signature to bind a public key with an identity. In particular, a public key certificate may include information such as a unique certificate identifier, a user name or user account number, a signature algorithm (RSA, Digital Signature Algorithm (DSA), or Elliptic Curve Digital Signature Algorithm (ECDSA)), a signature, an issuer name, and a public key. The public key certificate can be used to verify that a public key belongs to a user. In a typical public key infrastructure scheme, the signature will be of a certificate authority. In a web of trust scheme, the signature is of either the user (a self-signed certificate) or other users. In either case, the signatures on a certificate are attestations by the certificate signer that the identity information and the public key belong together.

An authorization certificate may be an electronic document that includes authorization information associated with a holder of the certificate. For example, the authorization certificate may indicate that the holder of the certificate is authorized to access a resource, service, or location. In particular, an authorization certificate may include information such as an issuer name, a signature algorithm, a signature, a unique certificate identifier, and identifiers of the resources, services, or locations that the certificate authorizes access to.

An individual may be able to access the individual's user account and credentials from multiple different client devices. When a user 1006, 1008 attempts to login to the application from a client device 1002, 1004 that the user has not previously registered with the credential management server 1030, the credential management application may recognize the client device as a new device. For example, the application may determine that the new device lacks a certificate from the server 1030 by querying a memory location where the certificate would be stored. As a result of determining that the device is a new device, before allowing the user to access the user's account, the credential management application may require the user to authenticate himself/herself at the new device.

In particular, the credential management application may require the user to provide biometric identification (e.g., an utterance, fingerprint, retina scan, and/or face scan, etc.). For example, the credential management application may prompt the user 1006, 1008 to utter a phrase. As referred to herein, a phrase may be a sequence of two or more words selected from one or more dictionaries of words that need not form a grammatical construct. A dictionary as used herein is a data structure in which index values identify words. A dictionary may include different words and their corresponding definitions. In some implementations, the application on the client device 1002, 1004 may select a phrase based on an index that can be randomly generated or generated based on a current time. In some implementations, the user may utter a phrase of their choosing. Alternatively or in addition, the server 1030 may select a phrase and transmit the phrase to the credential management application on the client device 1002, 1004, where the phrase can be displayed to the user. Moreover, in some implementations, rather than transmitting the phrase directly to the credential management application on the client device 1002, 1004, the server 1030 may transmit the phrase to an email address or mobile phone number (via SMS for example) associated with the user account. Advantageously, transmitting the phrase in this manner may provide an additional level of authentication because the user will have to access the email account or SMS inbox to obtain the phrase.

When the user utters the phrase into a microphone of the client device 1002, 1004, the application may encode the utterance and transmit data representing the utterance to the server 1030. The server 1030 can then perform speaker recognition on the phrase uttered by the user 1006, 1008 to authenticate the user. For example, the server 1030 can retrieve a voice print associated with the user's account from a memory structure (e.g., a file system or database), and then compare the characteristics of the utterance with the user's voice print. Alternatively or in addition, the client device 1002, 1004 may obtain a voice print of the user (e.g., receive the voice print from the server 1030 or from a third-party server that stores user voice prints), and then perform speaker recognition using the obtained voice print.

Alternatively or in addition, the user may provide an iris image, a fingerprint image, and/or a facial image for authentication. For example, the user may take an image of the user's eye or face using a camera attached to the client device 1002, 1004. The image may then be transmitted to the server 1030 for verification or verified on the client device 1002, 1004. In some implementations, the client device 1002, 1004 may have a fingerprint scanner operatively coupled to the device, in which case the user 1006, 1008 may provide a scan of one or more fingerprints. The fingerprints can then be transmitted to the server 1030 for verification or verified on the client device 1002, 1004.

In some implementations, the credential management application may employ multi-factor authentication to authenticate a user at a new device. For example, the user may have to provide two or more inputs to authenticate a new device. These inputs may include any suitable combination of: an utterance, an alphanumeric code sent to an email address associated with the user account, an iris scan, a fingerprint scan, and/or a facial scan. For example, the server 1030 may transmit an alphanumeric code to an email address or mobile phone number (via SMS for example) associated with the user account, and require both the alphanumeric code and an utterance that matches the voice print associated with the user account to register a new device.

Multiple different users may be able to register the same client device for use with multiple different user accounts, respectively, for example if several users share the same client device. In particular, each user may login to their user account from the same client device and authenticate himself/herself and receive a certificate associated with their user account as described above. The client device may then store the certificates for the different users in memory. When a user attempts to access the user's user account from the client device, the application can then retrieve the relevant certificate for the user.

Some implementations may include a master client device associated with a user account that has additional privileges. For example, the master client device may have the capability to confirm that a client device may be registered with a user account and/or may be able to deactivate registered client devices. In particular, when a user attempts to login to the user's user account from a new device, in addition to the biometric verification discussed above, the server 1030 may notify the master client device and require confirmation from the master client device prior to registering the new device. The master client device also may deactivate a client device registered with a user account, for example, by transmitting a deactivation message to the server 1030, which then removes the client device from a list of client devices that are permitted to access the user account. The master client device may be the original client device used to setup the user account by default, or may be another device chosen by the user. In some implementations, the server 1030 may require additional levels of authentication to setup or change a master client device. For example, if the server 1030 requires only an utterance to register a normal client device, the server 1030 may require both an utterance and an alphanumeric code transmitted to an email address associated with the user account to establish (e.g., register or change) a master client device.

Upon successful authentication, the server 1030 registers the new device 1002, 1004 as an authorized device for the user's account and transmits a certificate to the new device as described above. The certificate subsequently enables the application to recognize the device as having been registered with the user's account.

In some implementations, a user can have the certificate deleted from a client device. This may provide additional security by causing a user to perform another authentication to access their user account from the device. For example, the client device may automatically delete a certificate from a client device when a user logs out of the user's account from the device. Alternatively or in addition, the user may cause a certificate to be deleted from a client device as part of deactivating the client device from a master client device as described above. In addition, a user may choose to delete a certificate from a client device as an option when the user is logged into their user account from the device.

As an example, Mr. John Smith (user 1008) may request to setup a new user account on the server 1030 using an application executing on his work client device 1004. The client device 1004 prompts Mr. Smith to provide biometric information (e.g., an utterance, a fingerprint, facial scan, and/or iris scan), which is transmitted to the server 1030. The server 1030 can then create database entries representing a user account for Mr. Smith, where the user account includes a biometric profile incorporating the provided biometric information. A credential grantor could then create a row in another table for a group identified as employees of Company X. The grantor and/or server 1030 could then link the database entry for Mr. Smith to the group account for Company X through use of a linking table. Finally, the server 1030 may transmit a certificate to the client device 1004 that allows Mr. Smith to access his new user account from device 1004 without providing biometric identification.

Subsequently, Mr. Smith attempts to access his user account using a credential management application on his personal client device 1005. The client device 1005 (or the server 1030) recognizes that the client device 1005 is not registered with his user account (e.g., by determining that the client device 1005 lacks a certificate associated with the user account). Accordingly, the application on client device 1005 prompts Mr. Smith to provide biometric information to verify his identity. The client device 1005 then transmits this biometric information to the server 1030, which compares the biometric information with the biometric profile associated with Mr. Smith's account to verify Mr. Smith's identity. Finally, the server 1030 transmits a certificate to Mr. Smith's personal client device 1005, thus enabling Mr. Smith to access his user account from device 1005.

Once credentials and user accounts have been created, credential grantors and/or users can associate the credentials with user accounts, or groups of users. For example, the server 1030 may present a web interface through which grantors can interact via a Web browser to link a given credential to a given user or group of users. In other aspects, the server 1030 may be directly accessible via a graphical-user interface or an application on a mobile device. Credentials may be associated with users, or groups of users, for example, by generating a credential identifier for a given user or group of users, and associating the credential identifier with the user or group of users by storing an entry for the credential identifier as a database entry related to a credential. In addition to association of credentials to users and groups of users by grantors, registered users also may request that certain users, or groups of users, be associated with certain credentials through a web-based or other interface, or through any other suitable means such as sending email or SMS transmissions to grantors. In some implementations, users may be able to associate their user accounts with one or more credentials by use of an application running on a client device. Furthermore, the server 1030 also may notify the users that they have been associated with the credential(s), for example by pushing notifications to the respective users' client devices. Such notifications may include the credential identifier.

Once credentials have been associated with appropriate user and/or group accounts, the credentials can then be distributed to client devices for the appropriate users via the network 1020. For example, the network 1020 may be a local area network ("LAN") and a wide area network ("WAN"), e.g., the Internet. In some versions, the server 1030 may communicate with the client devices via SMS or multimedia messaging service (MMS). The server 1030 may access user accounts in a database to locate the appropriate users' client devices.

Credential management applications executed on client devices 1002, 1004, and 1005 can receive the credentials associated with their respective users 1006, 1008 and store them in any suitable memory for later retrieval. A given user 1006, 1008 may be associated with multiple different credentials. Some or all of the credentials associated with a user 1006, 1008 may be accessible on a user's client device 1002, 1004, and 1005. In particular, credential management applications executing on the client devices 1002, 1004, 1005 can then retrieve the credentials so they can be used for generating and presenting a representation of the credential to a validation entity for validation. The client devices 1002, 1004, 1005 may be any type of computing device, including but not limited to a mobile phone, smart phone, PDA, music player, e-book reader, tablet computer, laptop or desktop computer, or other stationary or portable device, that includes one or more processors and non-transitory computer readable storage media. The software application can be written in any suitable programming language such as, for example, Objective-C, C++, Java, etc.

In some implementations, each time a user 1006, 1008 attempts to access a user account (e.g., to present credentials or manage a user account) from a client device 1002, 1004, the client device 1002, 1004 may transmit a request for authorization to the server 1030. If the client device 1002, 1004 has previously been associated with the user account, the client device 1002, 1004 may have a certificate stored in memory, which can be included with the request to the server 1030. The server 1030 then can verify that the client device 1002, 1004 was associated with the user account by confirming the validity of the certificate. For example, the server 1030 may confirm that information in the certificate (e.g., a certificate serial number and/or signature) matches information from a certificate previously issued by the server 1030 that is associated with the user's account. If the server 1030 verifies that the client device 1002, 1004 is associated with the requested user account, the server 1030 may grant access to the account, for example by transmitting a message to the client device 1002, 1004 including the requested information.

In some implementations, the server 1030 may monitor usage of each registered client device. For example, each time a user logs into the user's user account from a registered client device, the server 1030 may store an entry in a memory structure (e.g., a database or a flat file) storing details of what device was used, and where and when the user logged in (e.g., a device identifier, a user name, user account identifier, email address, location, date and/or time). In particular, when a client device 1002, 1004 submits a login request, the request may include a current location of the client device, for example, based on GPS coordinates, Wi-Fi access point triangulation data, cellular network triangulation data, or IP address information. The server 1030 may also store entries when a client device outputs a representation of a credential for validation (e.g., displays a badge), or signs a document using a credential. For example, when the credential management application on a client device 1002, 1004 outputs a representation for a credential or signs a document using a credential, the client device may transmit information to the server 1030 describing the use (e.g., a device identifier, a user name, user account identifier, the type of use, email address, location, date and/or time). In some cases, when a credential is presented for validation, a processing system 1012 operated by the validation entity may transmit the usage information to the server 1030. In some cases, when a user interacts with other users through the user's client device, information regarding the interaction may be provided to the server 1030. User interactions may include, for example, sending a message or a file to another user, placing a call to another user, or obtaining information regarding another user's identity and interactions. The server 1030 may store an entry including these details.

Additionally, the server 1030 may provide access to the account usage information. For example, when a user logged into a registered client device 1002, 1004 requests account usage information (e.g., by activating command button 710 in FIG. 7 to display device management information), the client device may request account usage information from the server 1030. The server 1030 retrieves the account usage information associated with the account (e.g., by querying a database or accessing a flat file) and then transmits the requested information back to the client device 1002, 1004. The client device 1002, 1004 can then display the account usage information on a user interface, for example as shown in FIG. 9.

FIG. 10 illustrates an example in which the credentials correspond to employee badges for gaining entry into a place of business. Users 1006, 1008 are employees and, consequently, have received credentials related to the business. In addition, the client devices 1002, 1004 have already been registered with the user accounts of their respective users. Accordingly, the client devices 1002, 1004 have certificates stored in memory that allow credential management applications on the client devices 1002, 1004 to access credentials and account management features of the respective user accounts.

For example, the client device 1002 of user 1006 is executing an application that displays a user interface 642 (similar to the user interface 500 shown in FIG. 5) including a user wallet that allows the user 1006 to select from among various credentials. The client device 1004 of user 1008 is executing an application that displays a user interface 1044 such as the employee badge shown in FIG. 6. The user interface 1044 includes a quick response (QR) code. User 1008, at the front of the entry line, has presented the QR code for validation to the validation entity 1010. The validation entity 1010 is a security guard responsible for permitting only authorized individuals to enter the place of business. The credential for accessing the place of business may be represented in a variety of different formats described below, and the validation entity 1010 may be able to validate representations of the credential in any of these different formats.

In some implementations, the client device 1002, 1004 may obtain the user's image from, for example, a memory of the client device 1002, 1004, or a server such as the server 1030. The client device 1002, 1004 may display this image before, after, and/or during presentation of the optical machine-readable representation for authentication of the user 1006, 1008.

After a user 1006, 1008 logs into a user account from the user's client device 1002, 1004 (e.g., by transmitting a request for access to the server 1030 that includes a certificate), the user 1006, 1008 may operate their client device 1002, 1004 to present representations of credentials for validation. For example, the user 1006, 1008 may input a command into the user's client device 1002, 1004 via a man-machine interface (e.g., a user interface on a presence-sensitive display) to select a desired credential. The credential management application executing on the client device 1002, 1004 then generates and outputs the selected representation to a validation entity 1010 for validation.

The representation of a credential may take a variety of different forms. For example, the representation may be an alphanumeric code, a sound signal (e.g., an audible sound signal or an ultrasonic sound signal), an optical machine-readable representation (e.g., a barcode or a quick response (QR) code), a parametrically-generated graphical representation, an animated graphic representation, and/or a phrase, among others.

As referred to herein, an alphanumeric code may be a sequence of numbers and/or letters (e.g., 4 to 24 characters) that is associated with a credential and a user. In some instances, a given alphanumeric representation will only be valid for a certain time period. In operation, applications for credential validation execute on the client device 1002, 1004 and the processing system 1012. The server 1030 associates an alphanumeric code with a user 1006, 1008 and a credential, and distributes the alphanumeric code to the user's client device 1002, 1004. When the user 1006 presents the alphanumeric code to the validation entity 1010, the processing system 1012 can validate the alphanumeric code by communicating with the server 1030, and receiving a response indicating whether the presented alphanumeric code matches a valid alphanumeric code (e.g., an alphanumeric code that currently is associated with a user to whom a valid credential has been granted at the point in time the processing system 1012 communicates the alphanumeric code to the server 1030).

As referred to herein, an optical machine-readable representation may be an arrangement of graphical elements that encode alphanumeric data, where the elements are arranged so that the data can be read by an optical scanner. For example, an optical machine-readable representation may be a bar code, a QR code, or an Aztec code, among other optical machine-readable representations. The optical machine-readable representations may encode data including or representing credential identifiers and any other suitable data. In other implementations, the optical machine-readable representations may encode other identifiers that are linked to or otherwise associated with credential identifiers. As an example, credential identifiers for the users 1006, 1008 may be encoded using QR codes.

The client device 1002, 1004 may use any suitable technique for encoding the optical machine-readable representation. For example, the client device may call a function or library routine that encodes QR codes in accordance with the QR code International Organization for Standardization (ISO) standard, ISO/IEC 18004:2006 RSS, Information technology—Automatic identification and data capture techniques—QR Code 2005 bar code symbology specification.

When the client device 1002, 1004 displays an optical machine-readable representation, the validation entity 1010 can operate the processing system 1012 to scan the portion of the client device's display showing the representation and decode the representation to generate a set of alphanumeric characters that were encoded in the representation. In particular, the processing system 1012 may provide a user interface 1046 that includes a reticle 1048 defining a field of view from a camera operatively coupled to the processing system 1012. This reticle can be used by the validation entity 1010 to scan the optical machine-readable representation from the relevant portion of the client device's display 1044.

The processing system 1012 may use any suitable mechanism to scan and decode the optical machine-readable representation. For example, the processing system 1012 may access a function or library routine that captures and decodes QR codes and/or barcodes using a camera operatively coupled to the processing system 1012. Suitable libraries may include, for example, RedLaser or Zxing.

The processing system 1012 can then validate the optical machine-readable representation by communicating data corresponding to the alphanumeric characters that were encoded in the representation to the server 1030. In response, the processing system 1012 receives a response indicating whether the presented optical machine-readable representation corresponds to a credential that currently is associated with a user to whom a valid credential has been granted at the point in time the processing system 1012 communicates the alphanumeric code to the server 1030.

As described herein, a sound signal is an oscillation of pressure waves transmitted through the air that are modulated to encode information. Any suitable modulation scheme could be used, such as, for example, frequency shift keying (FSK) or phase-shift keying (PSK). In some implementations, the sound signal may be in the ultrasonic frequency range, e.g., greater than about 20 kHz. In some implementations, the sound signal may be in the audible frequency range, e.g., about 20 Hz to about 20 kHz.

The sound signal may encode data including or representing credential identifiers and any other suitable data. In other implementations, the sound signal may encode other identifiers that are linked to or otherwise associated with credential identifiers. As an example, credential identifiers for the users 1006, 1008 may be encoded using sound signals. The client device may use any suitable technique for encoding the sound signal. For example, the client device may call a function or library routine that encodes data into sound signals such as the Zoosh SDK by Naratte, Inc. The client device 1002, 1004 can then output the sound signal from a speaker coupled to the client device for reception by the processing system 1012.

When the client device 1002, 1004 outputs a sound signal, the validation entity 1010 can operate the processing system 1012 to receive the sound signal at a speaker of the processing system and decode the sound signal to generate a set of alphanumeric characters that were encoded in the sound signal. The processing system 1012 may use any suitable mechanism to receive and decode the sound signal. The processing system 1012 can then validate the alphanumeric characters by communicating with the server 1030. In response, the processing system 1012 receives a response indicating whether the alphanumeric characters encoded in the sound signal correspond to a credential that is currently is associated with a user to whom a valid credential has been granted at the point in time the processing system 1012 communicates the alphanumeric characters to the server 1030.

As referred to herein, a parametrically-generated graphical representation may be a visual display that is generated using one or more parameters as inputs to one or more mathematical equations, such as a three-dimensional rendering of an object or an image of a fractal. In certain implementations, the parameters can be generated from seed values such as a credential identifier and a time. In operation, the client device 1002, 1004 can obtain a credential identifier (e.g., from a memory of the client device) and a time (e.g., from a timing device of the client device), and generate a parametrically generated graphical representation for the credential using the credential identifier and time as seed values. Similarly, for validation, the processing system 1012 obtains a credential identifier and a time, and generates a parametrically generated graphical representation for the credential in the same manner. When the timing device at the processing system 1012 is synchronized with the timing devices at client device 1002, 1004, the parameters generated at the processing system 1012 should be identical (or nearly identical) to those of the client device 1002, 1004 when the credential identifiers are the same. The graphical representation generated by processing system 1012 should therefore match the graphical representations on the client device 1002, 1004 allowing the validation entity 1010 to visually validate the credential on the client device 1002, 1004.

As referred to herein, an animated graphical representation may be, for example, a hypertext markup language (HTML) animation, animated graphical interchange format (GIF) file, Motion Pictures Expert Group (MPEG) file, Adobe Flash® animation, or any combination thereof. An animation may be, for example, a sequence of images defined by one of these files. Applications executing on the client device 1002, 1004 may access the stored graphical representations by way of index values, where an index value may correspond to a single representation. In operation, a client device 1002, 1004 obtains a credential identifier (e.g., from a memory of the client device) and a time (e.g., from a timing device of the client device), and selects an animated graphical representation for the credential by using the credential identifier and the time to generate an index value. Similarly, for validation, the processing system 1012 obtains a credential identifier and a time, and selects an animated graphical representation for the credential in the same manner. When the timing device at the processing system 1012 is synchronized with the timing device at client device 1002, 1004 the index values generated at the processing system 1012 should be substantially identical to those of the client device 1002, 1004 when the credential identifiers are the same. The graphical representation selected by processing system 1012 should therefore match (or nearly match) the graphical representations on the client devices 1002, 1004 allowing the validation entity 1010 to visually validate the credential on the client device 1002, 1004.

A phrase may be a sequence of two or more words selected from one or more dictionaries of words that need not form a grammatical construct. In operation, applications for credential validation executing on the client device 1002, 1004 and the processing system 1012 can access a common set of dictionaries for generating phrases, so that when the applications reference the same index values in the same dictionaries, at substantially the same time, they can select the same phrases. Thus, the processing system 1012 displays the same phrase as the client devices 1002, 1004 which enables the validation entity 1010 to validate the phrases at the client device 1002, 1004.

When the server 1030 receives a validation request message from the processing system 1012, it attempts to confirm that the presented representation of the credential is valid. In particular, the server 1030 may decode a set of alphanumeric characters and/or parse an alphanumeric code to obtain the credential identifier. The server 1030 can then access the corresponding credential using the credential identifier (e.g., from a database by querying using the credential identifier). Upon retrieving the credential, the server 1030 can determine whether the presented representation for the credential was valid by comparing data received in the validation request message with data associated with the retrieved credential. For example, the server 1030 may determine that a user identifier included in the validation request corresponds to an authorized user of the credential. In some implementations, the processing system 1012 may perform some or all of the validation of the representations for the credential.

In some implementations, if the credential representation is validated, the validation response may include an image, a name, and/or other data relating to the validated user including, e.g., a copy of the user's credential. The server

1030 may obtain information relating to the user (e.g., an image of the user) from the credential grantor as described above. For example, the processing system 1012 may display the user's name and the user's image. In some implementations, responsive to receiving a validation response from the server 1030, the processing system 1012 may obtain the user's image from, for example, a memory of the processing system 1012, the server 1030, a server made accessible by the credential grantor, or another server. The processing system 1012 may then output the user's image to a display operatively coupled to the processing system 1012.

Upon successful validation, the server 1030 sends the processing system 1012 a validation response indicating that the representation for the credential was valid (e.g., the set of alphanumeric characters decoded from the representation matches a set of alphanumeric characters generated at the server 1030). The processing system 1012 may then provide an indication to the validation entity 1010 that the representation presented by the user 1008 was valid. The validation entity 1010 may then permit the user 1008 to enter the place of business.

While shown in FIG. 10 as a person, the validation entity 1010 can be any agent capable of validating representations of credentials presented by users. As an example, the validation entity 1010 could be a software application executing on the processing system 1012 that processes a representation for a credential received from a client device 1002, 1004, decodes the representation to generate an alphanumeric set of characters, transmits the alphanumeric set of characters to the server 1030, and receives a response from the server 1030 indicating that the representation is valid. The software application could then control an automated gate to permit user 1008 to enter. The processing system 1012 can also be any suitable computer or set of computers capable of communicating with the server 1030 via network 1020, such as a mobile phone, smart phone, PDA, tablet computer, laptop or desktop computer, or other stationary or portable device, that includes one or more processors and non-transitory computer readable media.

Representations for multiple credentials may be displayed and/or presented concurrently. This may be implemented, for example, when credentials represent a hierarchy of access. As an example, if Mr. John Smith is an employee of MicroStrategy Incorporated and also is authorized to access the Executive Suite of MicroStrategy's headquarters, he may have two credentials, i.e., a first credential identifying Mr. Smith as an employee who is authorized to enter the headquarters, and a second authorizing Mr. Smith to access the Executive Suite. In such implementations, representations for the first credential and the second credential may both be presented at the same time or in series so that a validation entity can permit Mr. Smith access to the Executive Suite.

Figure 11:
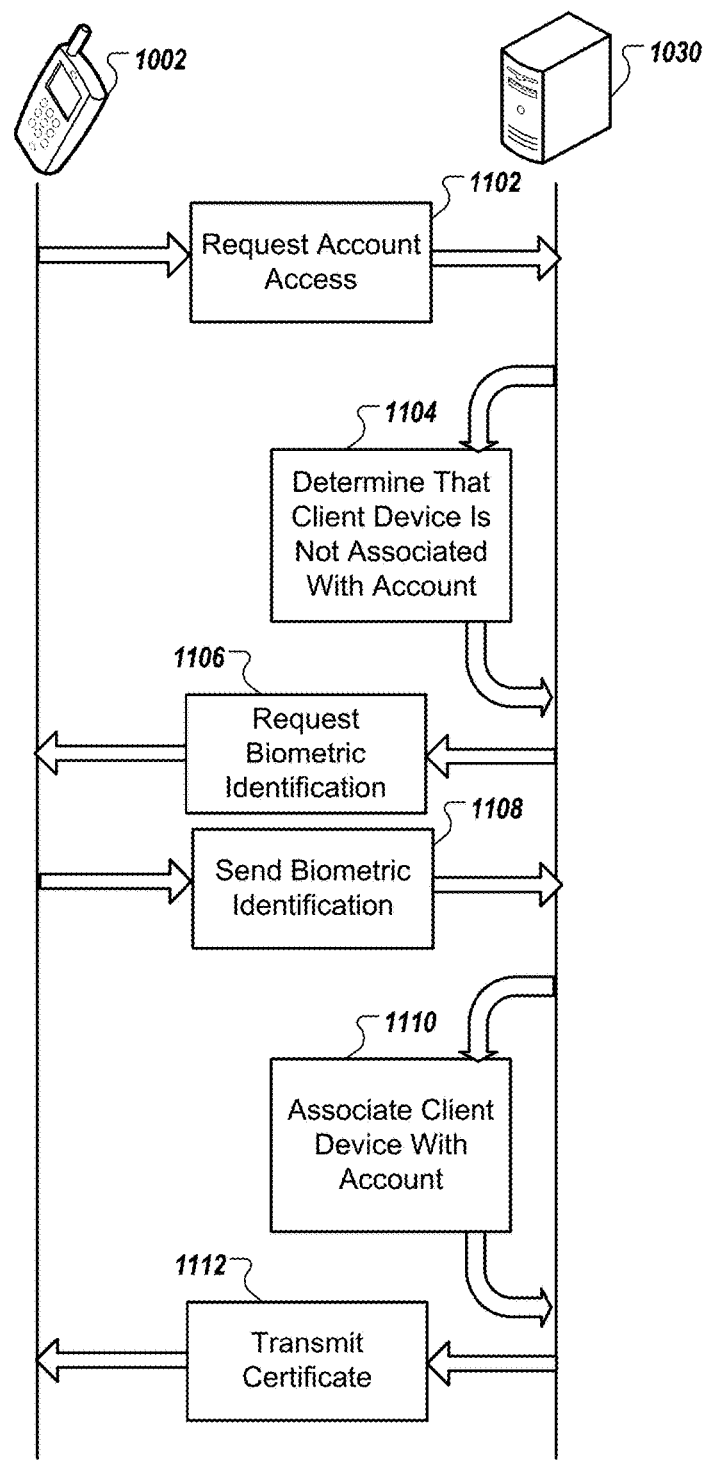
FIG. 11 is a messaging diagram that illustrates examples of messages between a client device and a server in a credential management system.

FIG. 11 shows examples of messages between a client device 1002 and a server 1030 in a credential management system. The messages described below may be transmitted via any suitable protocol such as, for example, hypertext transfer protocol (HTTP) or SMS. Additionally, these example messages should not be considered limiting, as any suitable mechanism for performing the functions described could be used, and the messages could be sent or received in any suitable sequence.

Initially, a user 1006 operates a client device 1002 to attempt to access a user account of a credential management application. The client device 1002 transmits a message 1102 to the server 1030 requesting account access (e.g., by providing an e-mail address or username and a password). In response, in step 1104, the server 1030 determines that the requesting client device 1002 is not currently associated with the specified user account. The server 1030 then transmits a message 1106 to the client device 1002 notifying the user 1006 that the client device is not currently associated with the account, and prompting the user to provide biometric identification (e.g., an utterance, facial scan, iris scan, and/or fingerprint) to authenticate the user. As discussed above, the user 1006 provides the requested biometric identification and the client device 1002 transmits this information to the server 1030 in message 1108.

Upon confirming that the provided biometric identification matches a biometric profile associated with the user account, the server 1030 associates the client device 1002 with the user account in step 1110. For example, the server 1030 may compare characteristics of an utterance from the user 1006 with a voice print to confirm the identity of the user. Once the client device 1002 is registered with the user account, the server 1030 transmits a certificate to the client device 1002 in message 1112. Subsequently, the client device 1002 can access the user account using the certificate without having to provide biometric identification. The process described in relation to the messages in FIG. 11 could be repeated for multiple different users of the client device 1002 to register the device 1002 with their accounts. In addition, this process could be repeated at multiple different client devices for the same user to register the different client devices with his/her user account.

Figure 12:
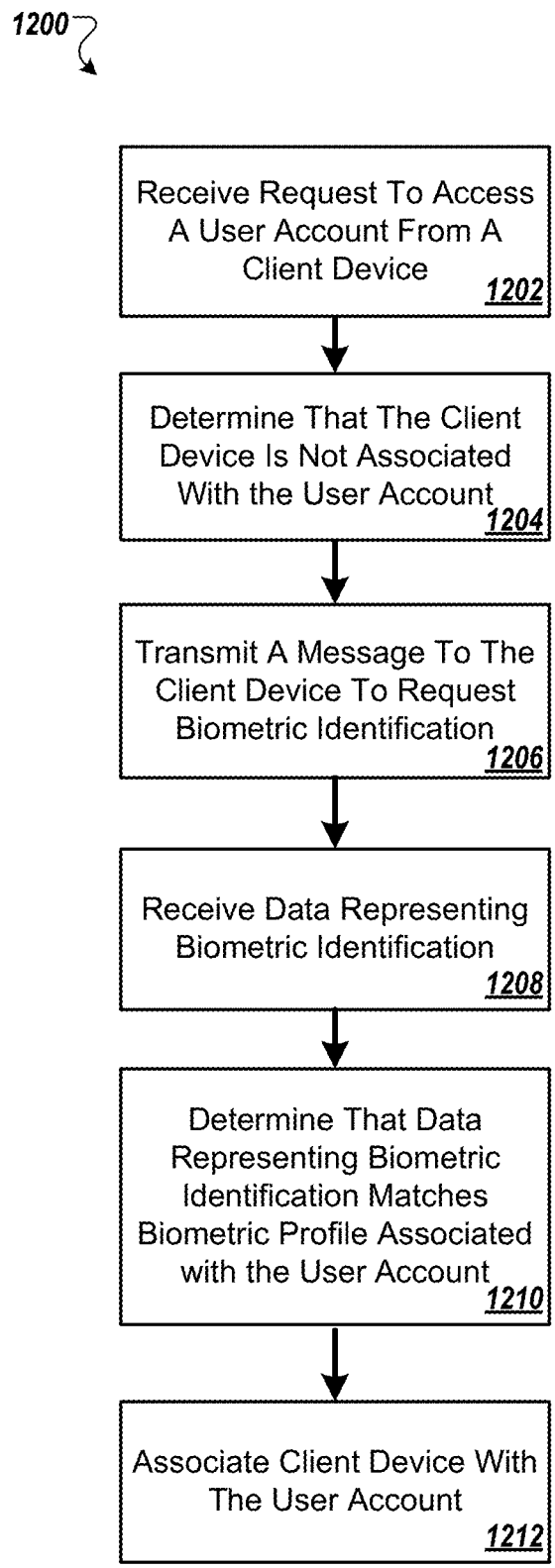
FIG. 12 is a flowchart of an example process for granting access to a user account.

FIG. 12 shows an example process for granting access to a user account. In step 1202, a server 1030 receives a request from a client device 1002 to access a user account of a user (e.g. by providing an e-mail address or username and a password). The user account provides access to one or more credentials associated with the user.

In step 1204, the server 1030 determines that the client device 1002 is not associated with the user account. For example, the server 1030 may determine that the request from the client device does not include a certificate associated with the user account. Alternatively or in addition, the request may include a client device identifier of the client device 1002, and the server 1030 may determine that the client device identifier is not associated with the user account.

In response to determining that the client device is not associated with the user account, in step 1206, the server 1030 transmits a message to the client device 1002. The message prompts the user to provide biometric identification. For example, the message may prompt the user to utter a phrase so as to provide a voice sample. The phrase may be one or more words randomly selected by the server or the client device from one or more dictionaries, or may be chosen by the user. The message may be transmitted for in-app display on the client device, or may be transmitted via email to an email address associated with the user account. Alternatively or in addition, the message may prompt the user to provide a fingerprint, provide an iris scan, and/or provide a facial scan.

In step 1208, the server 1030 receives data representing biometric identification of the user from the client device 1002. For example, the server 1030 may receive data encoding a voice sample corresponding to an utterance of a phrase, a fingerprint, an iris scan, and/or a facial scan. The server 1030 then determines that the data representing the biometric identification of the user matches a biometric profile of the user associated with the user account in step 1210. For example, the server 1030 may determine that the voice sample of the user matches a voice print of the user.

In implementations where the phrase was transmitted to an email address associated with the user account (or some other destination accessible by the user associated with the user account), the server 1030 may also perform speech recognition to determine whether the voice sample of the user corresponds to an utterance of the phrase from the email transmitted to the email address associated with the user account. Alternatively or in addition, the server 1030 may determine that a fingerprint from the client device matches a fingerprint associated with the user account, that an iris scan from the client device matches an iris image associated with the user account, and/or that a facial scan from the client device matches a facial image associated with a user account.

Finally, in response to determining that the data representing the biometric identification of the user matches a biometric profile of the user associated with the user account, the server 1030 associates the client device 1002 with the user account in step 1212. As a result, the user is enabled to access the user account, and the associated one or more credentials, from the client device 1002. In some implementations, after determining that the data representing the biometric identification of the user matches a biometric profile of the user associated with the user account, the server 1030 transmits a certificate associated with the user account to the client device 1002.

After the client device 1002 has been associated with the user account, the client device 1002 may send a second request to access the user account, where the second request includes a certificate associated with the user account. The server 1030 receives this second request from the client device 1002 and determines that the client device is associated with the user based on the certificate (e.g., by comparing information in the transmitted certificate with information accessed by the server 1030 for a corresponding certificate associated with the user account). The server 1030 then provides the client device 1002 with access to the user account.

After the client device 1002 has been associated with the user account, the client device 1002 may transmit a request to the server 1030 to perform an action associated with the user account, where the request may include a certificate. For example, the client device 1002 may request to access credentials associated with the user account or view usage information of the user account. The server 1030 then determines that the client device 1002 is associated with the user account based on the certificate. Accordingly, the server 1030 authorizes the client device 1002 to perform the requested action and stores an indication (e.g., a database entry or flat file entry) that the action was performed by the client device. The server 1030 also associates the indication with the relevant user account so that it can be retrieved later.

In some implementations, multiple different client devices may be associated with a user account, such that a user can access the user's user account from several devices. For example, if a first client device 1004 is not currently associated with a user account, then the user may authenticate the user's identity as described above and receive a certificate on the first client device 1004. Subsequently, the user can login to their user account and perform actions (e.g., presenting representations for credentials) from the first client device. The server 1030 can then monitor use of the first client device to access the user account. The user may then authenticate the user's identity and receive a certificate on a second client device, which can then be used to login to their user account and perform actions as described above.

In some implementations, multiple different users may access their user accounts from the same client device. For example, if a client device 1004 is not currently associated with a user account of a first user, then the first user may authenticate the first user's identity as described above and receive a certificate for the first user's user account on the client device 1004. Subsequently, the first user can login to the first user's user account and perform actions (e.g., presenting representations for credentials) from the first client device. The server 1030 can then monitor use of the client device to access the first user account. A second user may then authenticate the second user's identity and receive a certificate for the second user account on the same client device, which can then be used to login to the second user's user account and perform actions as described above.

In some implementations, the server 1030 may transmit an alphanumeric code to an email address associated with the user account to provide an additional level of authentication. The server 1030 may receive an alphanumeric code from the client device 1002, 1004, or 1005 with a request and then determine whether the alphanumeric code received at the server 1030 matches the alphanumeric code transmitted from the server 1030 to the email address associated with the user before associating a client device with the user account.

While described as being performed at the server 1030, the authentication of the biometric information may be performed partially or completely at the client device 1002, 1004, or 1005. For example, the client device 1002, 1004, or 1005 may access biometric identification of the user and compare it with biometric information provided by the user.

According to some implementations, a user may use the credential management application running on the user's client device to discover or search for other users (also known as "peers" or "peer users") associated with a common credential issuing organization. For example, an employee of company M may want to determine which other employees of company M are present at a certain location, such as at a meeting or a convention hall. The employee may use the credential management application running on the employee's device to use the device's network connectivity resources to search for other devices in the immediate neighborhood that have stored credentials issued by company M. A discovered device may send information about its locally-stored credential to the employee's device (validating user's device). The credential management application on the employee's device may validate the received credential information using the credential management system and thus determine whether the credential is issued by company M, and thereby confirm whether another company employee, associated with the validated credential, is present at the convention hall.

As another example, the employee of company M may want to determine which other employees are or were present within a certain geographic distance, such as 3 miles of the office premises, in the last 24 hours. The employee may use the credential management application on the employee's device to send a query to a credential management server for information about the other employees. The server may send back information about company M employees who are determined to have been within 3-mile geographic distance in the last 24 hours. The server may make this determination based on company M employees using their issued credentials to perform some action that is logged by the server. The application on the employee's device may display this information to the employee making the query.

Hereinafter, implementations will be described in which a user with a client device that runs a credential management application issued by a credential management system, may discover other users having credentials issued by the credential management system. In performing the discovery, the credential management application may leverage networking capabilities of the client device.

A user who is validating a credential or searching for other users may also be referred to as a validating user. A user associated with the validated credential discovered in the neighborhood of the validating user may be referred to as a validated or peer user. The client device associated with the validating user may be referred to as a validating client device or validating device. The client device associated with a peer user may be referred to as a peer device. The credential management system may also be referred to as a validation system, the credential management server may be referred to as the server, and the credential management application may be referred to as the application.

FIGS. 14A-14L show screens 1400A-1400L displayed by an example user interface running on a client device that is operable to present representations of credentials and enable searching for other devices that are associated with credentials issued by a common credential issuing organization. The user interface (UI) may be shown on a display coupled to a client device corresponding to user. The UI may be associated with an instance of the credential management application that is executed on the client device.

In some implementations, the credential management application may be a set of instructions that are stored in memory coupled to the client device. The memory may be any suitable combination of flash memory, random access memory (RAM), read-only memory (ROM), electrically erasable programmable read-only memory (EEPROM), or hard disk, among others. The instructions may be executed by one or more processors coupled to the client device.

In some other instances, the credential management application may be implemented as programmable logic on an integrated circuit (IC). For example, the application may be programmed in a field-programmable gate array (FPGA) that is included in the client device and executed by the device in conjunction with other hardware coupled to the device.

Although the following sections describe the example user interface and the credential management application primarily with respect to the validating client device, an instance of the same application may run on any peer device that is registered with a credential issuing organization, and consequently, have one or more locally-stored credentials that are managed by the credential management system. Accordingly, the screens 1400A-1400L of the application user interface also may be shown on the display coupled to the peer device.

FIG. 14A illustrates an example of a credential 1400A shown on the user interface along with an optical-machine readable representation for the credential. The credential may be associated with the user of the local client device on which the example user interface is displayed. Alternatively, the credential may be associated with another user that is obtained by the application executing on the local client device. In some implementations, the local client device may obtain the other user's credential, for example, the other user's client device, while in some other implementations, the client device may obtain the credential from a remote server, such as a server managed by the credential issuing organization.

The credential 1400A includes captions 1402 and 1406; an image 1404; a slider 1408; and a representation for the credential 1410. The caption 1402 provides information identifying the type of the credential and the credential issuing organization. For example, the caption 1402 identifies the credential as an "Employee ID" for "Company M Incorporated."

The image 1404 is an image of the user associated with the credential. In some implementations, the image 1404 allows visual identification of the employee associated with the credential.

The caption 1406 provides the name, or other identifying information, or both for the user associated with the credential. For example, as shown, the caption 1406 provides the name of the employee associated with the credential 1400A as "John Doe" and the employee designation as "Security Team Lead." In general, the caption 1406 may provide various types of information associated with the employee having the credential 1400A.

The slider 1408 may enable a user to select between different representations for the credential 1400A by swiping between different positions of the slider. A representation for a credential may be a depiction or rendering corresponding to the credential that enables the credential to be validated. For example, the slider 1408 may include four positions indicated by the dots included in the slider 1408, as shown in FIG. 14A. In the first position of the slider, the slider 1408 may cause an optical-machine readable representation for the credential 1410 (e.g., a quick response (QR) code) to be displayed, as shown in FIG. 14A. A validating device can scan the portion of the client device's display showing the credential representation 1410 and process the scanned credential representation to validate the credential 1400A.

In some implementations, the slider 1408 may not be present. This may be the case, for example, when credential 1400A includes a single representation, a QR code representation.

In some implementations, there may be multiple credentials associated with the user of the local client device. The different credentials may be stored by the local client device and managed by the credential management application executed on the local client device. These different credentials may be issued by different credential issuing organizations, or by the same credential issuing organization, or by a combination of both. For example, one credential may be a gym membership badge that is issued by a credential issuing organization associated with the user's fitness center. In addition to the "Employee ID" credential 1400A, the local client device may store another credential issued by Company M Incorporated, such as a badge that allows access to a conference room at the company's office building. The user can select any one of these credentials using the application to output a representation of the credential on the application user interface.

In some implementations, the display coupled to the client device may be a presence-sensitive display (for example, a capacitive touch-sensitive display). In such implementations, the user may interact with the user interface of the application by touching areas of the display (e.g., using a finger or a stylus) that show various options presented by different pages of the user interface. For example, the user may provide an input on the user interface to initiate a search for peers who are associated with devices that are also running instances of the credential management application to manage credentials issued by the same credential issuing organization that has issued the user's credentials.

In some implementations, the user may provide input 1412 to initiate a search for peers by touching the user interface while the credential 1400A is displayed, and sliding in one direction (such as horizontally from left to right or right to left, or vertically up or down). Upon receiving the user input, the user interface of the application transitions from displaying the credential 1400A to displaying the screen 1400B shown by FIG. 14B. In general, various types of inputs may be used to transition from the display of the credential 1400A to a screen or interface used to search for peers.

In some implementations, the user may select one of the user's credentials and initiate a search for peers associated with the selected user credential. The use may also configure and/or specify other parameters (e.g., time or day, date, distance from user device, etc.) to further specify the types of peers the user would like to initiate a search for.

Screen 1400B of the user interface may be shown when the application initiates a search for peers upon receiving the input from the user associated with the local client device. Screen 1400B includes tabs 1414 and 1416; and a panel 1418. The panel 1418 displays a notification 1418*a* and a graphical icon 1418*b*.

In some implementations, each tab 1414 or 1416 is associated with a different page that is displayed by the screen 1400B when the corresponding tab is selected by the user. For example, as shown, the tab 1414 has been selected and the panel 1418, which is associated with the tab 1414, is shown on the display.

In some implementations, each tab 1414 or 1416 is associated with a different process for discovering peers. The different processes may correspond to different communication protocols that are used in the discovery. For example, tab 1414 may be associated with a peer discovery process that utilizes a short-range or direct connectivity communication protocol, such as Bluetooth™, Wi-Fi Direct, or near field communication (NFC), among others. In the example shown, the communication protocol used is Bluetooth™. The short-range communication protocol may be useful in a peer discovery process to find peers who are in close physical proximity to the user of the local client device, such that the devices of the peers may communicate directly with the local client device using the short-range protocol.

In contrast, the tab 1416 may be associated with peer discovery process that utilizes a long-range communication protocol or a combination of protocols, such as IEEE 802.11, LTE, WiMAX, other 3G, 4G or 5G protocols, Ethernet, Internet connections, among others. The long-range communication protocol may be useful in a discovery process to find peers who are distributed in a certain geographical region surrounding the local client device, where the geographical region is greater than a range of communication in which the short-range or direct connectivity protocols may be used.

Although screen 1400B shows only two tabs 1414 and 1416, there may be additional tabs present. In some implementations, there may be as many tabs as the number of communication protocols supported for performing the peer discovery. For example, the application may implement each of Bluetooth™, Wi-Fi Direct, IEEE 802.11 and LTE for performing peer discovery searches. In such an implementation, the screen 1400B may include four tabs, one for each supported protocol.

In some implementations, when the user interface of the application transitions to displaying the screen 1400B upon receiving a user input, the peer discovery process is initiated by default using the short-range protocol. In other implementations, upon transitioning to the screen 1400B, the user is provided with an option to select a process to be used for the search.

When the search is performed using the short range protocol associated with the tab 1414, the panel 1418 provides information on the status of the search as the search progresses. For example, when the discovery is performed using Bluetooth™ the panel 1418 may display the notification 1418*a*, which states, "Searching for Nearby Users by Bluetooth." In addition, in some implementations, the panel 1418 may display graphical icon 1418*b* along with an animation of radio waves propagating from the graphical icon, as shown by the screen 1400B.

While the panel displays the graphical icon 1418*b* along with the animation on the screen 1400B, the application controls the network resources of the client device to scan a predetermined first neighborhood around the client device using the short-range communication protocol. In some implementations, the first neighborhood may be determined based on the features of the short-range communication protocol. For example, the first neighborhood may be limited by the maximum geographic distance from the client device up to which signals transmitted by the client device using the short-range communication protocol may be successfully received. In some implementations, the short-range communication protocol used may be a version of Bluetooth™, such as Bluetooth Low Energy (BLE), with the range of the protocol transmission set to, for example, 100 meters.

In some other implementations, the first neighborhood may be configured by the credential issuing organization. For example, the administrator of the credential issuing organization may specify the maximum geographic distance covered by the first neighborhood, and this limit may be observed by the credential management system associated with the application.

The application controls the network resources (e.g., network radio) coupled to the validating device to scan the first neighborhood for signals transmitted by peer devices using the short-range communication protocol. The application listens for a unique identifier that is included in the signal transmissions by the peer devices. The unique identifier may be issued by the credential issuing organization. Receiving the unique identifier in a signal from a peer device indicates to the validating device that the peer device is associated with the credential issuing organization.

In some implementations, in addition to the unique identifier associated with the credential issuing organization, the signal received from a peer device includes information corresponding to a credential issued to the user of the peer device by the credential issuing organization. After confirming that the peer device is associated with the credential issuing organization based on the unique identifier included in the signal received from the device, the application extracts the credential information from the signal and validates the peer device based on this credential information. Validating the peer device can include, for example, verifying that the credential information corresponds to current, valid user account or user profile in the system. If the peer device is successfully validated as being registered with the credential issuing organization, the application displays identifying information corresponding to the peer user on the user interface shown on the display coupled to the validating device. In this manner, peer users in the first neighborhood of the validating device may be discovered and their information displayed on the user interface of the application shown on the validating device.

In some implementations, the application sends the credential information received from the peer device to a validation server associated with the credential management system (e.g., in some implementations, a validation server that is part of or controlled by the credential management system). The application communicates with the validation server over a wide-area network connection that is established using the connectivity resources provided by the client device.

If the validation server determines that the peer credential is valid, the server sends back to the client device, application information indicating that the credential is valid, along with additional identifying information corresponding to the peer user, such as the user's name, occupational title, a graphical image associated with the user (e.g., a photograph), and contact address, among others.

In some implementations, the application validates the received peer credential information locally at the client device, without sending the credential information to the validation server. This may be the case, for example, when the client device does not have a wide-area network connection to communicate with the validation server (for example, the client device is in an "offline" mode), or when there is sufficient additional information available at the client device to validate the credential information without requiring the resources of the validation server, or both. Even if the client device is unable to communicate with the validation server using a wide-area network connection, the short-range communication protocol should be enabled on the client device such that peer discovery of devices in the neighborhood of the client device may proceed.

In some instances, the application may receive from the peer device, in addition to the peer credential, other information that may aid in validating the received credential locally. For example, the peer device may send to the validating client device identifying information corresponding to the peer user, such as the user's name, occupational title, an image associated with the user, and contact address, among others. The client device may use this identifying information to validate the received credential.

When the application has information indicating that the received credential is valid, either based on communication with the validation server or local validation, the application transitions the user interface from the screen 1400B to the screen 1400C that is shown in FIG. 14C, and displays information about the discovered peer user on the user interface.

The screen 1400C includes first panel 1420 and a second panel 1422. The first panel 1420 displays a credential representation 1424 and a graphical icon 1426. The credential representation 1424 includes a graphical image 1424a and other identifying information 1424b. The second panel 1422 includes tiles such as 1422a, 1422b and 1422c, and other descriptive information.

The credential representation 1424 corresponds to the validated credential of the discovered peer user. The representation includes a graphical image 1424a of the peer's credential that is received from the peer device. The identifying information 1424b included in the representation 1424 may be received from the peer device as part of the credential, or it may be received from the validation server when the credential is validated. As shown, in some implementations, the identifying information may include the name of the user (e.g., "John Doe") associated with the credential representation. The identifying information also may include the occupational title of the user (e.g., "Security Team Lead") that is known to the credential management system.

The graphical icon 1426 is a miniature version of the icon and the associated animation shown by the panel 1418. The icon 1426 may indicate that the peer discovery is still in progress as the process attempts to find additional peers in the neighborhood of the local client device, or that the displayed credential representation 1426 has been discovered using the short-range discovery protocol, or both.

In some implementations, the panel 1422 may be displayed at the bottom of the screen 1400C, as shown. However, in other implementations, the panel 1422 may displayed at the top, or on either left or right side, of the screen 1400C. As additional peers are discovered using the short-range protocol, the panel 1422 is populated with tiles 1422a, 1422b, or 1422c, corresponding to the discovered peers.

In some cases, the tiles may be graphical icons 1422a or 1422c that act as placeholders for credential representations. For example, the panel 1422 may be updated as soon as a peer is discovered, but before the credential corresponding to the peer is validated. In such an event, the thumbnail corresponding to this peer will show the graphical icon (e.g., 1422a or 1422c) indicating that the discovered peer's credential has not been validated yet. Once the credential is validated and the associated identifying information is available at the application, the graphical icon is replaced by a thumbnail of an image associated with the credential, e.g., 1422b.

In addition to the tiles, the panel 1422 may provide descriptive information indicating the number of peers discovered, such as "Total Found: 15 people," which indicates that 15 peers have been discovered in the neighborhood of the local client device by the peer discovery process employing the short-range communication protocol. The descriptive information may be rendered as text above or below the displayed tiles.

The user viewing the screen 1400C may scroll left or right on the panel 1422 to view the tiles corresponding to all the discovered peers. The user may select a tile associated with a credential representation that is not shown on the first panel 1420. Based on the user selection, enlarged version of the corresponding credential representation may be displayed on the first panel 1420 replacing the credential representation 1424. In some implementations, the enlarged version of the credential representation corresponding to the selected tile may be displayed only when the credential has been validated. In such cases, if the user selects the associated tile, a notification may be shown in the first panel 1420 indicating that the corresponding credential is not yet validated.

In some implementations, the maximum number of peer users who are found by the peer discovery search using the short-range communication protocol may be limited to a predetermined valued. For example, the maximum number may be set to 30. This number may be configured by the credential issuing organization, or by the credential management system. Once the number of peer users discovered reaches the predetermined number, the application will stop the peer discovery search. In such cases, the validating user will be able to scroll through the tiles on the panel 1422 to browse all the predetermined maximum number of discovered users, but no more users will be added to the panel 1422. In some implementations, the graphical icon 1426 may be grayed out with no animation, indicating that the search process has stopped.

In some implementations, alternatives to the screen 1400C may be used. For example, the application may transition the user interface from the screen 1400B to the screen 1400D that is shown in FIG. 14D, and display information about the discovered peer user on the user interface.

The screen 1400D is largely similar to the screen 1400C and includes a similar first panel 1420 that displays the credential representation 1424 and the graphical icon 1426. The credential representation 1424 includes the graphical image 1424*a* and other identifying information 1424*b*. However, the second panel 1423 in the screen 1400D is different from the second panel 1422. The first position in the panel 1423 is occupied by a tile 1423*a* that indicates the number of peers discovered, such as "15 Total," which indicates that 15 peers have been discovered in the neighborhood of the local client device by the peer discovery process employing the short-range communication protocol. The panel 1423 may not include other descriptive text above or below the displayed tiles, as is done in the panel 1422. Following the tile 1423*a*, the panel 1423 includes tiles corresponding to the discovered peers, such as 1422*b* and 1422*c*.

In some instances, the application may implement other alternatives to the screen 1400C or the screen 1400D. To illustrate, the application may transition the user interface from the screen 1400B to one of the example screens 1400E, 1400G, 1400H or 1400I that are shown in FIGS. 14E, 14G, 14H and 14I respectively, and display information about the discovered peer user on the user interface. In some implementations, the application may use combinations of the screens 1400C, 1400D, 1400E, 1400G, 1400H and 1400I, such that the user interface transitions from one screen (e.g., 1400C) to another screen (e.g., 1400E or 1400G) based on user input.

As shown in FIG. 14E, the screen 1400E includes a first panel 1428 and a second panel 1430. The first panel 1420 displays tiles such as 1428*a*, 1428*b* and 1428*c*. The second panel 1430 includes information 1430*a* and a graphical icon 1430*b*.

The tiles may be displayed in the first panel in some suitable arrangement, e.g., a matrix or an array. In some cases, the tiles may be graphical icons, such as 1428*a* or 1428*b* that act as placeholders for credential representations. For example, as described previously, the panel 1428 may be updated as soon as a peer is discovered, but before the credential corresponding to the peer is validated. In such an event, the tile corresponding to this peer will show the graphical icon (e.g., 1428*a* or 1428*b*) indicating that the discovered peer's credential has not been validated yet. Once the credential is validated and the associated identifying information is available at the application, the graphical icon is replaced by a thumbnail of an image associated with the credential, e.g., as shown by the tile 1428*c*. As additional peers are discovered using the short-range protocol, the panel 1428 may be dynamically updated with new tiles corresponding to the discovered peers, which may be placed in the empty areas of the panel 1428.

In some implementations, the panel 1430 may be displayed at the top of the screen 1400E, as shown. However, in other implementations, the panel 1430 may displayed at the bottom, or on either left or right side, of the screen 1400E.

In some implementations, the information 1430*a* included in the panel 1430 may indicate the number of peers discovered. For example, as shown, the information 1430*a* may be descriptive text, such as "Total 15 people found," which indicates that 15 peers have been discovered in the neighborhood of the local client device by the peer discovery process employing the short-range communication protocol.

In some implementations, the user viewing the screen 1400E may select an input option represented by the graphical icon 1430*b* to refresh the tiles shown on the panel 1428. This may be the case, for example, when the panel 1428 is not dynamically updated even though the peer discovery search is ongoing in the background. In such cases, when the user makes such an input, e.g., by touching the icon 1430*b*, the application updates the panel 1428 with new tiles corresponding to additional peers discovered since the last refresh of the panel 1428. The new tiles may be placed in the empty areas of the panel 1428. In addition, the application may update the information 1430*a* to indicate the updated number of peers discovered.

The user may select a tile shown on the panel 1428. In some implementations, if the user selects a tile corresponding to a credential that has not been validated yet, such as 1428*a* or 1428*b*, a notification may be displayed indicating that the corresponding credential is not yet validated. On the other hand, if the user selects a tile corresponding to a credential that has been validated, such as 1428*c*, an enlarged representation of the corresponding credential may be displayed on the user interface, as shown by the screen 1400F in FIG. 14F.

The application may display the screen 1400F as an overlay on the screen 1400E such that portions of the screen 1400E are visible in the background in a partially translucent form. The screen 1400F displays the credential representation 1425, which corresponds to the validated credential that is associated with the tile 1428*c* selected by the user. The screen 1400F also includes a graphical icon 1432.

The credential representation 1425 includes the graphical image 1425*a* and other identifying information 1425*b*. The graphical image 1425*a* is similar to the graphical image 1424*a*, while the identifying information 1425*b* is similar to the identifying information 1424*b*. The graphical icon 1432 may represent a user option for closing the enlarged credential representation 1425 and reverting to the screen 1400E. Accordingly, upon receiving user input selecting the graphical icon 1432, the application may close the enlarged credential representation 1425 shown by the screen 1400F, and change the user interface back to the screen 1400E, once again displaying the panel 1428 including the tiles 1428*a*, 1428*b* and 1428*c*, and the panel 1430 including the information 1430*a* and the icon 1430*b*.

FIG. 14G illustrates the sample screen 1400G that may be displayed by the application on the user interface as an alternative to the screens 1400C, 1400D or 1400E. The screen 1400G includes a first panel 1434 and a second panel 1436. The first panel 1434 displays tile 1434*a*, 1434*b* and 1434*c* on credentials of discovered peers. The second panel 1436 includes information 1436*a* and a graphical icon 1436*b*.

The first panel may display the tiles 1434*a*, 1434*b* and 1434*c* in some suitable arrangement, e.g., as rows in a stack. There may be a single tile in each row that is associated with a different credential. Each tile 1434*a*, 1434*b* or 1434*c* may include a graphical icon or an image thumbnail of the corresponding credential and other information identifying the peer associated with the credential. The graphical icon or image thumbnail and the identifying information in each tile may be horizontally adjacent to each other. As described previously, the graphical icons, such as in tiles 1434*a* or 1434*b*, may act as placeholders for credential representations when the received credentials have not yet been validated, or the image associated with the credential is not yet available, or both. However, the other identifying information that is known to the application may be displayed even when the credentials are not validated. For example, tile 1434a shows the graphical icon indicating that the credential is not yet validated, but provides the name ("Jerry Sanders") and the title ("Security Team") of the associated peer.

Once the credential is validated and the associated identifying information is available at the application, the corresponding tile includes a thumbnail of the image associated with the credential. For example, 1434c shows the thumbnail of the image associated with the corresponding credential, indicating that the credential has been validated. In addition, 1434c presents the name ("John Doe") and the title ("Security Team Lead") associated with the validated credential.

As additional peers are discovered using the short-range protocol, the panel 1434 may be dynamically updated with new tiles corresponding to the discovered peers. In some implementations, the new tiles are added at the top of the panel 1434 such that the tile 1434a, 1434b and 1434c are pushed down the displayed stack. In other implementations, the new tiles are added to the bottom of the panel 1434 such that the tile 1434a, 1434b and 1434c maintain their positions on the display.

The panel 1436 is similar to the panel 1430 described previously. The panel 1436 may be displayed at the top of the screen 1400G, as shown. However, in other implementations, the panel 1436 may displayed at the bottom, or on either left or right side, of the screen 1400G. The information 1436a included in the panel 1436 is similar to the information 1430a described previously, while the graphical icon 1436b is associated with a similar function as the graphical icon 1430b.

The user may select a tile shown on the panel 1434. In some implementations, if the user selects a tile corresponding to a credential that has not been validated yet, such as 1434a or 1434b, a notification may be displayed indicating that the corresponding credential is not yet validated. On the other hand, if the user selects a tile corresponding to a credential that has been validated, such as 1434c, an enlarged representation of the corresponding credential may be displayed on the user interface, for example as shown by the screen 1400F and described in the preceding sections.

FIG. 14H illustrates the sample screen 1400H that may be displayed by the application on the user interface as an alternative to the screens 1400C, 1400D, 1400E or 1400G. The screen 1400H includes a first panel 1438 and a second panel 1440. The first panel 1438 displays tiles 1438a and 1438b corresponding to credentials of discovered peers. The second panel 1440 includes information 1440a.

The first panel may display the tiles 1438a and 1438b in some suitable arrangement, e.g., as rows in a stack, with each row including one tile. Each tile includes either a graphical icon or an image thumbnail of the corresponding credential, and other identifying information for the peer associated with the credential. The graphical icon or the image thumbnail and the identifying information may be vertically adjacent to each other in each tile, as shown in 1438a or 1438b. The dimensions of each tile may be such that the width of the tile approaches the width of the display area of the panel 1438. The width of the graphical icon or the image thumbnail may be same as the width of a tile. Accordingly, the dimensions of a graphical icon or image thumbnail may be such that its width approaches the width of the display area of the panel 1438.

As in the alternative screens, the graphical icons, such as in 1438a or 1438b, act as placeholders for credential representations when the received credentials have not yet been validated, or the image associated with the credential is not yet available, or both. However, the other identifying information that is known to the application may be displayed even when the credentials are not validated. For example, the tile 1438a shows the graphical icon indicating that the credential is not yet validated, along with the providing the name ("Jerry Sanders") and the title ("Security Team") of the associated peer.

Once the credential is validated and the associated identifying information is available at the application, the corresponding tile displays a thumbnail of the image associated with the credential. In some implementations, once a credential is validated, the corresponding tile displays an enlarged representation of the validated credential, for example similar to the representation 1425, with the graphical image 1425a covering the width of the associated tile.

In some implementations, the dimensions of the tiles 1438a or 1438b may be such that only one complete tile may be presented on the user interface in the viewable area of the display coupled to the client device. A portion of one or more other tiles also may be presented in addition. For example, the tile 1438a may be shown in its entirety, while a portion of the tile 1438b may be viewable.

The user viewing the screen 1400H may scroll up or down on the panel 1438 to view tiles corresponding to other discovered peers. For example, the user may provide input 1442 on the device display. In response to receiving the input 1442, the user interface is scrolled in the direction of movement of the input. As the user interface is scrolled, the currently displayed tiles move out of the viewable area while tiles that were not previously viewable come into view. For example, if the user interface is scrolled upward, the tile 1438a may move out of the viewable area while the tile 1438b may be shown in its entirety, with other tiles that are vertically below tile 1438b sequentially coming into view.

In some implementations, as additional peers are discovered using the short-range protocol, the panel 1438 may be dynamically updated with tiles corresponding to the newly discovered peers being added. In other implementations, the panel 1438 is updated in response to the input 1442. In such implementations, the input 1442 serves the dual purpose of scrolling the user interface and also refreshing the tiles displayed on the user interface.

In some implementations, the new tiles are added at the top of the panel 1438 such that the tiles 1438a and 1438b are pushed down the displayed stack. In other implementations, the new tiles are added to the bottom of the panel 1438 such that the tiles 1438a and 1438b maintain their positions in relation to the top of the stack.

The panel 1440 may be displayed at the top of the screen 1400H, as shown. However, in other implementations, the panel 1440 may displayed at the bottom, or on either left or right side, of the screen 1400H. The information 1440a included in the panel 1440 is similar to the information 1436a described previously.

In some implementations, the user may select one of the tiles shown on the panel 1438. If the user selects a tile corresponding to a credential that has not been validated yet, such as 1438a or 1438b, a notification may be displayed indicating that the corresponding credential is not yet validated. On the other hand, if the user selects a tile corresponding to a credential that has been validated an enlarged representation of the corresponding credential may be displayed on the user interface, for example as shown by the screen 1400F and described in the preceding sections.

In some implementations, as peers are discovered using the short-range communication protocol, the application may send information about the discovered peers to a heads-up display (HUD) associated with the validating user. The information may include the identity of the discovered peers, or information about their credentials, or both. The application may send the information to the HUD over a network that is established using a short-range communication protocol using the network resources of the client device. The HUD may project the information received from the application on a screen for viewing by the validating user.

For example, the application may send information about the discovered peers to a Google Glass™ device used by the validating user. The information may be sent over a Bluetooth™ connection established between the validating device and the Google Glass™ device. Upon receiving the information from the application, the Google Glass™ device may project the identities of the discovered peers, or their credential information, on the device lens, overlaid on the view of the room as seen through the lens. In some implementations, the projected information about the discovered peers may be similar to the tile 1422b shown by the screens 1400C or 1400D.

In some implementations, when the application searches for nearby peers based on the user input (e.g., 1412), the application may determine that there are no nearby users. This may be the case, for example, when the application, upon controlling the network resources of the client device to scan the predetermined neighborhood using the short-range communication protocol, does not receive a response signal from any peer device that includes information indicating that the peer device is running an instance of the application associated with the credential management system. The short-range communication protocol may be operable to cease scanning after a predetermined time period. In some implementations, this time period may be a feature of the protocol, while in other implementations, this time period may be configurable, e.g., by the user of the client device or by the administrator of the credential issuing organization. If no peer devices are discovered in the scanning time period, the application may determine that there are no users within the predetermined neighborhood of the client device and accordingly, the application transitions the user interface from the screen 1400B to the screen 1400I as shown in FIG. 14I.

The screen 1400I includes a first panel 1444 and a second panel 1446. The panel 1444 displays a notification informing the user that no peer has been discovered in the predetermined neighborhood of the client device. For example, as shown, the panel 1444 may display the notification text "No nearby users found," along with a graphical notification icon 1444a adjacent to the text.

The second panel 1446 includes instruction 1446a and a button 1446b. The instruction 1446 informs the user to take certain steps to facilitate the discovery process. For example, it may be the case that no peers are discovered because the peer devices, if any are present in the vicinity of the client device, are outside the distance in which the short range communication protocol can scan. This distance may be based on the range of the predetermined neighborhood of the client device. Accordingly, the application may instruct the user to move the client device closer to other peer devices such that the peer devices are within the neighborhood of the client device. For example, the instruction 1446a may ask the user to "Bring the device close to another." This may be useful, for example, in situations where the user knows that there are peers close by, but the distance between the client device and the peer device is greater that the distance of scanning of the short range communication protocol.

The button 1446b provides an option to the user to reinitiate the peer discovery process. For example, the user may move the validating client device closer to peer devices that are nearby, and then provide an input selecting the button 1446b. In response to the user input, the application may control the network resources of the client device to perform a new search for peer devices using the short-range communication protocol. In some implementations, as the new search is started, the application may transition the user interface from the screen 1400I back to the screen 1400B.

In some implementations, upon receiving the user input 1412 to start a peer discovery search, the application may determine that the network resources on the client device associated with the short-range communication protocol are disabled. This may be the case, for example, when the short-range communication protocol radio (e.g., Bluetooth™ radio) coupled to the client device is turned off. In such cases, the application may transition the user interface from the screen 1400B to the screen 1400J shown in FIG. 14J.

The screen 1400J includes a first panel 1450 and a second panel 1448. The panel 1448 presents descriptive text indicating that the displayed screen 1400J is associated with the peer discovery process. For example, as shown, the panel 1448 may present the text "Search for nearby users."

The panel 1450 includes instruction 1450a and buttons 1450b and 1450c. The instruction 1450a informs the user to take certain steps to enable the short-range communication protocol on the client device to start the peer discovery process. For example, the short-range communication protocol may be Bluetooth™. In this case, as shown, 1450a may state "Please make sure Bluetooth is On. Go to Settings>General>Bluetooth," which instructs the user to access the "Settings" for the client device and navigate to the "General" settings under which Bluetooth may be enabled.

The button 1450b provides an option to the user to launch the Settings menu for the client device. If the user provides an input selecting the button 1450b, a user interface for the device Settings menu will be shown on the device display, allowing the user to navigate to the settings for the short-range communication protocol and enable the protocol.

The button 1450c provides an option to the user to cancel the process. In some implementations, if the user provides an input selecting the button 1450c, the application terminates the search for peer devices and reverts back to the screen 1400A. If the user wants to start a new search for peer devices and the short-range communication protocol is still disabled, then the application will again transition to the screen 1400J to instruct the user to enable the protocol.

A peer device may be discovered during a peer discovery search if the client device is operable to broadcast its identity to nearby devices using the short-range communication protocol. For example, a peer device may periodically transmit a signal in its first neighborhood that includes a unique identifier associated with the credential issuing organization with which the device is registered.

In some implementations, the credential management application running on the peer device may provide an option to the peer user to opt out of the peer discovery process so that the peer is not found during a peer discovery search by another user. The peer user may opt out by configuring the discovery settings for the credential management application using the user interface screen 1400K shown in FIG. 14K. In some implementations, the screen 1400K may be accessed from the main Settings menu of the peer device, which is controlled by the underlying operating system of the device. In other implementations, the screen 1400K may be accessed from the credential management application itself.

The screen 1400K includes a setting "Discoverable Identity" associated with finding the peer device during a discovery search. In some implementations, this setting may be enabled by default such that the user's identity will be discoverable by others. However, in other implementations, this setting may be disabled by default and the user will have to enable the setting so that the user's identity becomes discoverable.

In cases where the setting is enabled, the user may disable the setting using the toggle switch 1452. Once the user disables the setting by toggling the switch 1452, the client device will not include the unique identifier when it periodically transmits the short-range communication protocol signal in its neighborhood. Accordingly, other devices that receive the signal will not be able to determine that the client device is associated with the credential issuing organization due to the absence of the unique identifier in the signal.

Even if the "Discoverable Identity" setting is disabled on the client device, the application running on the client device may still be able to search for other peer devices in its neighborhood (that have their "Discoverable Identity" setting enabled) using the short-range communication protocol.

In some implementations, a client device may be registered with multiple credential issuing organizations. The client device may include one or more of the unique identifiers corresponding to the different credential issuing organizations when it transmits the periodic signal in its neighborhood using the short-range communication protocol. The user may have to separately disable the "Discoverable Identity" setting for each identifier, or for each registered credential issuing organization, or both. In such cases, the screen 1400K may provide multiple toggle switches, one for each identifier, or for each registered credential issuing organization, or both.

In some implementations, the user may disable the "Discoverable Identity" setting for some of the identifiers, but not all. In such cases, the client device will not be discoverable by other devices that are associated with the credential issuing organization(s) for which the "Discoverable Identity" setting is disabled. However, the client device will be discoverable by devices that are associated with the other credential issuing organization(s) for which the "Discoverable Identity" setting is enabled.

Even if a peer user disables her identity from being discoverable, the credentials stored on the peer device may still be used for physical access using resources managed by the credential management system (e.g., a door reader entity that manages access to a restricted area). In some implementations, this may be achieved by configuring the application running on the peer device to support multiple identifiers that may be used for different purposes. The multiple identifiers may be associated with the same credential issuing organization. For example, one identifier may be used exclusively for performing physical access, while another identifier issued by the same credential issuing organization may be used for performing validation, and this identifier may be transmitted as part of the signal transmission using the short-range communication protocol. Accordingly, the peer user may disable the second identifier to turn off making their identity discoverable. However, the peer user may still be able to perform the physical access using the first identifier, which is still enabled (but not discoverable by other users).

In some implementations, upon performing the peer discovery search based on the user input 1412, no nearby users may be found. As described previously, this may be the case, for example, when no peer devices are discovered using the short-range communication protocol by the time the scanning time period expires. In such cases, the application may determine that there are no users within the predetermined neighborhood of the client device and transition the user interface from the screen 1400B to the screen 1400L as shown in FIG. 14L.

The screen 1400L includes a notification 1454 and buttons 1456 and 1458, apart from the tabs 1414 and 1416. The notification 1454 informs the user that no peer has been discovered in the predetermined neighborhood of the client device by the peer discovery search using the short-range communication protocol. For example, the short-range communication protocol may be Bluetooth™ and, as shown, the notification may read that "No users were found by Bluetooth."

The button 1456 provides an option to the user to perform a new peer discovery search using the short-range communication protocol. If the user provides an input selecting the button 1456, the application may control the network resources of the client device to perform a new search for peer devices using the short-range communication protocol. In some implementations, as the new search is started, the application may transition the user interface from the screen 1400L back to the screen 1400B.

The button 1458 provides an option to the user to perform a new peer discovery search using the long-range communication protocol. If the user provides an input selecting the button 1458, the application may control the network resources of the client device to initiate a search for nearby peer devices using the long-range communication protocol. In some implementations, as the new search is started, the application may switch the user interface from the screen 1400L to other screens that are associated with the long-range communication protocol.

FIGS. 15A-15G show screens 1500A-1500G displayed by a sample user interface running on a client device that is operable to present representations of credentials and enable searching for other devices associated with credentials issued by a common credential issuing organization. The user interface (UI) may be shown on a display coupled to a client device corresponding to user. The UI may be associated with an instance of the credential management application that is executed on the client device.

In some implementations, the client device may be same as the client device and the credential management application may be same as the credential management application described with respect to the screens 100-900, 1300, and 1400A-1400L. In such implementations, the screens 1500A-1500G may be part of the same user interface as the screens 100-900, 1300, and 1400A-1400L. Accordingly, the following sections describe the screens 1500A-1500G with reference to the same client device as the screens 1400A-1400L. However, in other implementations, the client device, or the credential management application, or both, may be different from those discussed with respect to the screens 1400A-1400L, such that the screens 1500A-1500G are associated with a different user interface.

Although the following sections described the sample user interface and the credential management application primarily with respect to the validating client device, an instance of the same application may run on any peer device that is registered with a credential issuing organization, and consequently, have one or more locally-stored credentials that are managed by the credential management system. Accordingly, the screens 1500A-1500G of the application user interface also may be shown on the display coupled to the peer device.

In some implementations, upon receiving the user input selecting the button 1458 on the screen 1400L, the application running on the client device transitions the user interface from displaying the screen 1400L to displaying the screen 1500A shown by FIG. 15A. However, in other implementations, the screen 1500A is displayed when the user selects the tab 1416 from the screen 1400B or the screen 1400L.

The screen 1500A includes tabs a panel 1502 and tabs 1504 and 1506. The panel 1502 displays a notification 1502a and a graphical icon 1502b.

The tab 1504 may be similar to the tab 1414, while the tab 1506 may be similar to the tab 1416. In some implementations, when the application switches to displaying the screen 1500A upon receiving a user input, either selecting the button 1458 or the tab 1416, the peer discovery process using the long-range communication protocol is automatically started. In other implementations, upon transitioning to the screen 1500A, the user is provided with an option to select the process to be used for the search. When the screen 1500A is shown corresponding the long-range communication protocol search, the tab 1506 may be highlighted in some form (e.g., darkened in color in comparison to the tab 1504), indicating that the current search is being performed using the communication protocol associated with the tab 1506.

In some implementations, the search using the long-range communication protocol is performed in a new neighborhood of the client device that may be different than the first neighborhood associated with the short-range communication protocol. The new neighborhood, also referred to as the "second neighborhood," may cover a greater area compared to the first neighborhood. For example, the second neighborhood may cover an area centered on the client device that has a radius of 3 miles. In contrast, the first neighborhood may cover an area centered on the client device that has a radius of, for example, 100 meters. This may be the case because the long-range communication protocol may be operable to transmit and receive signals over a greater geographic distance compared to the short-range communication protocol. However, in other implementations, the second neighborhood may cover the same, or lesser, area compared to the first neighborhood.

The application may identify the second neighborhood to the user as "Network." As the search progresses, the application provides information on the status of the search using the panel 1502. For example, the panel 1502 may display the notification 1502a, which states, "Searching Nearby Users by Network." In addition, in some implementations, the panel 1502 also may display a graphical icon 1502b. A flashing animation may be associated with the graphical icon, which provides visual indication that a peer discovery search is in progress using the long-range communication protocol.

When the application searches for nearby peers using the long range communication protocol, the application sends a message to a remote validation server associated with the credential management system. The message is sent over a network connection that is established using the network resources associated with the client device. The message includes a request to the server to send information on all nearby users associated with the credential issuing organization. The message also includes information about the present location of the client device. The location of the client device may be determined by using location services that are available on the client device, e.g., Global Positioning System (GPS).

In some implementations, the remote validation server may determine that there are no nearby users. In such implementations, the server may send back a response to the client device with the information that no nearby users are found. Alternatively, the server may not send a response to the client device and the application will time out waiting for a response to the request message. In such cases, the application may determine that there are no nearby users of the client device that can be found in the second neighborhood using the long-range communication protocol, and accordingly transition the user interface from the screen 1500A to the screen 1500B as shown in FIG. 15B.

The screen 1500B includes the same panel 1502 and the tabs 1504 and 1506 as the screen 1500A. However, the panel 1502 includes a new notification 1502c and a button 1502d.

The notification 1502c informs the user that no peer has been discovered in the second neighborhood of the client device. For example, as shown, the notification 1502c may state, "No users were found by Network."

The button 1502d provides an option to the user to reinitiate the peer discovery process using the long-range communication protocol. The user may provide an input selecting the button 1502d. In response to the user input, the application may control the network resources of the client device to perform a new search for peer devices using the long-range communication protocol. In some implementations, as the new search is started, the application may revert the user interface to the screen 1500A.

In some implementations, upon receiving the request from the client device, the remote validation server may identify one or more users in the second neighborhood of the client device. When a user, who has a credential that is managed by the credential management system associated with the server, performs some form of physical access using a credential stored on her device, the information about the device location is transmitted to the server. For example, when the user swipes a key, or scans a QR code, or uses a Bluetooth door reader signal to gain physical access to her office building, the device's location (e.g., using GPS coordinates or wireless triangulation) is logged by the building's credential system and transmitted to the server.

The server may maintain, in local storage coupled to the server, information about user location data that is received based on the physical access calls of the registered user devices. In some implementations, the server may maintain a table that stores all user location data for a predetermined time period, e.g., the past 24 hours, which are collected from the physical access calls.

The location data may be collected as <latitude, longitude>. If the location data corresponding collected from a call is <0,0> for a registered device, this means that the associated user has denied access to the location data and therefore the server will ignore such data.

In some implementations, the server will return, to the validating client device, information about registered users who have a recorded location within the predetermined time period from the time when the validating client device makes the request to the server. The information associated with each user that is returned to the validating device may include one or more of: an image associated with the credential representation, name of the user, the user's title, time and date of the last recorded location, and distance from validating client.

The results may be returned by the server sorted by distance based on the validating client's current distance, returning closest users first. In some implementations, the number of returned results may be limited to a fixed number. For example, the server may return information about a maximum of 100 users.

In some implementations, the validation server may provide an application programming interface (API) that the validating device may use to read the location data stored at the server (e.g., from the table maintained by the server) and get a list of nearby users. The API may return information about the users with location data within the predetermined time period and sorted by distance from the validating device making the request.

In some implementations, if location service is disabled on the validating client device that is being used to search for users, a popup message may be displayed on the searching screen 1500A to enable location services. The popup message may be displayed by the underlying operating system. When location service is disabled, the application may disable the graphical icon 1502b and the associated animation on the searching screen 1500A and the notification 1502a may read "Turn on Location Services to search for Nearby Users."

Figures 15C, 15D:
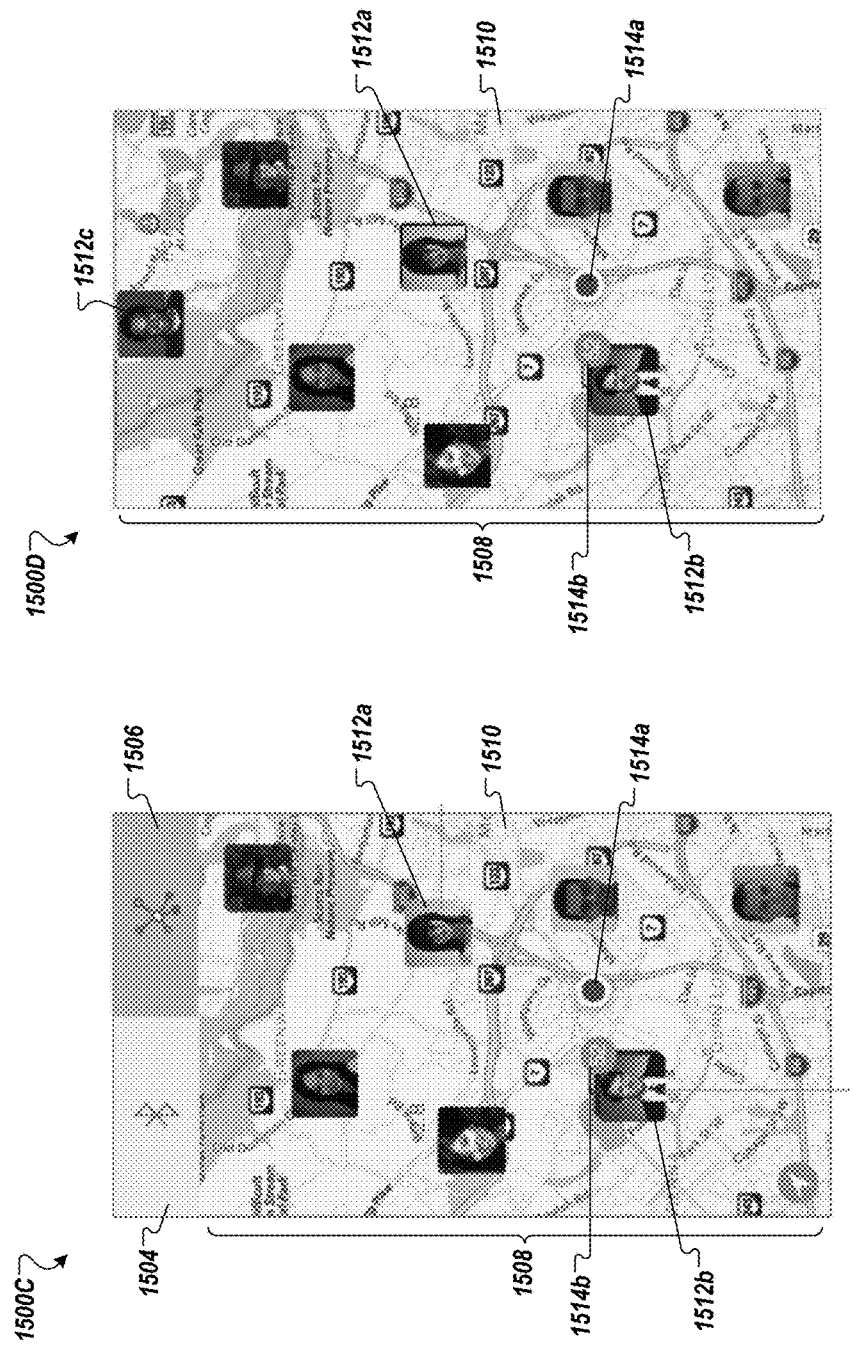

When the information is returned at the validating client device in response to the request message to the validation server, the application processes the received information and displays it on the user interface of the client device, transitioning the user interface from the screen 1500A to the screen 1500C shown in FIG. 15C. The screen 1500C includes the tabs 1504 and 1506, and a panel 1508. The panel 1508 includes a map 1510, one or more image thumbnails, such as 1512a and 1512b, and graphical icons such as 1514a and 1514b.

The map 1510 may be displayed as a background for the panel 1508. The geographic area covered by the map may correspond to the second neighborhood of the validating client device. The graphical icon 1514a displayed on the map may indicate the current location of the validating client device. One or more image thumbnails, such as 1512a and 1512b, are displayed as overlays on the map. The image thumbnails correspond to the registered users whose inform are returned by the validation server in response to the request message. The images in the thumbnails may be miniature versions of the images associated with the corresponding credential representation. The position of the thumbnails on the map may correspond to the locations of the associated users that are returned in the information received from the validation server.

In some implementations, there may be multiple users at the same location. This may be the case, for example, when several employees have been the office building in the previous day such that their locations at the office have been logged by the building's entry management system and transmitted to the validation server.

In such cases, the application may show on the map the image thumbnail corresponding to one user from the group of multiple users at the same location. In addition, the application may display a graphical icon proximate to the image thumbnail indicating the total number of users who have the same recorded location.

In some implementations, users may be grouped together when their locations are within a certain distance of one another, even if the locations are not exactly the same. The distance may be a part of the application settings and determined to allow a visually pleasing display on the screen 1500C, without cluttering the screen with too many thumbnails. For example, if the recorded locations of users are within 200 meters of one another, then the application may group the users together in one unit, and represent the unit on the map by the image thumbnail associated with one of the users in the unit. In addition, the application may display a graphical icon proximate to the image thumbnail indicating the total number of users who have the same recorded location.

For example, the graphical icon 1514b is displayed overlaid on the image thumbnail 1512b. As shown, the icon 1514b displays the number 52. This indicates that a total of 52 users have locations that are either the same as, or within a certain distance of, the location of the user associated with the thumbnail 1512b.

In some implementations, the maximum number of thumbnails that are shown on the screen 1500C may be limited to a fixed number. For example, the application may display at most 10 thumbnails on the screen at any time. Some of the thumbnails may represent groups of users who share locations with the user associated with the displayed image thumbnail. In such cases, the number of users sharing the location may be indicated by the graphical icon shown proximate to the thumbnail providing a numerical indication of the number of users at the location. The number of displayed thumbnails may be limited so that the map is not cluttered with thumbnails that cover the map area.

In some implementations, the user may provide an input tapping anywhere on the map 1510 (but not on the image thumbnails). In response to the user input, the application may hide from view the tabs 1504 and 1506 such that the entire viewable area of the user interface is occupied by the map 1510, as shown by the screen 1500D in FIG. 15D. A larger geographic area may be shown by the map 1510 on the screen 1500D. In some implementations, additional image thumbnails, e.g., 1512c, may be visible on the map 1510 when the tabs 1504 and 1506 are hidden.

The user may provide another input tapping anywhere on the map 1510 (but not on the image thumbnails) shown by the screen 1500D. In response to the user input, the application may bring the tabs 1504 and 1506 into view, reverting the user interface to the screen 1500C.

In some implementations, the validation server may return additional results as the application displays the screen 1500C or 1500D. For example, the client device may make a server call periodically, e.g., every 20 seconds, as a background process to refresh the list of returned users. As additional results are returned, the map 1510 on the screen 1500C or 1500D will be populated with image thumbnails, or the number indicated by the graphical icon 1514b will be incremented, corresponding to the newly returned results.

The user may provide an input selecting an image thumbnail corresponding to a single user (i.e., when the image thumbnail does not represent a group of users at a location). For example, the user may touch the device display at a position proximate to the thumbnail 1512a, indicating selection of the thumbnail 1512a. In response to the user input, the application displays an enlarged representation of the credential associated with the thumbnail, transitioning the user interface to the screen 1500E as shown in FIG. 15E.

The application may display the screen 1500E as an overlay on the screen 1500C or 1500D such that portions of the screen 1500C or 1500D (e.g., the map 1510) are visible in the background in a partially translucent form. The screen 1500E displays the credential representation 1516, which corresponds to the validated credential that is associated with the thumbnail 1512a selected by the user. The screen 1500E also includes a graphical icon 1518, in addition to the tabs 1504 and 1506.

The credential representation 1516 includes the graphical image 1516a, identifying information 1516b, temporal information 1516c, and a numerical indication 1516d. The graphical image 1516a is similar to the graphical image 1424a, while the identifying information 1516b is similar to the identifying information 1424b.

The temporal information 1516c provides the information regarding the last time the location of the associated user was logged by the validation server. In some implementations, this time may be associated with the last time the user performed a physical access using a resource associated with the corresponding credential management system.

The numerical indication 1516d indicates the distance of the user associated with the credential from the validating client device. The distance may correspond to the location where the associated user performed her last physical access that was logged by the credential management system.

For example, as shown, the screen 1500E informs that the selected credential is associated with "Jane Smith" (1516a) whose title is "User Experience Designer" (1516b). She had last "checked in," i.e., performed a physical access that was logged by the credential management system and stored by the validation server, at "11:34 AM Nov. 26, 2013" (1516c). The location of her last check in is 2.1 miles (1516d) from the present location of the validating device (where the present location of the validating device is indicated on the map 1510 by the icon 1514a).

The graphical icon 1518 may represent a user option for closing the enlarged credential representation 1516 and reverting to the screen 1500C or 1500D. Accordingly, upon receiving user input selecting the graphical icon 1518, the application may close the enlarged credential representation 1516 shown by the screen 1500E, and change the user interface back to the screen 1500C or 1500D, once again displaying the panel 1508 including the map 1510, image thumbnails such as 1512a and 1512b, and the icons 1514a and 1514b.

The user may provide an input selecting an image thumbnail that represents a group of users at a location. For example, the user may touch the device display at a position proximate to the thumbnail 1512b, indicating selection of the thumbnail 1512b. In response to the user input, the application displays an enlarged representation of the credential associated with the thumbnail, transitioning the user interface from the screen 1500C or 1500D to the screen 1500F as shown in FIG. 15F.

The application may display the screen 1500F as an overlay on the screen 1500C or 1500D such that portions of the screen 1500C or 1500D (e.g., the map 1510) are visible in the background in a partially translucent form. The screen 1500F includes the tabs 1504 and 1506, a first panel 1520 and a second panel 1522. The panel 1520 displays the credential representation 1524, which corresponds to the validated credential that is associated with the thumbnail 1514a selected by the user. The panel 1520 also includes the graphical icon 1518. The panel 1522 includes tiles such as 1522a and 1522b.

The credential representation 1524 includes the graphical image 1524a, identifying information 1524b, temporal information 1524c, and a numerical indication 1524d. The graphical image 1524a is similar to the graphical image 1516a. The graphical image 1514a corresponds to the user associated with the credential that is received from the validation server.

The identifying information 1524b serves the same function as the identifying information 1516b; the temporal information 1524c provides similar type of information as the temporal information 1516c; and the numerical indication 1524d similar type of information as the numerical indication 1516d.

In some implementations, the panel 1522 may be displayed at the bottom of the screen 1500F, as shown. However, in other implementations, the panel 1522 may displayed at the top, or on either left or right side, of the screen 1500F. As additional results are received by the application from the validation server, the panel 1522 is populated with additional tiles corresponding to the newly received information.

In some cases, the tiles may be graphical icons that act as placeholders for credential representations. For example, the panel 1522 may be updated as soon as a result is returned, but before the application has fully processed the associated image that is received from the validation server. In such an event, the corresponding tile will show the graphical icon (e.g., 1522b) indicating that the associated credential is not fully processed yet, or the information corresponding to the associated credential has not been received from the validation server. Once the image is available at the application, the graphical icon is replaced by a thumbnail of the image, e.g., as in 1522a.

In addition to the tiles, the panel 1522 may provide descriptive information indicating the number of peers discovered, such as "Total People Found: 52," which indicates that 52 peers have been discovered in the second neighborhood of the local client device by the peer discovery process employing the long-range communication protocol. The descriptive information may be rendered as text above or below the displayed tiles.

The user viewing the screen 1500F may scroll left or right on the panel 1522 to view the tiles corresponding to all the discovered peers. The user may select a tile associated with a credential representation that is not shown on the first panel 1520. Based on the user selection, enlarged version of the corresponding credential representation may be displayed on the first panel 1520 replacing the credential representation 1524. In some implementations, the enlarged version of the credential representation corresponding to the selected tile may be displayed only when the credential has been validated. In such cases, if the user selects the associated tile, a notification may be shown in the first panel 1520 indicating that the corresponding credential is not yet validated.

The graphical icon 1518 provides the option to close the panels 1520 and 1522, and return to the screen 1500C or 1500D. Accordingly, upon receiving user input selecting the graphical icon 1518, the application may close the enlarged credential representation 1524 and the tiles 1522a and 1522b shown by the screen 1500F, and change the user interface back to the screen 1500C or 1500D, once again displaying the panel 1508 including the map 1510, image thumbnails such as 1512a and 1512b, and the icons 1514a and 1514b.

Figure 15G:
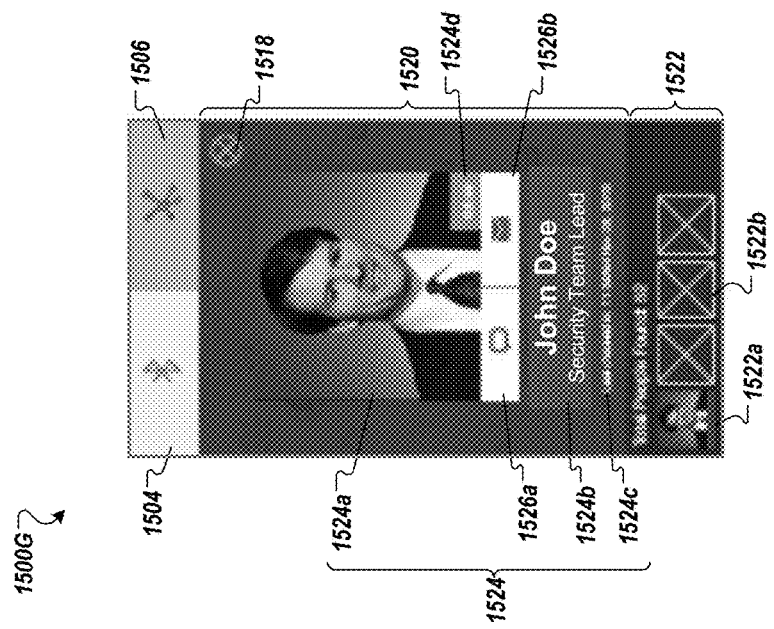

In some implementations, the application may display alternatives to the screen 1500F. For example, the application may transition to the screen 1500G as shown in FIG. 15G. The screen 1500F is largely similar to the screen 1500G. However, the panel 1520 in screen 1500G includes additional buttons 1526a and 1526b.

The button 1526*a* provides an option to send a text message to the user associated with the displayed credential 1524. If the validating user provides user input selecting the option 1526*a*, the application may trigger the underlying operating system of the client device to launch a text messaging application. In some implementations, the text message application may be native to the underlying operating system and not controlled by the credential management application.

The button 1526*b* provides an option to send an email message to the user associated with the displayed credential 1524. If the validating user provides user input selecting the option 1526*b*, the application may trigger the underlying operating system of the client device to launch an email application. In some implementations, the email application may be native to the underlying operating system and not controlled by the credential management application.

When the text messaging application or the email application is launched, the credential management application user interface shown on the device display is replaced by the user interface of the text messaging application or the email application, as the case may be, allowing the user to send a text message or an email respectively. After the text message or email is sent, the user interface of the text messaging application or the email application may be closed and the credential management application user interface again displayed on the device display, returning to the screen that was last visible, e.g., screen 1500G.

In some implementations, when the user provides a swiping input on the screen 1500C or 1500D, the application reverts the user interface to the screen 1400A, displaying the user's own credential. If the user provides another input to return to the search screens, then the application may transition the user interface back to the screen that was previously shown (e.g., screen 1500C or 1500D).

In the manner described in the preceding sections, the credential management application running on the client device may provide in-network and/or cross-network hierarchical visibility of peer devices associated with a common credential issuing organization, with varying permissions based on the system the validating user is a member of (e.g. an employee of Company M may use this functionality to locate other Company M employees). Users may opt-out of the discovery, and administrators of the credential issuing organization may control when and where the discovery may be activated.

Figure 16:
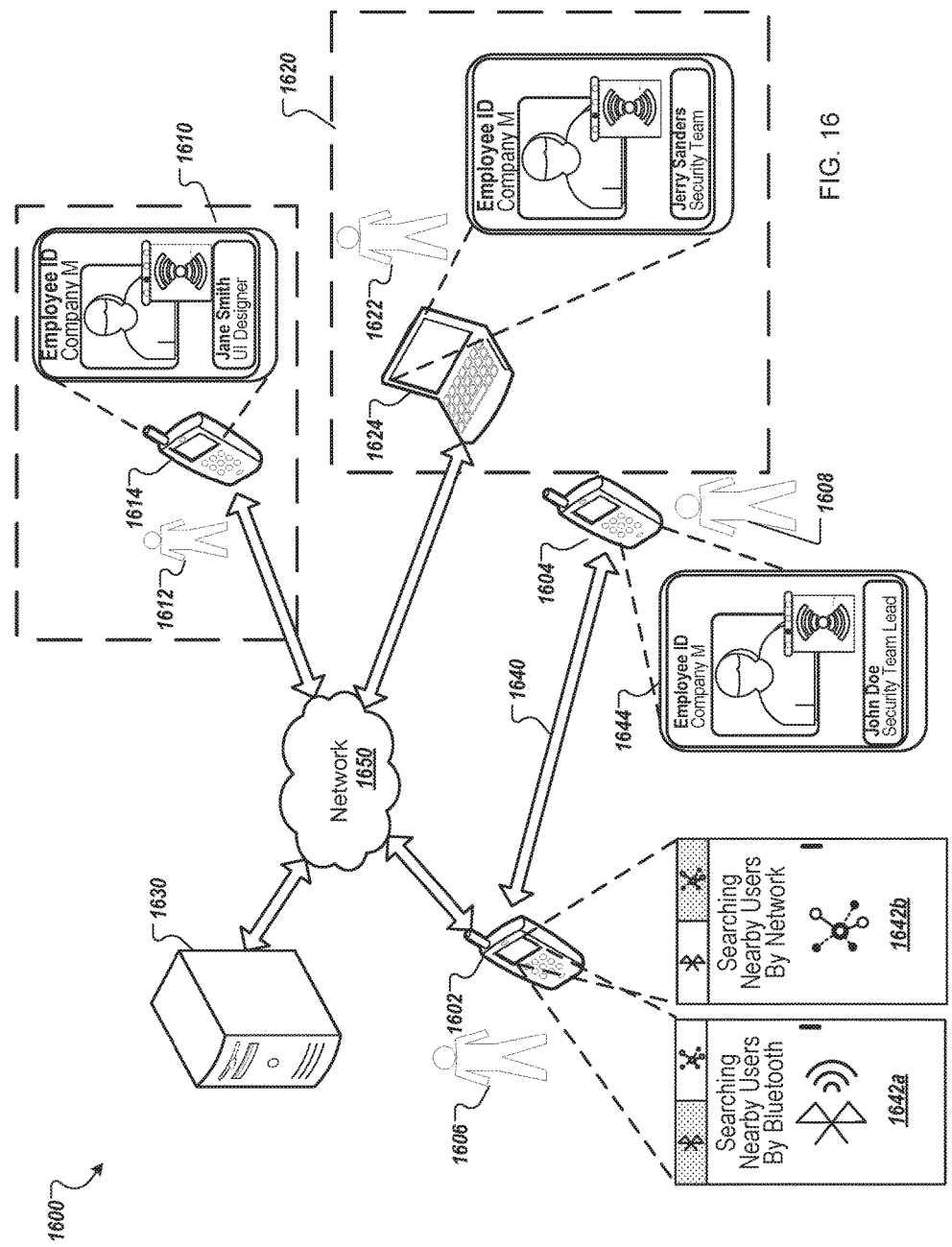
FIG. 16 shows an example system for performing peer discovery using a credential management application.

FIG. 16 shows an example system 1600 for performing peer discovery using a credential management application. The system 1600 may correspond to system 1000 described hereinabove with respect to FIG. 10, and may be a credential management system that is operable to manage and display user credentials associated with the validating client device, or the peer devices, or both. As discussed hereinabove, the validating client device may execute an instance of the credential management application that is associated with the credential management system 1600 and may be used to search for peer devices in a neighborhood of the validating device using the short-range communication protocol, the long-range communication protocol, or both.

The system 1600 includes client devices 1602, 1604, 1614, and 1624 that are associated with users 1606, 1608, 1612, and 1622 respectively; a validation server 1630; and a network 1650. The user 1612 is at location 1610, while the user 1622 is at location 1620. Direct communication between the client devices 1602 and 1604 is indicated by 1640. UI 1642*a* or 1642*b* is displayed on client device 1602 while UI 1644 is displayed on the client device 1604. Validation server 1630 may be the same as, included in, or connected to the credential management server 1030 described hereinabove with respect to FIG. 10.

The user 1606 may attempt to discover peer users associated with a common credential issuing organization who are located either in the first neighborhood or the second neighborhood of the user 1606. The user may perform the peer discovery using the device 1602. Users in the first neighborhood, who are in close physical proximity to the user 1606, may be discovered by searching using the short-range communication protocol. Users in the second neighborhood, who are spread over a wider geographical area from the user 1606, may be discovered by searching using the long-range communication protocol.

As illustrated in FIG. 16, the user 1606 may operate the client device 1602 (the validating device) to initially discover peer devices in the first neighborhood using the short-range communication protocol. The credential management application running on the validating device 1602 presents the UI screen 1642*a* shown on the display coupled to the validating device 1602.

A direct communication path may be established between the validating device 1602 and the peer device 1604 using the short-range communication protocol. Upon performing the peer discovery search performed using the short-range communication protocol, the validating device 1602 may receive, from the peer device 1604, a unique identifier assigned by the credential issuing organization. In addition, the validating device 1602 may receive a representation of the credential associated with the user 1608 that is issued by the credential issuing organization and stored at the peer device 1604, such as the credential shown on the user interface 1644 displayed on the peer device 1604.

The validating device 1602 may determine, based on the unique identifier, that the peer device 1604 is associated with the credential issuing organization. Upon making the determination, the device 1602 may send the received credential information to the validation server 1630 over the network 1650. In some implementations, the validating device 1602 communicates the credential information to the server 1630 in a validation request, along with its own identifying information.

The validation server 1630 validates the credential received from the device 1602. In some implementations, the server 1630 also verifies the identity of the validating user 1606 that is included in the validation request. Following successful verification of the peer user's credential and the validator's identity, the validation server 1630 determines what information corresponding to the peer user may be sent to the validating device 1602.

In some implementations, the server 1630 makes this determination based on instructions configured by the credential issuing organization that issued the credential to the user 1608.

Based on determining the information corresponding to the peer user that may be sent to the validating device 1602, the server 1630 sends a response to the validating device 1602 with the determined information. As discussed previously, the information that is shared may include the image, name and title of the user 1608, among others.

In operation, the server 1630 manages and/or stores one or more credentials, associates users and groups of users with appropriate credentials, and provides the credentials to users' client devices and/or processing systems (e.g., operated by credential authorities) for validation. The server 1630 can be any suitable computer or collection of computers executing software capable of managing, distributing, and/or validating representations of credentials for users and groups of users via a network 1650 as described herein.

Credentials, user accounts, group accounts, and administrative accounts can be stored in a database (e.g., MySQL, PostgreSQL, MS SQL Server, MongoDB), or other suitable data structure that can be accessed by the server 1630. In some implementations, the server 1630 may access the stored credentials and/or user accounts via web services such as representational state transfer (REST) style services.

As an initial step, as described above, the server 1630 creates a credential based on input provided by a credential issuing organization (e.g., an employer). In some implementations, multiple different credential issuing organizations (e.g., different entities and/or organizations) may issue credentials using the same server 1630. The credential may include a variety of information such as a credential identifier (e.g., a number or alphanumeric character string that uniquely identifies a credential), an indication of the grantor of the credential, information about the user to whom the credential issuing organization granted the credential, an indication of one or more permissions granted by the credential issuing organization to the user, a description of an event or location associated with the credential, and/or third-party instructions (e.g., instructions governing what information associated with the user may be disseminated to third party users that request validation of the user's credential).

In some implementations, the instructions may include information identifying a type, classification, or rank of the validator's credential that can be enabled to access private information associated with the validated credential. For example, the private information associated with an employee badge for a company may be shared with the validator when the validator's credential is: (i) an employee badge of the same company; and/or (ii) a manager or supervisor badge associated with another employer that is a business partner of the validatee's company.

Alternatively or in addition, the instructions may include information identifying particular third-parties (e.g., names, credential identifiers, and/or user identifiers) who may access the validatee's private information. In some implementations, the instructions also may include a temporal condition that identifies one or more time periods during which the sharing of private information is enabled. For example, the private information associated with the validated credential may only be accessible during regular business hours. During other time periods, only the public information associated with the validated credential may be accessible.

In some implementations, the server 1630 may present a suitable interface to the credential issuing organization for creation of credentials. For example, the server 1630 may present a web interface through which the credential issuing organization can interact using a web browser. In other implementations, the server 1630 may be directly accessible via a graphical-user interface or an application running on a mobile device. Any suitable interface can be used that enables the creation and storage of credentials, and user accounts. In addition (or as an alternative) to creation of credentials by credential issuing organizations, credentials may be created at the request of registered users through a web-based or other interface, or through any other suitable mechanism such as sending email or short message service (SMS) transmissions to credential issuing organizations. In some implementations, registered users may be able to create credentials by use of an application running on a client device.

The interface for the creation of credentials may provide a credential issuing organization the ability to associate conditions with the credentials, such as instructions for sharing private information associated with the credentials, as discussed above. For example, the interface may show a hierarchical menu of potential third-parties who can access the private information associated with the credential, and allow the credential issuing organization to identify the desired third-parties. These potential third-parties may be identified, for example, by name and/or by a type of credential the third-party must possess to access the private information. For example, the potential third-parties may include particular individuals such as "John Doe," and/or particular credentials such as "Corporate Security Council Badge" or "Company M Employee Badge."

In some implementations, the interface with a hierarchical menu may be used to assign different information access levels within an organization. For example, employees having particular ranks, occupations, or titles may be granted authorization to view private information associated with some or all credentials within the employee's organization. Furthermore, the interface may be used to specify the type of information employees with particular credentials may view. For instance, an employee with a human resources credential or a senior management executive badge within an organization may have authorization to access private information of the employees within the organization; however, other employees, such as, for example, employees with lower management staff or support staff credentials, may not have authorization to access private information of other employees within the organization. Additionally, in some cases, the type of information that employees have access to may be specified. For instance, an employee with a human resources credential may have authorization to access information of another employee's transcript, whereas an employee with a general management credential may not have authorization to access information of another employee's transcript, but may have access to the other employee's job performance. Accordingly, a credential issuing organization may associate conditions with the credentials during the creation of the credentials. Credentials and conditions associated with the credentials may be stored at a credential management server, such as the validation server 1630.

In some implementations, a credential issued by a credential-issuing organization may be represented as any suitable data object, such as an eXtensible Markup Language (XML) or JavaScript Object Notation (JSON) object. In such implementations, the "private" information associated with the credential may be identified within the JSON object. In some implementations, information that is not identified as private may be considered as public information. However, in other implementations, both the private and public information may be explicitly identified.

The following example shows a sample JSON object for a credential, which includes a badge for a user named "John Doe" associated with organization "Company M." The private information in the credential is indicated with the tag "private."

The credential may include different types of private information, which are shown as different attributes in the JSON object associated with the credential. For example, in the exemplary JSON object shown below, the private information includes information on the user's department within the company (indicated as an attribute named "group"), which is of "type" "string" with a value "Administration." The private information also includes the name of the user's supervisor (indicated as an attribute named "supervisor"), which is of "type" "string" with a value "Jane Smith." A validator who is enabled to access the above private information may determine that the user John Doe is in the Administration department in Company M, and the user's supervisor is Jane Smith.

The above may be considered as detailed personal information about the user associated with the credential that is private. The private information also may include user authentication/log-in information, which may be verified by third-party applications when the user attempts to access resources associated with the third-party applications. For example, the exemplary JSON object below includes the user's login name for accessing a particular resource (indicated as an attribute named "login_name"), which is of "type" "string" with a value "john.doe." As another example, the private information includes an access control identifier (shown as attribute "access_control_id") that is of type "number" and has a numerical value "1600341998." The user's login name and the access control identifier may correspond to different resources. For example, the login name may be used to access a web-based email account, while the access control id may be used to unlock a door for accessing a conference room at Company M's premises.

The other information included in the exemplary JSON object below, such as the user's name (e.g., "John Doe"), the user's title (e.g., "Chief Security Officer"), and the organization (e.g., "Company M") may be public information. The JSON object also may include other fields or attributes and their associated values, which are indicated in the example shown below by ellipsis (i.e., " . . . ").

```
{
  "badges":
  [
    {
      "badgeinfo":{
        "name": "John Doe",
        "title": "Chief Security Officer",
        "orgname": "Company M",
        "expiration":31234123, //UNIX timestamp
        "cache_until":1335195206, //UNIX timestamp
        "extra": "jdoe@companym.com",
        "photo": {
          "desc":...,
          "type":...,
          "value":... // or "reference"
        }
      },
      "badgeinfo_additional":[
        {
          "name":...,
          "desc":...,
          "type":...,
          "value":... II or "reference"
        },
        ...
      ],
      "private":[
        {
          "name": "group",
          "type": "string",
          "value": "Administration"
        },
        {
          "name": "supervisor",
          "type": "string",
          "value": "Jane Smith"
        },
        {
          "name": "login_name",
          "type": "string",
          "value": "john.doe"
        },
        {
          "name": "access_control_id",
          "type": "number",
          "value": "1600341998"
        }
      ],
      "meta": {
        "format": {
          ...
        }
      }
    },
    {
      ...
    }
  ]
}
```

The server 1630 also may present an interface so that users and/or credential issuing organizations can create user accounts for individual users and groups of users. For example, the server 1630 may present a web interface through which credential issuing organizations can interact via a Web browser. Additionally or alternatively, the server 1630 may be directly accessible via a graphical-user interface or an application on a mobile device. User accounts may be stored in a table or collection of tables in a database, or in any other suitable data structure accessible by the server 1630. The user accounts may include a variety of information such as user name, user title, user identifier (e.g., a number or character string that uniquely identifies a user), one or more unique keys for the user (e.g., alphanumeric codes that can be used for encryption and/or decryption), and/or the address(es) of one or more client devices owned by or otherwise associated with the user. Likewise, group accounts may be stored in a table, collection of tables, or any other suitable data structure. Certain individual users may be identified as belonging to a group by linking an entry for the user to an entry for the group, for example by use of a linking table. The group accounts may include a variety of information such as a group name, group identifier (e.g., a number or character string that uniquely identifies a group), and a description of the group. In addition (or as an alternative) to creation of user accounts and groups by grantors, user accounts and groups can be created at the request of potential users through a web-based or other interface, or through any other suitable means such as sending email or SMS to grantors. In some implementations, the potential users may be able to create user accounts by use of the credential management application running on a client device.

As an example, a Mr. John Smith may request a new user account from the server 1630 using the credential management application executed on his client device. The server 1630 can then create database entries representing a user account for Mr. Smith. A credential issuing organization could then create a row in another table for a group identified as employees of Company X. The grantor and/or server 1630 could then link the database entry for Mr. Smith to the group account for Company X through use of a linking table.

Once credentials and users, or groups of users, have been created, credential issuing organizations and/or users can associate the credentials with users, or groups of users. For example, the server 1630 may present a web interface through which grantors can interact via a Web browser to link a given credential to a given user or group of users. In other aspects, the server 1630 may be directly accessible via a graphical-user interface or an application on a mobile device. Credentials may be associated with users, or groups of users, for example, by generating a credential identifier for a given user or group of users, and associating the credential identifier with the user or group of users by storing an entry for the credential identifier as a database entry related to a credential. In addition to association of credentials to users and groups of users by grantors, registered users also may request that certain users, or groups of users, be associated with certain credentials through a web-based or other interface, or through any other suitable means such as sending email or SMS transmissions to grantors. In some implementations, users may be able to associate their user accounts with one or more credentials by use of an application running on a client device. Furthermore, the server 1630 also may notify the users that they have been associated with the credential(s), for example by pushing notifications to the respective users' client devices. Such notifications may include the credential identifier and/or a key for the user.

As described herein, a key may be any suitable alphanumeric code that is unique to a given user. For example, a key may be a symmetric key or shared secret between the client device and the server that can be used to maintain a private information link. In other implementations, the key may be a private key and/or public key that can be used with a public-key cryptographic system. The key may be of any suitable length such as, for example, 80 bits, 128 bits, or 256 bits. In some implementations, an application executing on the client device may have the key pre-installed, or may receive a key when a user first runs the application and creates a user account associated with the application, or may receive a key when a user logs into the application from the client device. In some implementations, the client device may receive the key from the server in a key exchange (e.g., a Diffie-Hellman key exchange).

Once credentials have been associated with appropriate user and/or group accounts, the credentials can then be distributed to client devices for the appropriate users via the network 1650. For example, the network 1650 may be a local area network ("LAN") and/or a wide area network ("WAN"), e.g., the Internet. In some versions, the server 1630 may communicate with the client devices via SMS or multimedia messaging service (MMS). The server 1630 may access user accounts in a database to locate the appropriate users' client devices.

Client devices 1602, 1604, 1614 or 1624 can receive the credentials associated with their respective users 1606, 1608, 1612 or 1622 and store them in any suitable memory for later retrieval. A given user 1606, 1608, 1612 or 1622 may be associated with multiple different credentials. Furthermore, some or all of the credentials associated with a user 1606, 1608, 1612 or 1622 may be accessible on a user's client device 1602, 1604, 1614 or 1624 respectively. In particular, software applications executing on the client devices 1602, 1604, 1612 or 1622 can retrieve the credentials associated with users 1606, 1608, 1614 or 1624 respectively, so they can be used for generating and presenting a representation of the credential (e.g., to a validation entity for validation). The client devices 1602, 1604, 1614 or 1624 may be any type of computing device, including but not limited to a mobile phone, smart phone, personal digital assistant (PDA), music player, e-book reader, tablet computer, laptop or desktop computer, or other stationary or portable device, that includes one or more processors and non-transitory computer readable storage media. The software application can be written in any suitable programming language such as, for example, Objective-C, C++, Java, etc.

Continuing with the example described previously, upon receiving the identifying information at the validating device 1602, the application processes the information and transitions the user interface to display the information about the user 1608 who is discovered in the first neighborhood by performing the peer discovery search. For example, the application may transition the user interface from the screen 1642*a* to a screen similar to 1400C or 1400D.

In some implementations, the user 1606 may operate the client device 1602 to discover peer users in the second neighborhood using the long-range communication protocol. This may be the case, for example, when a search performed using the short-range communication protocol fails to return any peer user in the first neighborhood. Alternatively, this may be the case when the user 1606 wants to find a greater number of peers in a wider area around the validating device, in addition to discovering peers in the immediate first neighborhood. In such cases, the user may interact with the application running on the validating device 1602 to initiate a peer discovery search using the long-range communication protocol. Based on the user interaction, the application may present the UI screen 1642*b* shown on the display coupled to the validating device 1602.

The device 1602 may send the send a message to the validation server 1630 over the network 1650, requesting information about peer users who are located in the second neighborhood of the validating device 1602. The request message may include the device 1602's identifying information and also the present location of the device.

Upon receiving the request, the validation server 1630 determines the validating device 1602's location, and identifies peer users who were located in the second neighborhood of the validating device 1602 in a predetermined time period (e.g., in the last 24 hours). In some cases, the predetermined time period may be set by a time period received from a user of validating device 1602. Any information on identified peer users may be restricted or filtered by this predetermined time period.

Users 1612 and 1622 may have credentials issued by the same credential issuing organization as the user 1606 that are stored in their respective devices 1614 and 1624. The users 1612 and 1622 may have performed some physical access in the predetermined time period (e.g., last 24 hours) using the credentials on their respective devices, for example, checking in to the main office building 1610, or logging in remotely from a satellite office 1620. The users' locations may have been logged by entities of the credential management system (e.g., electronic door reader managed by the credential management system) at each location and transmitted to the validation server 1630 over the network 1650. The validation server stores the location information associated with the users' devices, along with identifying information about each user.

After identifying the users 1612 and 1622 as being associated with the same credential issuing organization as the user 1606 making the request, the server 1630 determines what information corresponding to the users 1612 and 1622 may be sent to the validating device 1602. Then, the server 1630 sends a response to the validating device 1602 with the determined information. As discussed previously, the information that is shared may include the image, name and title of the each user 1612 and 1622, among others.

Upon receiving the identifying information at the validating device 1602, the application processes the information and transitions the user interface to display the information about the users 1612 and 1622 who are discovered in the second neighborhood by performing the peer discovery search. For example, the application may transition the user interface from the screen 1642b to a screen similar to 1500C or 1500D.

Figure 17:
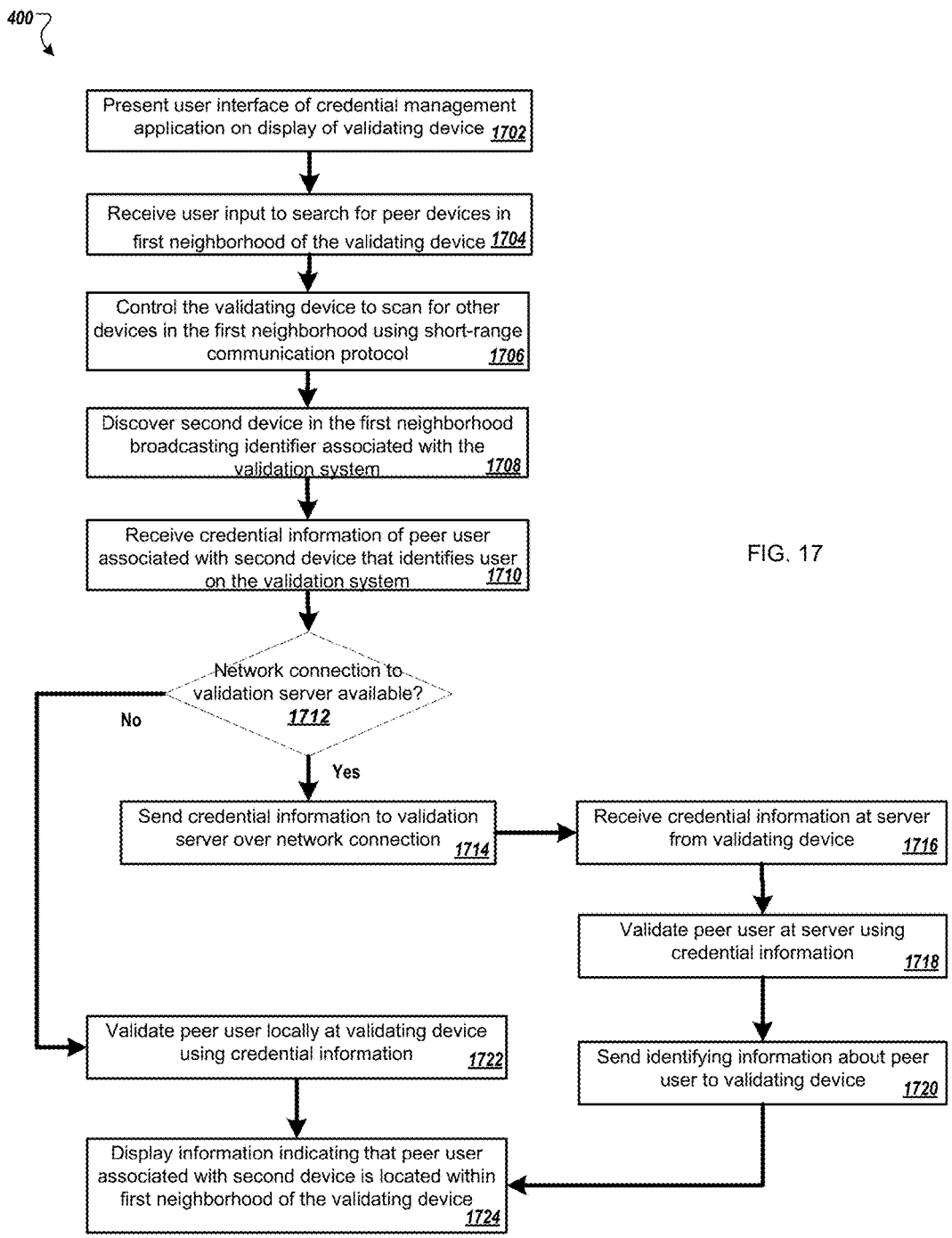
FIG. 17 illustrates an example process for performing a peer discovery search in a first neighborhood of a user initiating the search for other users associated with a common credential issuing organization as the user initiating the search.

FIG. 17 illustrates an example process 1700 for performing a peer discovery search in a first neighborhood of a user initiating the search for other users associated with a common credential issuing organization as the user initiating the search. The process 1700 may be performed, for example, by the credential management application running on client device 1602, in conjunction with the server 1630, in an area around the client device that is limited by the transmission range of the short-range communication protocol used for the search. Accordingly, the following description describes the process 1700 as performed by the components of the system 1600. However, in other implementations, the process 1700 also may be performed by other systems (e.g., system 1000), including other client devices and servers.

At 1702, the credential management application running on the validating client device presents a user interface associated with the credential management application on a display of the client device. For example, the user 1606 may launch the credential management application on the client device 1602. Upon launching, the application may present the associated user interface on the device display, with the user interface providing a screen such as 1400A that shows a representation of the user 1606's own credential.

At 1704, the application receives user input to search for peer devices in a first neighborhood of the validating device. For example, the user 1606 may provide the input 1412 from the screen 1400A to search for peer users who are located in the first neighborhood of the client device 1602. The search for peer devices in the first neighborhood may be performed based on direct network connectivity between the client device 1602 and the peer devices, using a short-range communication protocol supported by the client device 1602, e.g., Bluetooth™, Wi-Fi Direct, or NFC. The geographic range of the first neighborhood may be determined based on the specification of the short-range communication protocol. For example, the short-range communication protocol may be Bluetooth™ version 4.0 or Bluetooth Low Energy (BLE), and the range may be set at 100 meters from the client device 1602. Alternatively, the geographic range of the first neighborhood may be configured by the application running on the client device 1602.

The received user input can be a request to identify users or devices associated with a credential management system that are located nearby. A user can be associated with the credential management system if the user has an account, profile, or identity indicated in the records of the system. A device may be associated with the credential management system by, for example, being registered with the system. For example, the system may store a device identifier for the device that is associated with a user identifier for a particular user. As another example, a device may be associated with the system by virtue of having an application that communicates with the system installed or running on the device.

The peer users are other users who are registered with the same credential issuing organization as the user 1606. The credential issuing organization may have issued credentials to the peer users, which may be stored on their respective client devices and managed by instances of the credential management application running on the respective client devices.

Upon receiving the user input, at 1706, the application controls the validating device to scan for other devices that are located in the first neighborhood of the validating device, using the short-range communication protocol. For example, the application controls the network resources (e.g., network radio) of the client device 1602 to listen for direct wireless communications, i.e., wireless signal transmissions, from other devices that are sent using the short-range communication protocol. In some implementations, the client device 1602 will successfully receive the signal transmissions from other devices that are only in close physical proximity, e.g., within a predetermined distance that is associated with the first neighborhood of the client device 1602.

Based on the scan, at 1708, the application discovers a second device in the first neighborhood of the validating device that is broadcasting an identifier associated with the validation system. For example, the validating device 1602 may receive a short-range communication protocol signal transmission from the device 1604 that includes a unique identifier associated with the credential issuing organization that issued the credential for the user 1606 stored by the validating device 1602. The application running on the device 1602 receives the identifier from the device and, upon examining the identifier, determines that the device 1604 is a peer device that is registered with the common credential issuing organization. Since the identifier is received using the short-range communication protocol signal transmission, the application also determines that the device 1604 is located in the first neighborhood of the validating device 1602.

At 1710, the application receives credential information of a peer user associated with the second device that identifies the user on the validation system. For example, the application running on the validating device 1602 receives, from the instance of the application running on the peer device 1604, a representation of a credential of the user 1608 associated with the device 1604. The credential is issued by the credential issuing organization that issued the user 1606's credential, and it uniquely identifies the user 1608 to the credential management system.

In general, identification information that identifies users associated with one or more identified devices can be received. This information may indicate a credential of user, or include a representation of a credential, or may simply identify the user. The information may be validated to verify the validity of the received information. For example, the data may be validated by a validation server. Validating the data may include performing one or more operations including but not limited to, for example, determining whether the data is authentic, determining a source or issuing authority of the data and verifying that the source or issuing authority of the data issued the data, determining that the data is not expired, damaged, or corrupted, and determining that the data is in a particular format.

At 1712, the application checks whether a network connection to the validation server is available. For example, the client device 1602 checks whether the validation server 1630 is reachable via a network connection established over the network 1650.

In some implementations, the application may send a "heartbeat" message to the server 1630 and check whether a response to the message is received within a timeout period. If a response is received, then the validation server 1630 is accessible over the network connection. However, if a response is not received, or a message is received indicating that a network path could not be established, then the application determines that the validation server is not accessible over a network connection.

In some implementations, the application may directly send a validation request message to the server 1630 over the network 1650, and check whether a response to the message is received within a timeout period. The validation request message may include the credential information of the peer user. If a response is not received within the timeout period, then the application determines that the validation server is not available over the network connection.

If the application determines that a network connection to the server is available, then, at 1714, the application sends the credential information to the validation server over the network connection. For example, the client device 1602 sends a message to the server 1630 over the network 1650. The message may include the credential information received from the device 1604 along with the client device 1602's own identifying information. The message may request the server 1630 to validate the credential of the user 1608 based on the credential information included in the message, and return to the client device 1602 identifying information associated with the user 1608.

At 1716, the server receives the credential information from the validating device. For example, the server 1630 receives a message from the client device 1602 that includes credential information associated with the user 1608, and information identifying the user 1606 associated with the device 1602.

At 1718, the server validates the peer user using the credential information. For example, as described previously, the server 1630 verifies the identity of the user 1606 based on the identifying information included in the message received from the client device 1602. The server also checks whether credential associated with the user 1608 based on the credential information included in the message, and determines whether the credential is valid, i.e., whether it is a bona fide credential issued by the credential issuing organization indicated by the credential and whether it is still active.

At 1720, the server sends identifying information about the peer user to the validating device. For example, if the identity of the user 1606 is verified, and the validity of the credential associated with the user 1608 is confirmed, the server 1630 determines, as described previously, what identifying information associated with the user 1608 to send to the requesting device 1602. The information may include an image associated with the user that is included in the credential representation, and name and title of the user, or any other suitable information. The server retrieves the information and sends it to the validating device 1602 over the network connection through the network 1650.

If, upon checking at 1712 whether a network connection to the validation server is available, the application determines that a network connection to the server is not available, then, at 1722, the application validates the peer user locally at the validating device using the credential information. For example, the application running on the validating device 1602 may receive, from the peer device 1604, additional identifying information corresponding to the user 1608. The application uses the credential information and the additional identifying information received from the device 1604 to validate the credential associated with the peer user 1608 locally in offline mode, without accessing the resources of the server 1630.

When the credential is validated, either based on information received from the server at 1720, or based on local validation at 1722, then, at 1724, the application displays information indicating that a peer user associated with the second device is located within the first neighborhood of the validating device. For example, when the application running on the validating device 1602 receives, from the server 1630, the identifying information about the peer user 1608, this indicates to the application that the credential associated with the user 1608 is successfully validated. Alternatively, the application determines that the credential associated with the user 1608 is valid based on local validation at 1722. In either case, the application displays the identifying information associated with the user 1608 using any of the screens 1400C, 1400D, 1400E, 1400G or 1400H of the user interface shown on the display of the device 1602. The identifying information associated with the user 1608 displayed using any of the screens 1400C, 1400D, 1400E, 1400G or 1400H indicates that the user 1608 is located in the first neighborhood of the client device 1602, and the user is discovered by performing a peer discovery search using the short-range communication protocol.

Figure 18:
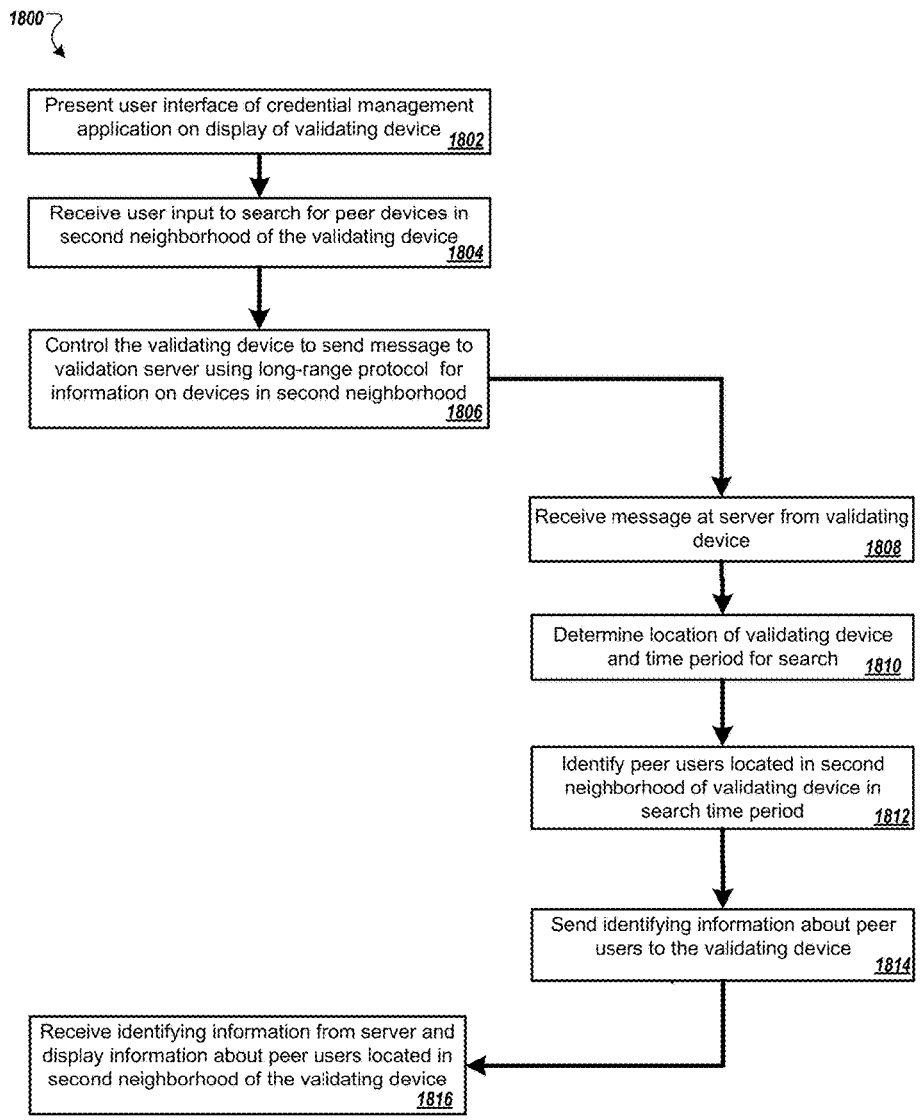
FIG. 18 illustrates an example process for performing a peer discovery search in a second neighborhood of a user initiating the search for other users associated with a common credential issuing organization as the user initiating the search.

FIG. 18 illustrates an example process 1800 for performing a peer discovery search in a second neighborhood of a user initiating the search for other users associated with a common credential issuing organization as the user initiating the search. The process 1800 may be performed, for example, by the client device 1602, in conjunction with the server 1630, in a wide geographic area around the client device that is beyond the transmission range of the short-range communication protocol used for the process 1700. In some implementations, the process 1800 may be performed in conjunction with the process 1700. For example, the user may initially search the first neighborhood using the process 1700, and then switch to searching the second neighborhood using the process 1800. Accordingly, the following description describes the process 1800 as performed by the components of the system 1600. However, in other implementations, the process 1800 also may be performed by other systems, including other client devices and servers.

At 1802, the credential management application running on the validating client device presents a user interface associated with the credential management application on a display of the client device. For example, the user 1606 may launch the credential management application on the client device 1602. Upon launching, the application may present the associated user interface on the device display, with the user interface providing a screen such as 1400A that shows a representation of the user 1606's own credential. Alternatively, the user 1606 may have performed a prior search in the first neighborhood of the client device 1602 using the process 1700 and the application may present a user interface screen, such as 1400L, associated with the prior search.

At 1804, the application receives user input to search for peer devices in the second neighborhood of the validating device. For example, the user 1606 may provide the input 1412 from the screen 1400A, and then select the tab 1416 to search for peer users who are located in the second neighborhood of the client device 1602. Alternatively, the user may provide input selecting the button 1458, or the tab 1416, from the screen 1400L.

The search for peer devices in the second neighborhood may be performed using one or more communication protocols supported by the client device 1602 that are configured for communication covering distances greater than that possible using a short-range communication protocol. For example, the communication protocols may be IEEE 802.11, LTE, WiMAX, other 3G, 4G or 5G protocols, Ethernet, Internet connections, among others. The geographic range of the second neighborhood may be configured by the credential issuing organization and may be set to a distance greater than direct connection range of the client device 1602, e.g., 3 miles. In some implementations, the distances used to define a first neighborhood or the second neighborhood may be user-specified distances indicated through a user interface of the application on the user's device.

As described previously, the peer users are other users who are registered with the same credential issuing organization as the user 1606. The credential issuing organization may have issued credentials to the peer users, which may be stored on their respective client devices and managed by instances of the credential management application running on the respective client devices.

Upon receiving the user input, at 1806, the application controls the validating device to send a message to a validation server using a long-range protocol for information on devices in the second neighborhood. For example, the application controls the network resources (e.g., network radio) of the client device 1602 to send network communications to the validation server 1630 over the network 1650, where the network connection is established using one or more of the long-range protocols identified above. The message requests the server 1630 to return results including information about peer devices that are determined to be within the second neighborhood of the client device 1602. The message may include the client device 1602's identifying information, and the present location of the client device. The present location of the client device may be determined using location services available at the client device, e.g., using GPS positioning or wireless triangulation.

At 1808, the message from the validating device is received at the server. For example, the server 1630 receives, through an API provided by the server, a request message from the client device 1602 that includes information identifying the user 1606 associated with the device 1602, and information about the location of the client device 1602.

At 1810, the server determines the location of the validating device and the time period for search. For example, the server 1630 notes the location of the client device 1602 from the location information included in the request message, and also notes the time the request message was sent.

In some implementations, the location of the client device determines the second neighborhood of the client device 1602, which may be a geographic area centered on the determined location of the client device 1602 and having a radius configured by administrator of the credential issuing organization, e.g., 3 miles. The time the request message was sent determines the search period. For example, the search period may cover the predetermined time period (e.g., 24 hours) in the past from the time the request message was sent. The predetermined time period may be set by the administrator of the credential issuing organization.

At 1812, the server identifies peer users located in the second neighborhood of the validating device in the search time period. For example, as described previously, the server 1630 logs the locations of the devices of peer users whenever they perform some form of physical access using a resource associated with the credential management system (e.g., a door reader). The server 1630 checks its stored information and identifies the users associated with the credential issuing organization who had logged their locations in the second neighborhood of the validating device 1602 within the search time period. For example, the server may determine that the last-logged locations of users 1612 and 1622 are in the second neighborhood of the device 1602, and the users 1612 and 1622 had logged their locations within the search time period.

At 1814, the server sends identifying information about the peer users to the validating device. For example, upon identifying the peer users 1612 and 1622 based on their logged locations, the server 1630 determines, as described previously, what identifying information associated with users 1612 and 1622 to send to the requesting device 1602. For each user, the information may include an image associated with the user that is included in the user's credential representation, and name and title of the user, or any other suitable information. The server retrieves these information and sends the information to the validating device 1602 over the network connection through the network 1650.

At 1816, the application receives the identifying information from the server and displays information about peer users who are located in the second neighborhood of the validating device. For example, when the application running on the validating device 1602 receives, from the server 1630, the identifying information about peer users 1612 and 1622, the application displays the identifying information associated with the users 1612 and 1622 on the screen 1500C of the user interface shown on the display of the device 1602. The identifying information associated with the users 1612 and 1622 displayed on the screen 1500C indicates that the users 1612 and 1622 are located in the second neighborhood of the client device 1602, and the users have been discovered by performing a peer discovery search in the second neighborhood of the validating device 1602.

According to some implementations, after discovering or searching for validated peers through a credential management system, a user may request additional information regarding the peers through the credential management system. One or more credential management servers (e.g., servers 1030 and 1630) storing information associated with multiple users may perform user analytics and provide the requested additional information to the user. In addition, the user may request the credential management system to associate the discovered peers with a group or credential. The user may also share information and data with one or more of the discovered peers associated with a particular group or credential in a convenient manner. The credential management system may provide, as described above, a credential issuing organization with an interface including a hierarchical menu to associate conditions with the credentials during the creation of the credentials. The conditions may determine which users of the credential management system may be able to view other user's information and to determine the type of information or data that can be viewed. Examples described hereinafter provide a further description of these implementations.

After detecting one or more validated peers, one of screens 1400C, 1400D, 1400E, 1400G, 1500C, and 1500D may be displayed according to a setting of the credential management application on a client device. For instance, when the setting of the credential management application on a client device is configured not to provide, at least initially, location information when displaying one or more validated peers, screens 1400C, 1400D, 1400E, and 1400G may be displayed on the client device. When the setting of the credential management application on a client device is configured to provide location information when displaying representations of one or more validated peers, screens 1500C and 1500D may be displayed as shown in FIGS. 15C and 15D. In FIG. 15C, as described above, several validated peers, such as peers represented by thumbnail images 1512*a* and 1512*b*, are displayed on a map. If a user of the client device is interested in obtaining more information associated with one of the peers, such as the peer associated with thumbnail image 1512*a*, the user may select the thumbnail image 1512a using, for example, a touch input at an area of a client device's touch screen corresponding to the thumbnail image 1512a.

Figure 19:
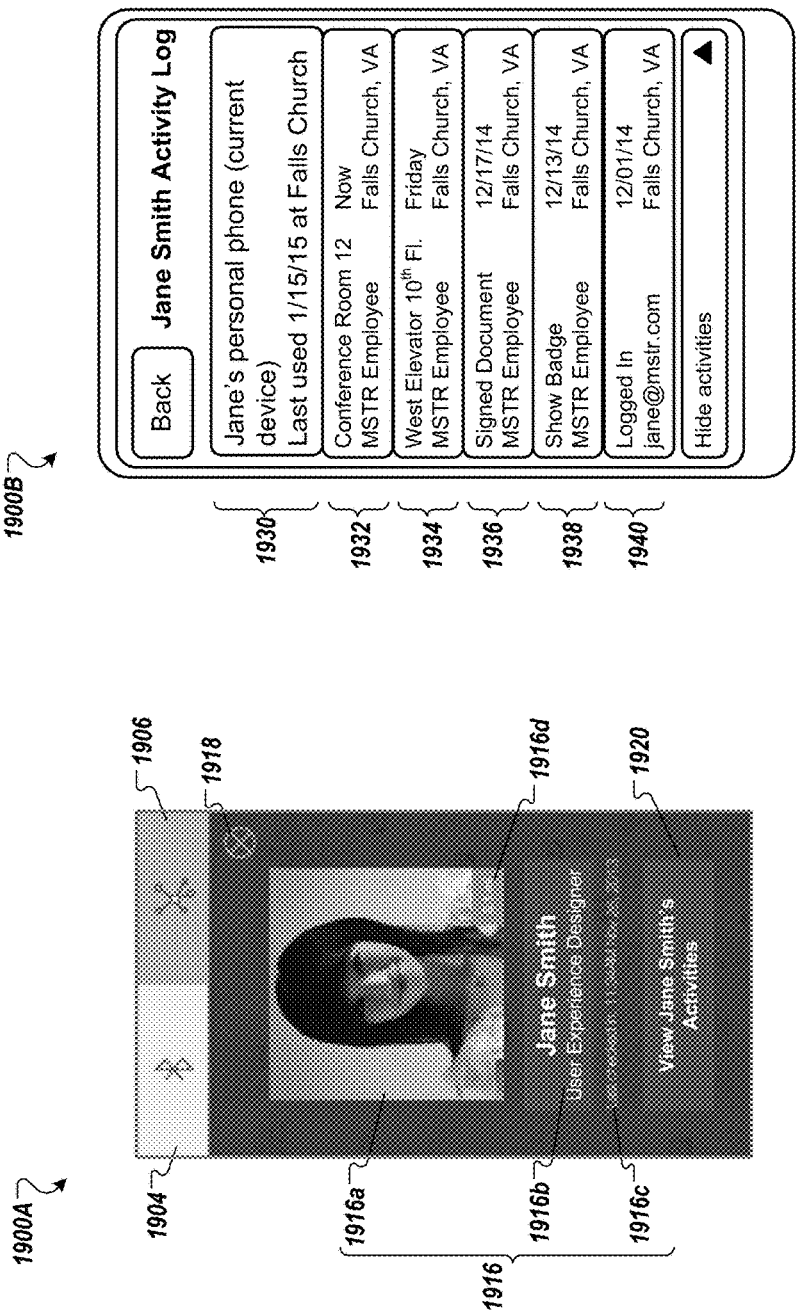
FIGS. 19A and 19B illustrate screens displayed by an example user interface running on a client device that is operable to present representations of a peer credential and an activity log of the peer.

In response to the touch input, the client device may display information (e.g., a credential) regarding the peer (e.g., "Jane Smith") associated with thumbnail image 1512a as shown, for example, in screen 1500E of FIG. 15E and screen 1900A of FIG. 19A. Screen 1900A displays a credential representation 1916, graphical image 1916a, identifying information 1916b, temporal information 1916c, a numerical indication 1916d, a graphical icon 1918, and tabs 1904 and 1906, which may correspond to the credential representation 1516, graphical image 1516a, identifying information 1516b, temporal information 1516c, a numerical indication 1516d, a graphical icon 1518, and tabs 1504 and 1506 described with respect to screen 1500E. Screen 1900A additionally includes an activity log interface 1920. If the user of the client device is not authorized to view an activity log of the peer associated with thumbnail image 1512a or the client management server has not stored an activity log of the peer associated with thumbnail image 1512a, screen 1500E may be displayed. If the user of the client device is authorized to view an activity log of the peer associated with thumbnail image 1512a and the client management server has stored an activity log of the peer associated with thumbnail image 1512a, screen 1900A may be displayed. It should be appreciated that an activity log interface 1920 may be provided in various suitable manners and is not limited to being displayed as activity log interface 1920. For example, in some cases, a left swipe, right swipe, or some other suitable input may be provided by the user on screen 1500E to transition to screen 1900A or any other screen that enables access to an activity log of a peer associated a displayed thumbnail image.

After selecting an activity log interface 1920 of the peer (e.g., "Jane Smith") associated with thumbnail image 1512a, the credential management application may display a screen 1900B on the client device showing an activity log of the peer (e.g., "Jane Smith") associated with thumbnail image 1512a. The screen 1900B shows a header 1930 for "Jane's personal phone," which is the current device that the peer associated with thumbnail image 1512a is accessing. The header 1930 also indicates that the last time Jane's personal phone was used (e.g., Jan. 15, 2015) and the last location Jane's personal phone was used (e.g., Falls Church). The activity log includes additional entries with further details on usage of Jane's personal phone. The entries include: an entry 1932 indicating that Jane is currently logged in at Conference Room 12 in her company's office (e.g., MicroStrategy) in Falls Church, Va.; an entry 1934 indicating that Jane logged in to her account on Friday to access the West Elevator on the 10$^{th}$ floor in MicroStrategy's office in Falls Church, Va.; an entry 1936 indicating that Jane signed a document with the Jane's MicroStrategy employee credential on Dec. 17, 2012 in Falls Church, Va.; an entry 1938 indicating that Jane presented her MicroStrategy employee credential on Dec. 13, 2012 in Falls Church, Va., and an entry 1940 indicating that Jane logged into an account (e.g., email) associated with her MicroStrategy employee credential on Dec. 1, 2012 in Falls Church, Va. The screen 1900 displaying the activity log may also include: a "Hide activities" command button to hide the displayed entries in Jane's activity log; and a back command button to navigate the credential management application to the previous screen (e.g., screen 1900A shown in FIG. 19A).

As can be appreciated from FIGS. 19A and 19B, after discovering a peer using the credential management application, a user of a client device may obtain more information about the peer by selecting the peer's representation on a screen displaying one or more of the discovered and validated peers. While FIG. 19B illustrates an example in which a peer's activity log is displayed, it should be understood that various types of information associated with the peer may be displayed. For instance, a peer's biographical data, transcript, enterprise profile, employment duration with an enterprise, address, contact information, certifications, location history, and various other types of information may be displayed.

Figure 20:
FIG. 20 illustrates a screen of a credential management application on a client device that displays information associated with a peer.

As an example, FIG. 20 illustrates a screen 2000 of a credential management application on a client device that displays information associated with a peer named "Marcus Johnson" after a user of the client device requests information on the peer. As shown in FIG. 20, a trail of the peer's locations within a certain time period (e.g., on the day of Oct. 29, 2013) is displayed on a map as well as a log. The log may include a location of the peer, the time at the location, and the order in which the peer was determined to be at location. In addition to the time and location information, biographical information, employment information, contact information, and certification information of the peer is displayed. The time period for which information is displayed may be adjusted by the user of the client device through the credential management application, for instance, by inputting the time period the user is interested in. By displaying a trail of the peer's location, a user may be able to determine behavioral patterns of the peer. For example, the trail of the peer's location may indicate that the peer spends short periods of time at one department store before moving to another department store. In another example, the trail of the peer's location may indicate that the peer repeatedly returns to a particular store.

In some implementations, the information associated with a peer includes one or more of information provided by the peer when the peer is registering with the credential management system to obtain a credential, information associated with the peer that is provided by a credential issuing organization, and activity information generated by the credential management server and/or the credential management application as described hereinabove.

Figure 21A:
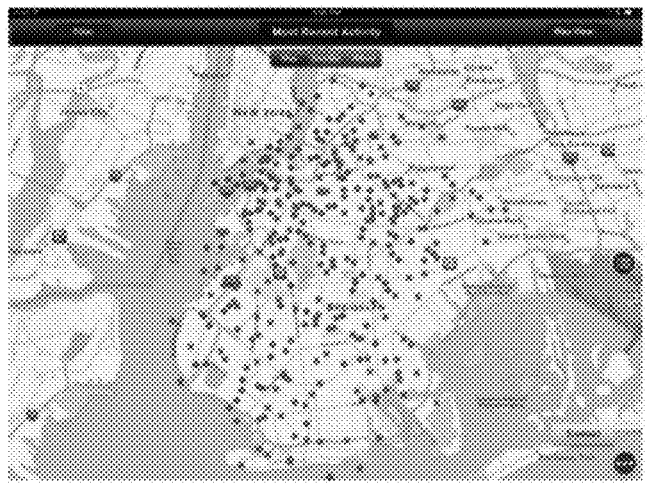
FIGS. 21A and 21B illustrate a map view and a list view, respectively, of the location of multiple peers in an enterprise.
Figure 21B:
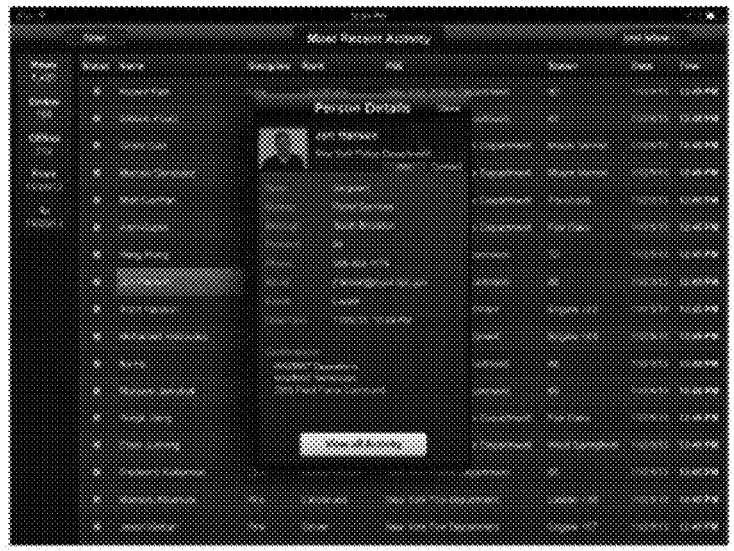

In some implementations, a user of the client device may be able to view information (e.g., credentials) associated with multiple peers at the same time. For example, FIG. 21A illustrates a screen 2100A displaying a map view of the location of multiple peers in an enterprise, similar to screens 1500C and 1500D illustrated in FIGS. 15C and 15D, respectively. FIG. 21B illustrates a screen 2100B displaying a list view of the location of multiple peers in an enterprise. A user of the client device may select a name of a peer (e.g., "Jeff Hansen") in the list of peers to view the selected peer's information.

Figure 22A:
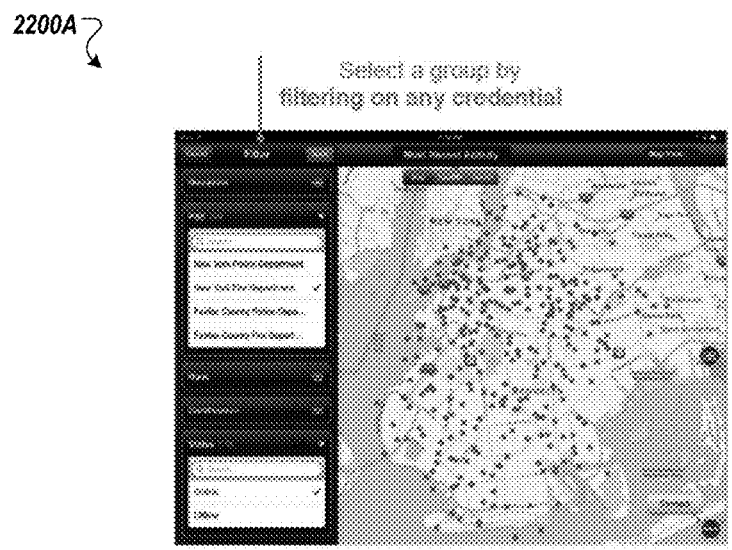
FIGS. 22A and 22B illustrate screens of a credential management application on a client device for applying a filter to search for peers and to group peers, respectively.

To enhance user experience of the credential management application, a user may apply filters to limit a number of discoverable peers according to a particular criteria of interest to the user. For example, as shown in the client device screen 2200A illustrated in FIG. 22A, the criteria may include an organization name, a rank, a certification, or a status (e.g., online or offline) of a peer. In FIG. 22A, the user has selected the "New York Fire Department" as an organizational filter and "online" as the status of a peer. In general, any suitable criteria may be used to filter a number of peers that can be discovered. The filter may be selected from a drop down list or may be entered by the user in a search filter window, as shown in FIG. 22A. After applying one or more filters to limit the number of peers that can be discovered according to a criteria of interest to the user, the user may view one or more credentials of the discovered peers as described herein above.

Figure 22B:
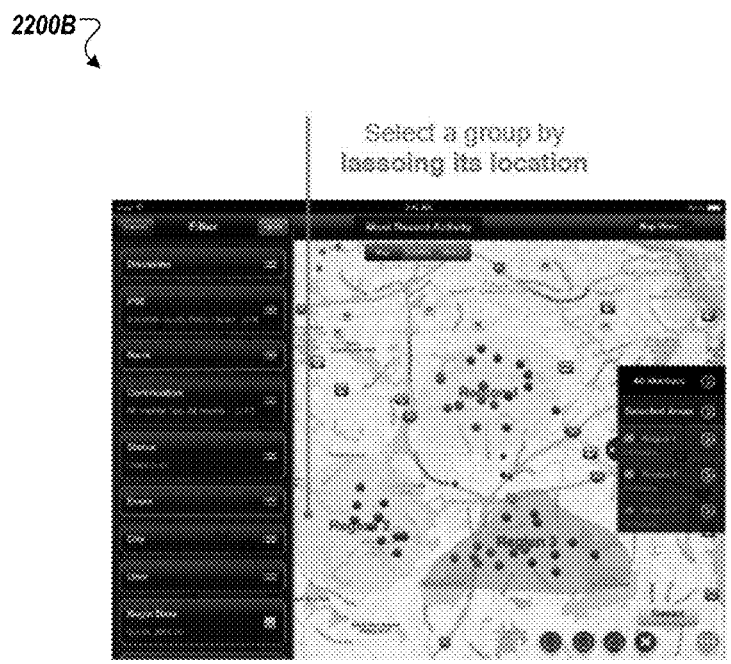

The credential management application includes multiple additional features to enhance user experience. For example, as described hereinabove, a user may group one or more peers and may request the credential management system to assign the group to a particular identity or credential. The above-described filters may be used to group peers according to a particular criteria. In addition, as shown in the client device screen 2200B illustrated in FIG. 22B, a lassoing tool may be provided by the credential management application to group peers according to their geographic locations and proximity to one another. For instance, in FIG. 22B, peers have been divided into 3 groups using the lassoing tool based on the respective location of the peers.

In some cases, a user may desire to store a memory associated with a particular group, time, or event (e.g., a meeting, conference, college reunion). For example, if the user is at the same location with other validated peers (e.g., in a meeting), the user may create a group of the one or more of the meeting participants who are validated peers in the manner described above, take a picture of the group using a camera on the user's client device, and send the picture and any other file or data to peers in the group using the identifying information provided by the credentials of the validated peers.

According to the described implementations, a user of a client device may search for or discover peers and subsequently perform operations such as obtaining information associated with the peers or grouping one or more peers. As described hereinabove, during the creation of a credential for a user, different levels of access and/or conditions are assigned to each user through the user's credential. The level of access may be assigned based on multiple parameters. In some cases, a user's level of access may be assigned according to the user's rank, occupation, or title within an organization. In some cases, a user's level of access may be assigned based on the user's profession.

Prior to providing information associated with a validated peer to a user, the user's level of access is checked to determine if the user is permitted to view the information associated with a validated peer and to determine a type of information the user is permitted to view. In some cases, the user's rank, occupation, or title within an organization is checked to determine the user's level of access and/or a type of information the user is permitted to view. In some cases, a user and peer's professional affiliation or association may be determined. If the user and peer have the same professional affiliation and/or association, the user may be granted access to the peer's credential and information. Accordingly, only authorized users may have the ability to view information associated validated peers that have been searched for or discovered through the credential management application.

Figure 23A:
FIGS. 23A and 23B illustrate screens in which a user is utilizing cyber security features of a credential management application on a client device.
Figure 23B:

In some implementations, a user of the credential management application may be a security officer, cyber security officer, network manager, or Information Technology specialist and may need to monitor activity within a particular organization, network, or with users associated with particular credentials. Such a user may have an access level that enables the user to monitor all activity associated with a particular organization, network, or credential. Such a user's credential may be configured so that the user's client device (s) receives data from the credential management server to indicate, for example, any irregular usage patterns (e.g., a credential being accessed at the same time from two different locations), unexpected activity, or access. Based on the received data, the user may also be able to determine a volume and timing of access requests, threats, etc. The user's credential may also be configured so that the user's client device(s) receives alerts when unusual activity is detected. FIGS. 23A and 23B illustrate screens 2300A and 2300B, respectively, of a user who is monitoring cyber activity as described hereinabove.

Hereinafter, implementations of a credential management system in (i) an enterprise or organizational environment; (ii) a retail environment; and (iii) an educational environment are described.

In the first example scenario related to an enterprise or organizational environment, a user, such as an employee of an organization (e.g., MicroStrategy), is a registered user of a credential management system and has a credential management application stored on the user's device. The user has a meeting with other employees of the organization in a conference room. The user's office is, for example, on the $10^{th}$ floor, and the meeting is scheduled in a conference room, for example, on the $12^{th}$ floor. When traveling from the $10^{th}$ floor to the $12^{th}$ floor, the user selects credential 508, as shown in FIG. 5, corresponding to a "MicroStrategy Employee Badge" from the user's wallet 500. Subsequently, the user selects keys associated with credential 508, and the user interface 1300, including a list 1302 of five keys 1304, 1306, 1308, 1310, and 1312 issued to the user by MicroStrategy, is displayed on the client device, as shown in FIG. 13. The user selects key 1306 to access an elevator to travel from the $10^{th}$ floor to the $12^{th}$ floor. Upon arrival on the $12^{th}$ floor, the user selects a key to enter the conference room on the $12^{th}$ floor to participate in the meeting. The credential management system records and stores each interaction of the user with the credential management system through the user's credential management application, in a similar manner as the activity log 900 shown in FIG. 9. The credential management system is therefore able to determine a path taken by the user from the user's office to the conference room. For example, the credential management system may determine that the user took the elevator to travel from the $10^{th}$ floor to the $12^{th}$ floor. The credential management system may also determine a path taken by each participant who is a validated user and is attending the meeting in the conference room.

When in the conference room on the $12^{th}$ floor, the user may use the peer discovery process described above in FIGS. 14A-18 to determine who the peers participating in the meeting are or who others present in the conference room are. For example, as described above with respect to FIGS. 14A and 14B, when in the conference room, the user may elect to perform a short-range or direct connectivity communication protocol, such as Bluetooth™, Wi-Fi Direct, or near field communication (NFC), by transitioning from the user's credential display 1400A to screen 1400B through a sliding action and selecting tab 1414 on screen 1400B to search for peers. The credential management application on the user's device displays a screen similar to the screens shown in FIGS. 14C-14H to indicate detected peers that are participating in the meeting or that are present in the conference room, using the peer discovery process described above in FIGS. 14A-18.

After detecting the validated peers of the credential management system that are participating in the meeting or that are present in the conference room, the user may perform several operations. For example, the user may request the credential management system to create a group that includes one or more peers detected during the peer search or to associate one or more peers detected during the peer search with a new credential. The new credential may be associated with the meeting. For instance, if confidential information is discussed during the meeting, the new credential may be used to provide access to the confidential information only to peers present at the meeting. In another operation, the user may take one or more pictures at the meeting of peers participating in the meeting. The user may then share the one or more pictures with validated peers participating in the meeting in real-time. In another operation, the user may also send an email, text message, or file to one or more validated peers participating in the meeting. In another operation, the user may select one or more of the validated peers participating in the meeting and request the credential management system to provide activity information in addition to the temporal information displayed with credentials of the one or more validated peers participating in the meeting. The activity information may include, but is not limited to, an activity log of a peer, one or more locations of a peer, and interactions of the peer with the credential management server.

Because the activity information of peers may include private information, access to the activity information of peers may, in some implementations, only information that the user is authorized to view will be displayed on the user's device.

In the second example scenario related to a retail environment, peer discovery and provision of activity information may be utilized to provide enhanced customer service. For instance, a customer registered with the credential management service of a retail store (e.g., shopping center or super market) may visit the retail store and may request peer discovery through the customer's credential management application on the customer's mobile phone. The credential management service may determine validated peers (e.g., peers that the credential management system has identified as having a corresponding credential) in the retail store. For instance, the customer's credential management application may display a list of customer service representatives that are in proximity to the customer in response to the peer discovery request. By viewing an activity log of the customer service representatives determined to be in proximity to the customer using the customer's credential management application, the customer may be able to obtain information on the customer service representative including, for example, a specialization (e.g., product type) of the customer service representative, a sales record of the customer service representative, and employment duration of the customer service representative.

A customer service representative who is registered with the credential management service of the retail store may also be able to utilize peer discovery through the customer service representative's credential management application and locate customers who are registered with the credential management service of the retail store. By viewing the activity information of a customer detected through peer discovery, the customer service representative may be able to obtain information on the customer including, for example, a shopping frequency of the customer, frequently purchased items, the last or previous time the customer visited the retail store, and a status (VIP, preferred, etc.) of the customer. If the customer detected through the customer service representative's credential management application is a preferred customer, the customer service representative may provide preferential service, such as special discounts, to the preferred customer. If the customer has provided the retail store with contact information such as an email address or phone number, the customer service representative may also send a preferred customer detected by the peer discovery process, coupons or other retail information via email or SMS from the customer service representative's credential management application to the customer.

A credential (e.g., badge) provided by the retail store to a customer or customer service representative may enable access to one or more parts of the retail store. The credential may also be utilized by the customer or customer service representative to obtain discounts or other privileges at the retail store since an identity of the credential holder is validated.

In the third example scenario related to an educational environment, peer discovery may be used by a teacher to take attendance in a class. For example, if the teacher and all students enrolled in the teacher's class share a class credential and have devices with a credential management application installed, the teacher may be able to select the class credential and perform a peer search using her mobile device. The teacher's credential management application may then display a list of all the students present in the class to take attendance of the students. In addition, by viewing a student's activity log and credential information, the teacher may be able to obtain additional information about a student. The additional information about a student may include the student's parents' names and contact information, the student's attendance record, the student's after school activities, etc.

As can be appreciated from the description herein, a user may search for and discover peers through a credential management system that stores information associated with all interactions of the user and validated peers with the credential management system. The credential management system provides enterprises and organizations an improved manner of managing their employees, customers, and facilitating interactions between their employees and/or customers while maintaining appropriate levels of security.

Features in the described implementations can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
    receiving, by a first user device, a request to identify devices that are associated with a credential management system and are located within a threshold distance of the first user device;
    responsive to receiving the request, searching for one or more devices that are (i) associated with the credential management system, (ii) wirelessly connected to a computer network through a particular communication protocol, and (iii) are located within the threshold distance of the first user device;
    detecting, using the particular communication protocol, one or more wireless devices based on one more wireless signals received from the one or more wireless devices;
    filtering the detected one or more wireless devices to identify a subset of wireless devices comprising one or more second devices that are (i) associated with the credential management system, (ii) wirelessly connected to the computer network through the particular communication protocol, and (iii) are located within the threshold distance of the first user device;
    obtaining identification information that includes one or more credential representations representative of one or more users associated with the one or more second devices, respectively;
    validating the one or more credential representations included in the identification information by communicating with a validation server associated with the credential management system;
    responsive to validation of the credential representations included in the identification information, controlling the first user device to display (i) an indication of the one or more users associated with the one or more second devices, and (ii) an indication that the one or more second devices are located within the threshold distance of the first user device;
    receiving, by the first user device, a second request for activity data of a second user from among the one or more users associated with the one or more second devices, wherein the activity data of the second user includes data indicating (I) one or more interactions of the second user with the credential management system, and (II) one or more respective locations of the one or more interactions of the second user;
    responsive to receiving the second request, determining that a first user of the first user device is authorized to view the activity data of the second user;
    responsive to determining that the first user of the first user device is authorized to view the activity data of the second user, obtaining the activity data of the second user; and
    providing, for display at the first user device, the activity data of the second user.

2. The computer-implemented method of claim 1, further comprising:
    obtaining, by a camera of the first user device, an image of at least one of the one or more users associated with the one or more second devices; and
    transmitting the image of the at least one of the one or more users to the one or more second devices using contact information included in the identification information that includes the one or more credential representations representative of one or more users associated with the one or more second devices.

3. The computer-implemented method of claim 1, further comprising:
    transmitting one or more data files to the one or more second devices using contact information included in the identification information that includes the one or more credential representations representative of one or more users associated with the one or more second devices.

4. The computer-implemented method of claim 1, wherein the searching for the one or more devices comprises:
    performing, using the particular communication protocol, a scan of devices within the threshold distance of the first user device, wherein the particular communication protocol includes Bluetooth, Wi-Fi Direct, or near field communication protocols; or
    performing a search for devices within the first threshold distance of the first user device using IEEE 802.11, Long-Term Evolution (LTE), WiMAX, third generation (3G), 4G, or 5G wireless communication.

5. The computer-implemented method of claim 1, wherein the identification information includes information indicating a name, an occupational title, an image, and contact information for each of the one or more users associated with the one or more second devices.

6. The computer-implemented method of claim 1, wherein the determining that the first user of the first user device is authorized to view the activity data of the second user comprises:
   determining an access level of the first user to view the activity data of the second user; and
   determining that the access level of the first user is sufficient for the first user to view the activity data of the second user.

7. The computer-implemented method of claim 6, wherein the determining the access level of the first user to view the activity data of the second user comprises:
   determining an occupation of the first user; and
   determining a professional association between the first user and the second user.

8. The computer-implemented method of claim 1, further comprising:
   receiving a selection of a subset of users from the one or more users associated with one or more second devices; and
   receiving a request to create a virtual group that includes the subset of users.

9. The computer-implemented method of claim 1, further comprising:
   receiving a selection of a subset of users from the one or more users associated with the one or more second devices; and
   receiving a request to create a credential for the subset of users, wherein the credential provides access to particular information for the subset of users.

10. The computer-implemented method of claim 1, wherein the one or more interactions of the second user associated with a second device with the credential management system include one or more of:
    accessing a credential management application;
    performing an operation of the credential management application;
    accessing a computer device, door, room, or elevator;
    accessing a database of the credential management system; and
    transferring data between the second device associated with the second user and a device associated with another user of the credential management system.

11. The computer-implemented method of claim 1, wherein the receiving, by the first user device, the second request for activity data of the second user from among the one or more users associated with the one or more second devices comprises:
    receiving an input indicating a time period for which the activity data of the second user is to be provided.

12. The computer-implemented method of claim 11, wherein the obtaining the activity data of the second user comprises:
    filtering the activity data of the second user according to the time period; and
    obtaining the one or more respective locations of the one or more interactions of the second user during the time period.

13. The computer-implemented method of claim 12, wherein the providing, for display at the first user device, the activity data of the second user comprises:
    generating a map indicating (i) the one or more respective locations of the one or more interactions of the second user during the time period, and (ii) respective times at which the second user was present at the one or more respective locations of the one or more interactions.

14. The computer-implemented method of claim 1, wherein the obtaining the activity data of the second user comprises:
    determining a type of activity data to obtain according to an access level of the first user; and
    obtaining the activity data of the second user according to the determined type of activity data,
    wherein:
    a first type of the activity data of the second user is obtained when the first user has a first access level;
    a second type of the activity data of the second user is obtained when the first user has a second access level;
    the first type of the activity data is different than the second type of the activity data; and
    the first access level is different than the second access level.

15. A non-transitory computer-readable storage medium storing instructions executable by one or more computers which, upon such execution, cause the one or more computers to perform operations comprising:
    receiving, by a first user device, a request to identify devices that are associated with a credential management system and are located within a threshold distance of the first user device;
    responsive to receiving the request, searching for one or more devices that are (i) associated with the credential management system, (ii) wirelessly connected to a computer network through a particular communication protocol, and (iii) and are located within the threshold distance of the first user device;
    detecting, using the particular communication protocol, one or more wireless devices based on one more wireless signals received from the one or more wireless devices;
    filtering the detected one or more wireless devices to identify a subset of wireless devices comprising one or more second devices that are ( ) associated with the credential management system, (ii) wirelessly connected to the computer network through the particular communication protocol, and (iii) are located within the threshold distance of the first user device;
    obtaining identification information that includes one or more credential representations representative of one or more users associated with the one or more second devices, respectively;
    validating the one or more credential representations included in the identification information by communicating with a validation server associated with the credential management system;
    responsive to validation of the credential representations included in the identification information, controlling the first user device to display (i) an indication of the one or more users associated with the one or more second devices, and (ii) an indication that the one or more second devices are located within the threshold distance of the first user device;
    receiving, by the first user device, a second request for activity data of a second user from among the one or more users associated with the one or more second devices, wherein the activity data of the second user includes data indicating (I) one or more interactions of the second user with the credential management system, and (II) one or more respective locations of the one or more interactions of the second user;

responsive to receiving the second request, determining that a first user of the first user device is authorized to view the activity data of the second user;

responsive to determining that the first user of the first user device is authorized to view the activity data of the second user, obtaining the activity data of the second user; and providing, for display at the first user device, the activity data of the second user.

16. The non-transitory computer-readable storage medium of claim 15, wherein the determining that the first user of the first user device is authorized to view the activity data of the second user comprises:

determining an access level of the first user to view the activity data of the second user by determining an occupation of the first user and determining a professional association between the first user and the second user; and determining that the access level of the first user is sufficient for the first user to view the activity data of the second user.

17. The non-transitory computer-readable storage medium of claim 15, wherein the obtaining the activity data of the second user comprises:

determining a type of activity data to obtain according to an access level of the first user; and obtaining the activity data of the second user according to the determined type of activity data, wherein:
a first type of the activity data of the second user is obtained when the first user has a first access level;
a second type of the activity data of the second user is obtained when the first user has a second access level;
the first type of the activity data is different than the second type of the activity data; and
the first access level is different than the second access level.

18. A system comprising:
one or more computers; and
one or more storage devices storing instructions that upon execution by the one or more computers, cause the one or more computers to perform operations comprising:

receiving, by a first user device, a request to identify devices that are associated with a credential management system and are located within a threshold distance of the first user device;

responsive to receiving the request, searching for one or more devices that are (i) associated with the credential management system, (ii) wirelessly connected to a computer network through a particular communication protocol, and (iii) are located within the threshold distance of the first user device;

detecting, using the particular communication protocol, one or more wireless devices based on one more wireless signals received from the one or more wireless devices;

filtering the detected one or more wireless devices to identify a subset of wireless devices comprising one or more second devices that are (i) associated with the credential management system, (ii) wirelessly connected to the computer network through the particular communication protocol, and (iii) are located within the threshold distance of the first user device;

obtaining identification information that includes one or more credential representations representative of one or more users associated with the one or more second devices, respectively;

validating the one or more credential representations included in the identification information by communicating with a validation server associated with the credential management system;

responsive to validation of the credential representations included in the identification information, controlling the first user device to display (i) an indication of the one or more users associated with the one or more second devices, and (ii) an indication that the one or more second devices are located within the threshold distance of the first user device;

receiving, by the first user device, a second request for activity data of a second user from among the one or more users associated with the one or more second devices, wherein the activity data of the second user includes data indicating (I) one or more interactions of the second user with the credential management system, and (II) one or more respective locations of the one or more interactions of the second user;

responsive to receiving the second request, determining that a first user of the first user device is authorized to view the activity data of the second user;

responsive to determining that the first user of the first user device is authorized to view the activity data of the second user, obtaining the activity data of the second user; and providing, for display at the first user device, the activity data of the second user.

19. The system of claim 18, wherein the determining that the first user of the first user device is authorized to view the activity data of the second user comprises:

determining an access level of the first user to view the activity data of the second user by determining an occupation of the first user and determining a professional association between the first user and the second user; and determining that the access level of the first user is sufficient for the first user to view the activity data of the second user.

20. The system of claim 18,
wherein the obtaining the activity data of the second user comprises:
determining a type of activity data to obtain according to an access level of the first user; and
obtaining the activity data of the second user according to the determined type of activity data,
wherein:
a first type of the activity data of the second user is obtained when the first user has a first access level;
a second type of the activity data of the second user is obtained when the first user has a second access level;
the first type of the activity data is different than the second type of the activity data; and
the first access level is different than the second access level.

* * * * *

UNITED STATES PATENT AND TRADEMARK OFFICE
CERTIFICATE OF CORRECTION

PATENT NO. : 10,257,179 B1
APPLICATION NO. : 15/006300
DATED : April 9, 2019
INVENTOR(S) : Michael J. Saylor et al.

Page 1 of 1

It is certified that error appears in the above-identified patent and that said Letters Patent is hereby corrected as shown below:

In the Claims

In Claim 4, Column 64, Line 62, after "the" delete "first".

In Claim 8, Column 65, Line 22, delete "with" and insert -- with the --, therefor.

In Claim 15, Column 66, Line 40, delete "( )" and insert -- (i) --, therefor.

Signed and Sealed this
Fifth Day of May, 2020

Andrei Iancu
*Director of the United States Patent and Trademark Office*